US012778838B2

(12) United States Patent
Welsh

(10) Patent No.: US 12,778,838 B2
(45) Date of Patent: Nov. 3, 2026

(54) RAPID CYCLING COMPRESSION DEVICE FOR THE PREVENTION OF THROMBOSIS

(71) Applicant: OsciFlex LLC, Philadelphia, PA (US)

(72) Inventor: John D. Welsh, Philadelphia, PA (US)

( * ) Notice: Subject to any disclaimer, the term of this patent is extended or adjusted under 35 U.S.C. 154(b) by 708 days.

(21) Appl. No.: 18/299,272

(22) Filed: Apr. 12, 2023

(65) Prior Publication Data

US 2024/0325238 A1 Oct. 3, 2024

Related U.S. Application Data

(63) Continuation of application No. PCT/US2021/054927, filed on Oct. 14, 2021.

(60) Provisional application No. 63/209,980, filed on Jun. 12, 2021, provisional application No. 63/167,603, filed on Mar. 29, 2021, provisional application No. 63/091,858, filed on Oct. 14, 2020.

(51) Int. Cl.
*A61H 9/00* (2006.01)

(52) U.S. Cl.
CPC ......... *A61H 9/0092* (2013.01); *A61H 9/0007* (2013.01); *A61H 2201/1238* (2013.01); *A61H 2201/164* (2013.01); *A61H 2201/165* (2013.01); *A61H 2201/5005* (2013.01); *A61H 2205/106* (2013.01); *A61H 2209/00* (2013.01)

(58) Field of Classification Search
CPC ...... A61H 9/00; A61H 9/0092; A61H 9/0007; A61H 9/005; A61H 9/0078; A61H 2201/1238; A61H 2209/00
See application file for complete search history.

(56) References Cited

U.S. PATENT DOCUMENTS

| | | | |
|---|---|---|---|
| 2,140,898 | A | 12/1938 | Collens |
| 3,179,106 | A | 4/1965 | Meredith |
| 3,901,221 | A | 8/1975 | Nicholson |

(Continued)

FOREIGN PATENT DOCUMENTS

| | | | |
|---|---|---|---|
| CA | 2953967 | A1 | 1/2016 |
| CN | 2576219 | Y | 10/2003 |

(Continued)

OTHER PUBLICATIONS

Norden et al. Shear stimulation of FOXC1 and FOXC2 differentially regulates cytoskeletal activity during lymphatic valve maturation, Jun. 8, 2020, eLife. (Year: 2020).*

(Continued)

*Primary Examiner* — Douglas Y Sul
(74) *Attorney, Agent, or Firm* — Riverside Law LLP

(57) ABSTRACT

A DVT prevention and/or mitigation device including a wearable band having an inflatable bladder with an inflatable portion. A majority of the inflatable portion of the inflatable bladder being positionable between a user's knee and a midpoint of the user's gastrocnemius muscle when the wearable band is disposed about a leg of the user. The inflatable bladder also being inflatable to apply pressure to a portion of the user's gastrocnemius muscle and a compressed air source coupled to the wearable band to deliver to the inflatable bladder successive compression cycles at a frequency of at least 3 cycles per minute, each compression cycle having a compression period and a peak inflation pressure to induce circulatory flow in a venous valve sinus of the user from each successive inflation.

18 Claims, 33 Drawing Sheets

(56) References Cited

U.S. PATENT DOCUMENTS

| | | | | |
|---|---|---|---|---|
| 5,588,955 | A | 12/1996 | Johnson, Jr. et al. | |
| 5,669,872 | A | 9/1997 | Fox | |
| 5,840,049 | A | 11/1998 | Tumey et al. | |
| 6,010,468 | A | 1/2000 | Grove et al. | |
| 6,468,237 | B1 | 10/2002 | Lina | |
| 8,992,449 | B2 | 3/2015 | Avitable et al. | |
| 9,615,991 | B2 | 4/2017 | Logan et al. | |
| 11,135,128 | B2 | 10/2021 | Shah | |
| 2002/0151929 | A1 | 10/2002 | Goto et al. | |
| 2003/0009119 | A1 * | 1/2003 | Kamm | A61B 17/1355 601/149 |
| 2005/0131321 | A1 | 6/2005 | Ravikumar | |
| 2005/0159690 | A1 | 7/2005 | Barak et al. | |
| 2007/0173886 | A1 * | 7/2007 | Rousso | A61H 7/001 606/203 |
| 2007/0260164 | A1 | 11/2007 | Chiodo et al. | |
| 2008/0195005 | A1 | 8/2008 | Horst et al. | |
| 2009/0069731 | A1 | 3/2009 | Parish | |
| 2011/0004132 | A1 | 1/2011 | Cook | |
| 2011/0152734 | A1 | 6/2011 | Zamboni | |
| 2012/0172774 | A1 * | 7/2012 | Lowe | A61F 7/02 156/291 |
| 2015/0224012 | A1 | 8/2015 | Wright | |
| 2015/0297437 | A1 | 10/2015 | Neuenhahn et al. | |
| 2016/0175184 | A1 * | 6/2016 | Arkans | A61H 23/0263 601/149 |
| 2017/0100301 | A1 | 4/2017 | Denson et al. | |
| 2019/0000329 | A1 | 1/2019 | Denson et al. | |
| 2019/0209422 | A1 | 7/2019 | Shah | |
| 2020/0113773 | A1 | 4/2020 | Ramanan et al. | |
| 2020/0368100 | A1 | 11/2020 | Logan et al. | |
| 2022/0387249 | A1 * | 12/2022 | Ravikumar | A61F 5/0127 |
| 2025/0161143 | A1 | 5/2025 | Welsh | |

FOREIGN PATENT DOCUMENTS

| | | | |
|---|---|---|---|
| CN | 201200584 | Y | 3/2009 |
| CN | 111182876 | A | 5/2020 |
| WO | 2019/222336 | A1 | 11/2019 |

OTHER PUBLICATIONS

Khanna et al., ‘Intermittent pneumatic compression in fracture and soft-tissue injuries healing,’ Jul. 1, 2008. British Medical Bulletin 2008; 88: 147-156. (Year: 2008).*

Office Action dated Oct. 31, 2025 for Chinese Patent Application No. 202180083670.2, with translation.

Mellor et al. ‘Mutations in FOXC2 Are Strongly Associated With Primary Valve Failure in Veins of the Lower Limb,’ Mar. 19, 2007 ( Year: 2007).

Lee et al. ‘Investigation of Blood Flow During Intermittent Pneumatic Compression and Proposal of a New Compression Protocol,’ 2018, Clinical and Applied Thrombosis/Hemostasis 2018, vol. 24(2) 338-347 (Year: 2018).

Caggiati, Alberto, ‘The venous valves of the lower limbs,’ 2013, Phlebolymphology. (Year: 2013).

Extended European Search Report for European Patent Application No. 21881064, issued Aug. 5, 2024.

Morris et al., “Evidence-Based Compression Prevention of Stasis and Deep Vein Thrombosis,” Annals of Surgery, vol. 239(2), Feb. 2004, pp. 162-171.

“VenaFlow® Elite Making DVT Prevention a Priority,” DJO Global, 12 pages, published 2014, retrieved from https://www.djoglobal.nl/media/storage.djoglobal.eu/en_US/Documents/Brochures/VenaFlow_Elite_Data_Sheet_00-2413-EN_REV_B.pdf.

Department of Health & Human Services letter to DJO, LLC, dated Jun. 20, 2013 re: 510(k) No. K130722, Aircast® VenaFLow® Elite System.

Department of Health & Human Services letter to DJO, LLC, dated Jul. 9, 2009 re: 510(k) No. K091700, Aircast VenaFLow Elite System.

Search Report and Written Opinion for corresponding International Patent Application No. PCT/US2021/054927, dated Jan. 18, 2022, 9 pages.

* cited by examiner

FIG. 8A
RCCD - 30 ms inflation 150 ms hold
t = 0 ms
t = 70 ms
t = 140 ms

| Tank pressure (psi), hold time (ms) | % Responders |
|---|---|
| 1 psi, 250 ms | 66% |
| 2 psi, 150 ms | 80% |
| 2 psi, 250 ms | 100% |
| 3 psi, 150 ms | 100% |

Baseline

Active Calf Flexion

RCCD

| Attributes | RCCD (exemplary) | Commercially Available Device 1 | Commercially Available Device 2 | Commercially Available Device 3 |
|---|---|---|---|---|
| Cycles / minute | 12 (alternating left and right legs) | 1 (alternating left and right legs) | 2 (alternating left and right legs) | 2 (alternating left and right legs) |
| Compression cycles at 30% compliance | 5184 compressions | 432 compressions | 864 compressions | 864 compressions |

FIG. 18

RAPID CYCLING COMPRESSION DEVICE FOR THE PREVENTION OF THROMBOSIS

CROSS REFERENCE TO RELATED APPLICATIONS

This application is a continuation of International Patent Application No. PCT/US2021/054927 filed Oct. 14, 2021 entitled "Rapid Cycling Compression Device for the Prevention of Thrombosis", which claims the benefit of U.S. Provisional Patent Application No. 63/091,858 filed Oct. 14, 2020 entitled "Rapid Cycling Compression Device For The Prevention Of Thrombosis", U.S. Provisional Patent Application No. 63/167,603 filed Mar. 29, 2021 entitled "Rapid Cycling Compression Device For The Prevention Of Thrombosis", and U.S. Provisional Patent Application No. 63/209,980 filed Jun. 12, 2021 entitled "Rapid Cycling Compression Device For The Prevention Of Thrombosis", each of which is incorporated by reference herein in their entirety.

FIELD OF THE INVENTION

The present invention generally relates to a compression device, and more particularly, to a rapid cycling compression device for the prevention of deep vein thrombosis in lower extremities.

BACKGROUND OF THE INVENTION

Deep vein thrombosis (DVT) occurs when blood clots form in the downstream sinus of venous valve leaflets. DVT can lead to pulmonary embolism (PE), which occur when pieces of a primary blood clot break free and travel to the arterial system of the lung, blocking blood flow and causing tissue damage and death. DVT and PE are collectively referred to as venous thromboembolism (VTE) and is a leading cause of preventable deaths in hospitals in the United States with 300,000-600,000 annual cases, causing an estimated 60,000 early deaths.

Hospitalized patients are at particularly high risk for VTE due to increased systemic blood clotting as a result of inflammation, surgery, cancer, and other prothrombotic disease states, and due to increased immobility, which is a long-recognized risk factor for VTE formation.

Pharmaceutical anti-coagulation with low molecular weight heparin, or orally available anticoagulants is a common prophylactic treatment for VTE in the hospital. However, anticoagulation has a substantial bleeding risk making it inappropriate to some patients, such as post-surgical patients, traumatic injury patients, and patients suffering from hemorrhagic strokes, and others. The use of prophylactic anticoagulation also has a limited ability to prevent DVT; DVT commonly forms in treated patients and remains a common complication despite widespread use of anticoagulation. Further, mechanical compressions may be used to prevent DVT by increasing venous flow within the patient to prevent blood stasis. Despite the singular and concurrent use of mechanical compression and anticoagulant prophylaxis, often in tandem, VTE remains a leading complication in hospitalized patients.

VTE is associated with immobility and the subsequent decrease in venous blood flow. The impact of immobility is seen in the sinus of venous valves, where VTE clots typically form. The valve sinus shows very little blood flow during times of immobility leading to stagnant blood prone to clotting. Until recently there has been little known about the molecular mechanism linking decreased venous flow to VTE formation. However, recent studies have shown that oscillatory flow, flow with periods of both forward and reverse venous flow, within the sinus of venous valve sinus contributes to preventing clot formation. Aspects of the subject matter disclosed herein provide devices and methods of treating and preventing VTE by generating oscillatory flow in the venous valve sinus of immobile persons through systems, devices and methods that generate oscillatory flow in the venous valves of the lower extremity where DVT formation originates.

BRIEF SUMMARY OF THE INVENTION

In one embodiment, there is a DVT prevention and/or mitigation device including a wearable band including an inflatable bladder having an inflatable portion, a majority of the inflatable portion of the inflatable bladder being positionable between a user's knee and a midpoint of the user's gastrocnemius muscle when the wearable band is disposed about a leg of the user, the inflatable bladder being inflatable to apply pressure to a portion of the user's gastrocnemius muscle and a compressed air source coupled to the wearable band to deliver to the inflatable bladder successive compression cycles at a frequency of at least 3 cycles per minute, each compression cycle having a compression period and a peak inflation pressure to induce circulatory flow in a venous valve sinus of the user from each successive inflation.

In some embodiments, a venous flow rate in deep veins of the user between the successive compression cycles is substantially equivalent to a resting baseline venous flow rate in the deep veins of the user. The venous flow rate in the deep veins of the user between the successive compression cycles may return to the resting baseline venous flow rate within 1 to 10 seconds after each compression period.

In some embodiments, the frequency is at least 5 cycles per minute. The successive compression cycles may produce a substantially equivalent hemodynamic effect on each compression cycle. The successive compression cycles may induce a pulse of forward flow in the deep veins of the user that causes a period of reversing flow in the venous valve sinus.

In some embodiments, the frequency, the peak inflation pressure, and a duration of the compression period are selected to stimulate endothelial FOXC2 expression in an endothelium of the valve sinus.

In some embodiments, the inflatable bladder applies pressure to the user's gastrocnemius over an area of one of: i) less than 60 sq. in.; ii) about 55 sq. in.; iii) less than 30 sq. in; iv) about 25 sq. in; v) less than 15 sq. in.; or vi) about 12.5 sq. in.

In some embodiments, a time to peak inflation of the bladder is one of: i) 30 ms, or less, ii) 100 ms or less, iii) 300 ms or less.

In some embodiments, an inflation period of the bladder is one of: i) 50 ms or less; ii) 150 ms to 250 ms; or iii) 300 ms to 400 ms. The peak inflation pressure may be one of: i) 35 mmHg to 70 mmHg; ii) 70 mmHg to 130 mmHg; or iii) 100 mmHg to 200 mmHg.

In some embodiments, i) the bladder applies pressure to the user's gastrocnemius over an area of one of less than 60 sq. in or about 55 sq. in, the bladder has an inflation period of 50 ms or less, and the peak inflation pressure is 35 mmHg to 70 mmHg, ii) the bladder applies pressure to the user's gastrocnemius over an area of one of less than 30 sq. in or about 25 sq. in, the bladder has an inflation period of 150 ms to 250 ms, and the peak inflation pressure is 70 mmHg to 130 mmHg, or iii) the bladder applies pressure to the user's gastrocnemius over an area of one of less than 15 sq. in or about 12.5 sq. in, the bladder has an inflation period of 300 ms to 400 ms, and the peak inflation pressure is 100 mmHg to 200 mmHg.

In some embodiments, i) the bladder applies pressure to the user's gastrocnemius over an area of about 55 sq. in, the bladder has an inflation period of 25 ms to 50 ms, and the peak inflation pressure is 45 mmHg to 60 mmHg, ii) the bladder applies pressure to the user's gastrocnemius over an area of about 25 sq. in, the bladder has an inflation period of 150 ms to 250 ms, and the peak inflation pressure is 80 mmHg to 100 mmHg, or iii) the bladder applies pressure to the user's gastrocnemius over an area of about 12.5 sq. in, the bladder has an inflation period of 300 ms to 400 ms, and the peak inflation pressure is 150 mmHg to 175 mmHg.

In some embodiments, the inflation period includes a compression hold period of 400 ms or less. A pressure within the inflatable bladder may dissipate over substantially all of the compression hold period. The inflation period may include a peak inflation period defined by a duration to the peak inflation pressure.

In some embodiments, the compressed air source includes a valve that alternately directs compressed air to a compressed air tank and the bladder. In some embodiments, the DVT prevention and/or mitigation device includes a valve that alternately allows compressed air to flow to a compressed air tank in a first configuration and to the bladder in a second configuration.

In some embodiments, the compressed air source delivers compressed air to the bladder in a compression cycle having a ramp up period, a pulse period, a compression hold period, and a deflation period. the compressed air source may include an air pump that pumps air into the bladder during the ramp up period. The air pump may be configured to pump air into a compressed air holding tank. A maximum inflation pressure during the ramp up period may be less than a maximum inflation pressure at the pulse period. A duration of the ramp up period may be greater than the duration of the pulse period. A duration of the compression hold period may be equal to or greater than the duration of the pulse period and less than the ramp up period.

In some embodiments, a duration of the deflation period is equal to or greater than a duration of the ramp up period. The compression hold period may be characterized by a pressure reduction curve having at least one shoulder. The compression hold period may be characterized by a pressure reduction rate that is less than the rate of the inflation during the pulse period. The ramp up period may initiate within about 5 ms of an end of the deflation period.

In some embodiments, the inflatable bladder is a plurality of bladders. The inflatable bladder may be coupled to the wearable band such that an inflation of the inflatable bladder causes the wearable band to cinch around the user's leg. The inflatable bladder may have an overall length that reduces as the inflatable bladder inflates to cause the wearable band to cinch.

In some embodiments, the compression period includes an inflation period that is less than 500 ms. The compression period may include an inflation period that is less than 400 ms. The peak inflation pressure may be approximately 1 PSI to approximately 3 PSI.

In some embodiments, the DVT prevention and/or mitigation may include a flexible overwrap disposed over at least a portion of the bladder and secured to the band, the flexible overwrap configured to cinch the band during bladder inflation.

In some embodiments, the inflatable bladder includes a longitudinal axis, and an elastomeric side wall radially disposed about the longitudinal axis and between opposing ends of the elastomeric side wall, wherein inflation of the inflatable bladder expands the elastomeric side wall away from the longitudinal axis and urges the opposing ends of the elastomeric side wall toward each other. The flexible overwrap may include a mesh covering.

In some embodiments, the venous valve sinus is located in a deep vein proximate a groin of the user.

In some embodiments, peak forward venous flow and peak reverse venous flow both occur during a period in which the bladder is inflating.

Another embodiment of the present invention provides a method of inducing reverse flow in a venous valve sinus area, the method including applying an inflatable bladder having a majority of an inflatable portion positionable between a user's knee and a midpoint of the user's gastrocnemius muscle, the inflatable bladder being inflatable to apply pressure to a portion of the user's gastrocnemius muscle, inflating the inflatable bladder to deliver a peak inflation pressure of compressed air at a compression period and a frequency to induce circulatory flow in a venous valve sinus of the user on successive compression cycles of the inflatable bladder at a frequency of at least 3 cycles per minute, wherein inflating the inflatable bladder includes the steps of inflating the inflatable bladder to a target ramp-up pressure during a ramp-up period, inflating the inflatable bladder to the peak inflation pressure during a pulse period subsequent to the ramp-up period, maintaining a pressure of the inflatable bladder at a holding pressure range for a holding period subsequent to the pulse period and deflating the inflatable bladder to the minimum pressure subsequent to the holding period, the minimum pressure being less than the target ramp-up pressure.

In some embodiments, the inflatable bladder applies pressure to the user's gastrocnemius (in some embodiments, the midpoint of the gastrocnemius) over an area of one of: i) less than 60 sq. in.; ii) about 55 sq. in.; iii) less than 30 sq. in; iv) about 25 sq. in; v) less than 15 sq. in.; or vi) about 12.5 sq. in. An inflation period of the inflatable bladder may be one of: i) 50 ms or less; ii) 150 ms to 250 ms; or iii) 300 ms to 400 ms. The inflation pressure may be one of: i) 35 mmHg to 70 mmHg; ii) 70 mmHg to 130 mmHg; or iii) 100 mmHg to 200 mmHg. Inflating the inflatable bladder may include i) applying pressure to the user's gastrocnemius over an area of one of less than 60 sq. in or about 55 sq. in, for an inflation period of 50 ms or less, and the peak inflation pressure being 35 mmHg to 70 mmHg, ii) applying pressure to the user's gastrocnemius over an area of one of less than 30 sq. in or about 25 sq. in, for an inflation period of 150 ms to 250 ms, and the peak inflation pressure being 70 mmHg to 130 mmHg, or iii) applying pressure to the user's gastrocnemius over an area of one of less than 15 sq. in or about 12.5 sq. in, for an inflation period of 300 ms to 400 ms, and the peak inflation pressure being 100 mmHg to 200 mmHg.

In some embodiments, inflating the inflatable bladder include i) applying pressure to the user's gastrocnemius over an area of about 55 sq. in, for an inflation period of 25 ms to 50 ms, and the peak inflation pressure being 45 mmHg to 60 mmHg, ii) applying pressure to the user's gastrocnemius over an area of about 25 sq. in, for an inflation period of 150 ms to 250 ms, and the peak inflation pressure being 80 mmHg to 100 mmHg, or iii) applying pressure to the user's gastrocnemius over an area of about 12.5 sq. in, for an inflation period of 300 ms to 400 ms, and the peak inflation pressure being 150 mmHg to 175 mmHg.

In some embodiments, the inflation period includes a compression hold period of 400 ms or less. A pressure within the inflatable bladder may dissipate over substantially all of the compression hold period. The inflation period may comprise a peak inflation period defined by a duration to the peak inflation pressure.

In some embodiments, inflating the inflatable bladder includes cyclically inflating the bladder to alternate between the peak inflation pressure and a subsequent peak inflation pressure for at least 6 cycles per minute. The venous valve sinus area may be at a junction of the user's saphenous vein and the user's femoral vein.

In some embodiments, successive inflations of the bladder include a first compression that induces a first reverse flow peak velocity index at a venous valve sinus and sinus a subsequent compression inducing a subsequent reverse flow peak velocity index at the venous valve sinus, wherein a magnitude of the first reverse flow peak velocity index is 50% to 150% of a magnitude of the subsequent reverse flow peak velocity index.

In some embodiments, the first compression induces a first forward flow occurring substantially simultaneously with the first reverse flow and all subsequent compressions induces a subsequent forward flow occurring substantially simultaneously with the reverse flow.

Another embodiment of the present invention provides a method of treating including selecting a subject from a population having a damaged venous valve, applying an inflatable bladder having a majority of an inflatable portion positionable between the subject's knee and a midpoint of the subject's gastrocnemius muscle, the inflatable bladder being inflatable to apply pressure to a portion of the subject's gastrocnemius muscle, inflating the inflatable bladder to deliver a peak inflation pressure of compressed air at a compression period and a frequency to induce circulatory flow in a venous valve sinus of the subject on successive compression cycles of the inflatable bladder at a frequency of at least 3 cycles per minute, wherein inflating the inflatable bladder includes the steps of rapidly inflating the bladder to the peak inflation pressure during a pulse period and maintaining a pressure of the bladder at a holding pressure range for a holding period subsequent to the pulse period.

In some embodiments, inflating the inflatable bladder further includes the steps of inflating the inflatable bladder to a target ramp-up pressure during a ramp-up period and deflating the inflatable bladder to a minimum pressure subsequent to the holding period, the minimum pressure being less than the target ramp-up pressure.

In some embodiments, the frequency, the peak inflation pressure, and the compression period are selected to stimulate endothelial FOXC2 expression in an endothelium of the valve sinus.

BRIEF DESCRIPTION OF THE FIGURES

FIG. 18 is a table of comparing the number of compression cycles that occurs at 30% compliance during use of an exemplary RCCD and commercially available devices.

DETAILED DESCRIPTION

Figure 1:
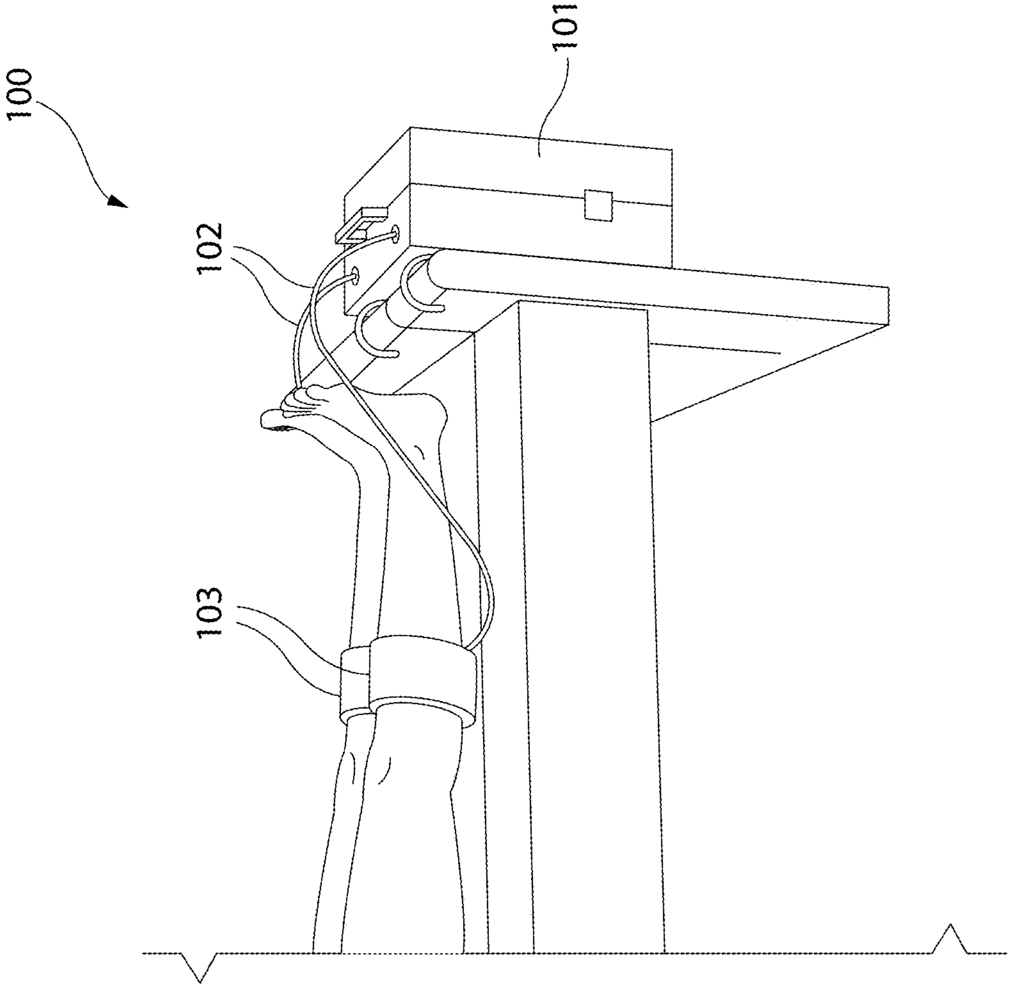
FIG. 1 illustrates an exemplary rapid cycling compression device (RCCD) in use by a patient according to an embodiment.

Embodiments of the present disclosure include a system, device and method for utilizing rapid compression to create oscillatory flow in the valve sinus of deep veins. In further embodiments of the present disclosure there is a system, device and method that includes a compression device that is optimized for limited reduction in venous volume in the compression area to allow for rapid return to baseline pressures so that compression can be rapidly reapplied and continuously initiate oscillatory flow many times per minute to match physiological hemodynamics and preserve the antithrombotic genetic program that prevents VTE.

Endothelial cells that line the venous valve sinus and adjacent valve leaflet, the site of stereotypic VTE clot formation, experience reversing or oscillatory flow when bursts of venous flow create eddies in the downstream sinus region. These bursts of flow are created in response to "normal" muscle movements that occur during activity. The valve sinus endothelial cells sense the oscillatory shear forces and in response upregulate expression of FOXC2 and PROX1 transcription factors. PROX1 and FOXC2 regulate the expression of numerous target genes including 6 genes related to thrombosis. Endothelial cells expressing FOXC2 and PROX1 have 5-10 fold less von Willebrands Factor (vWF), non-detectable surface P-selectin levels, and 5-20 fold less intercellular adhesion molecule 1 (ICAM1), which are all prothrombotic proteins. Further, these same endothelial cells have a 2-3 fold increase in anti-thrombotic proteins thrombomodulin (THBD), endothelial protein C receptor (EPCR) and tissue factor pathway inhibitor (TFPI) compared to endothelial cells not expression FOXC2 and PROX1. Genetic deletion of FOXC2 or PROX1 in mice showed the loss of the anti-thrombotic gene program at the valve and spontaneous DVT formation. A similar response was observed when venous blood flow was restricted in mice. Finally, it was shown that at the site of VTE clot formation in human patients the local cells had lost the expression of PROX1 and FOXC2, and had lost the anti-thrombotic protein expression pattern, showing that the loss of this pathway is associated with clinical VTE formation.

Taken together, these results demonstrate that immobility contributes to the formation of VTE blood clots, not just through reduced total venous flow, but by specifically reducing the bursts of venous flow that create valve sinus oscillatory eddies and the stimulation of local endothelial cells to upregulate PROX1 and FOXC2 transcription factors that in turn regulate a genetic program that potently inhibits clot formation through multiple biochemical pathways.

Referring to FIGS. 1-6D, the present disclosure may include a rapid cycling compression device ("RCCD") 100. In some embodiments, RCCD 100 may include head unit 101, air tubing 102, and one or more (e.g., two) wearable inflatable garments 103. Wearable inflatable garments or garments 103 may each include a bladder configured to inflate. For example, embodiments of garment 103, 300, 600 may include bladder 301, 405 or 601, each of which may be used interchangeably herein. Head unit 101 may be configured to generate and control the flow of compressed air to inflate bladders 301, 405 or 601 of wearable inflatable garments 103. Bladders 301, 405, and 601 may be coupled to head unit 101 via air tubing 102. Wearable inflatable garment 103 may be secured in position around a portion of the user or patient. For example, wearable inflatable garment 103 may be secured around the lower extremities of a patient in need of treatment. In some embodiments, wearable inflatable garment 103 is secured around the calves of the user. Wearable inflatable garment 103 may be secured around different portions of the lower extremity of the patient. In some embodiments, wearable inflatable garment 103 is configured to be secured around other portions of the patient, such as the upper extremities.

In some embodiments, RCCD 100 includes one or more air compressors configured to fill an air tank to a set pressure (e.g., 1.5-7.5 psi) and/or to inflate inflation bladder 301, 405 or 601. RCCD 100 may include one or more valves, for example a solenoid valve, and the air tank may be opened by the electronic opening of the valve, which connects the air tank to tubing that connects to the bladder disposed in one of the wearable inflatable garments 103. In some embodiments, for example, after 100-200 milliseconds the valve may close, and the air compressor may restore the tank pressure so that the air bladder in the other wearable inflatable garment 103 can be inflated. This process continues with one wearable inflatable garment 103 inflating every 3-10 seconds and alternating between the left and right calf.

In some embodiments, RCCD 100 is configured to provide one or more compression periods having a duration of 500 ms or less, such as, for example, less than 300 ms. The compression period may be a period from the start of inflation to the end of deflation. For example, the compression period may be the period from when bladder 301, 405, or 601 begins to inflate to when bladder 301, 405, 605 has completed deflating. RCCD 100 may be configured to provide alternating compressions to each lower extremity. For example, RCCD 100 may be configured to provide compressions to a portion of each lower extremity, such as the calf, every 3 seconds, resulting in RCCD 100 providing compressions to a single lower extremity every 6 seconds. RCCD 100, in some embodiments, may be configured to provide compressions to a lower extremity of a user by inflating wearable inflatable garments 103 to a pressure ranging from 1 PSI to approximately 5 PSI. In some embodiments, RCCD 100 is configured to provide compressions at a bladder pressure ranging from approximately 1.5 PSI to approximately 2.5 PSI for a duration of 500 ms or less, such as approximately 300 ms, in compression cycles of 6 seconds, alternating between lower extremities of a patient.

In one embodiment, RCCD 100 includes a bladder disposed within wearable inflatable garment 103 that wraps around the lower extremity of the user, such as around the calf (e.g., between the knee and widest portion of the calf). RCCD 100 may be configured to provide compressions to a desired anatomical area of the user's lower extremity (e.g., the calf). Bladder 301, 405 or 601 may be inflated and deflated to provide compressions to the desired anatomical area. In some embodiments, bladder 301, 405 or 601 is sized and shaped to provide compressions to the desired anatomical area. For example, bladder 301, 405 or 601 may be sized to fully cover the calf, cover half the calf, or is a band that is disposed on around the calf.

In some embodiments, inflation bladder 301, 405 or 601 is selected based on a size or an area of bladder 301, 405 or 601 that is capable of providing compressions to the desired anatomical area of the user. For example, bladder 301, 405 or 601 may be selected from a size of 45 square inches to 65 square inches, 15 square inches to 35 square inches, or 5 square inches to 15 square inches. Wearable inflatable garment 103 may be pneumatically linked to head unit 101 that compresses and releases air into the bladder to create pulses of compressive force. RCCD 100 may progress through compression cycles that each induce a pulse of venous return (e.g., blood flow through the venous system back towards the heart) that creates circulatory or oscillatory flow in the valve sinus areas of the venous valves within the lower extremity of the patient. The consistent creation of oscillatory flow in the valve sinus is believed to preserve the natural hemodynamic mechanism of VTE prevention associated with muscular activity in mobile people.

With reference to FIG. 1 for the purpose of illustration and not limitation, there is provided an illustration showing an exemplary RCCD 100 that is in use by a user (e.g., patient). In some embodiments, RCCD 100 is configured to prevent and/or reduce the occurrence of VTE. RCCD 100 may include head unit 101, pneumatic air tubing 102, and wearable inflatable garments 103 having bladder 601. The features of any of bladders 301, 400, 405, and 601 (FIGS. 4A-6A) may also be applied to any of bladders 301, 400, 405, and 601. The garments 103 are worn around the lower extremity of the user (e.g., between the knee and the widest portion of the calf) as shown, and the air tubing 102 connects the head unit 101 to the wearable garments 103.

In some embodiments, head unit 101 is configured to compress and release air into the bladder disposed within wearable inflatable garment 103 to create pulses of compressive force around the lower extremities of the user (e.g., proximate or around the calves of the user). Wearable inflatable garment 103 may be pneumatically linked to head unit 101 via air tubing 102. In some embodiments, RCCD 100 may progress through compression cycles that each induce a pulse of venous return (e.g., blood flow through the venous system back towards the heart) that creates circulatory or oscillatory flow in the valve sinus areas of the venous valves within the lower extremity of the patient. In some embodiments, the consistent creation of circulatory or oscillatory flow in the valve sinus preserves the natural hemodynamic mechanism of VTE prevention associated with muscular activity in mobile people.

Figure 2:
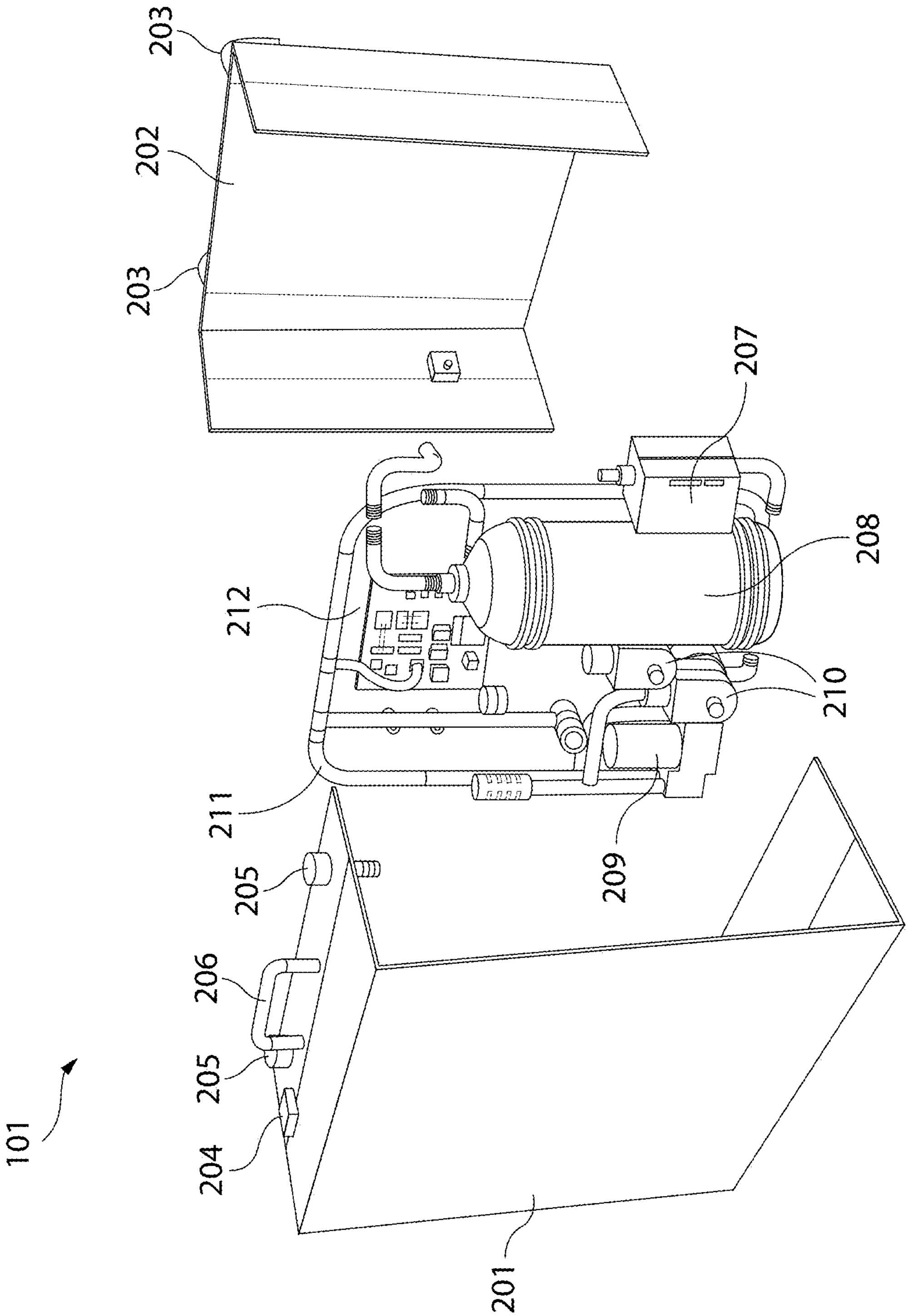
FIG. 2 illustrates an exploded view of an exemplary air control system for an RCCD according to an embodiment

With reference to FIG. 2 for the purpose of illustration and not limitation, there is provided an exploded view illustrating an exemplary head unit air control system 101 ("head unit 101") and components in accordance with certain embodiments. In some embodiments, head unit 101 includes a case that is made up of, for example, two pieces of molded plastic 201 and 202. In some embodiments, the case has one or more (e.g., two) hooks 203 on the back of the case that allows head unit 101 to be hung near the patient. For example, during use of RCCD 100, hooks 203 may be used to hang head unit 101 from the end of a bed. Head unit 101 may include power switch 204 configured to control head unit 101. For example, RCCD 100 may preferably be electronically powered and activated by engaging or actuating power switch 204. The case also may contain two external ports 205 for connecting air tubing 102. In some embodiments, head unit 101 includes handle 206 for carrying and transporting head unit 101. External ports 205 may be configured to allow air to flow from head unit 101, through air tubing 102, to an external device, such as bladder 601. Head unit 101 may be powered by power source 207 that is configured to plug into a standard wall outlet. Head unit 101 may include an air control system that is housed within the case. In some embodiments, the air control system includes air storage tank 208, air compressor 209, and one or more solenoid valves 210. For example, the air control system may include two solenoid valves 210. Solenoid valve 210 may create, store, and control the release of compressed air from the air control system. Compressed air may be delivered out of head unit 101 via pneumatic tubing 211. RCCD 100 may be configured to compress air into the air storage tank 208 to a set pressure and releases the air through solenoid valves 210 for set periods of time and/or at set intervals. In some embodiments, the release of compressed air is controlled by PCB or control board 212. In some embodiments, PCB board 212 includes a microprocessor. PCB board 212 may include one or more pressure sensors. In some embodiments, PCB board 212 is coupled to one or more pressure sensors.

Figure 3:
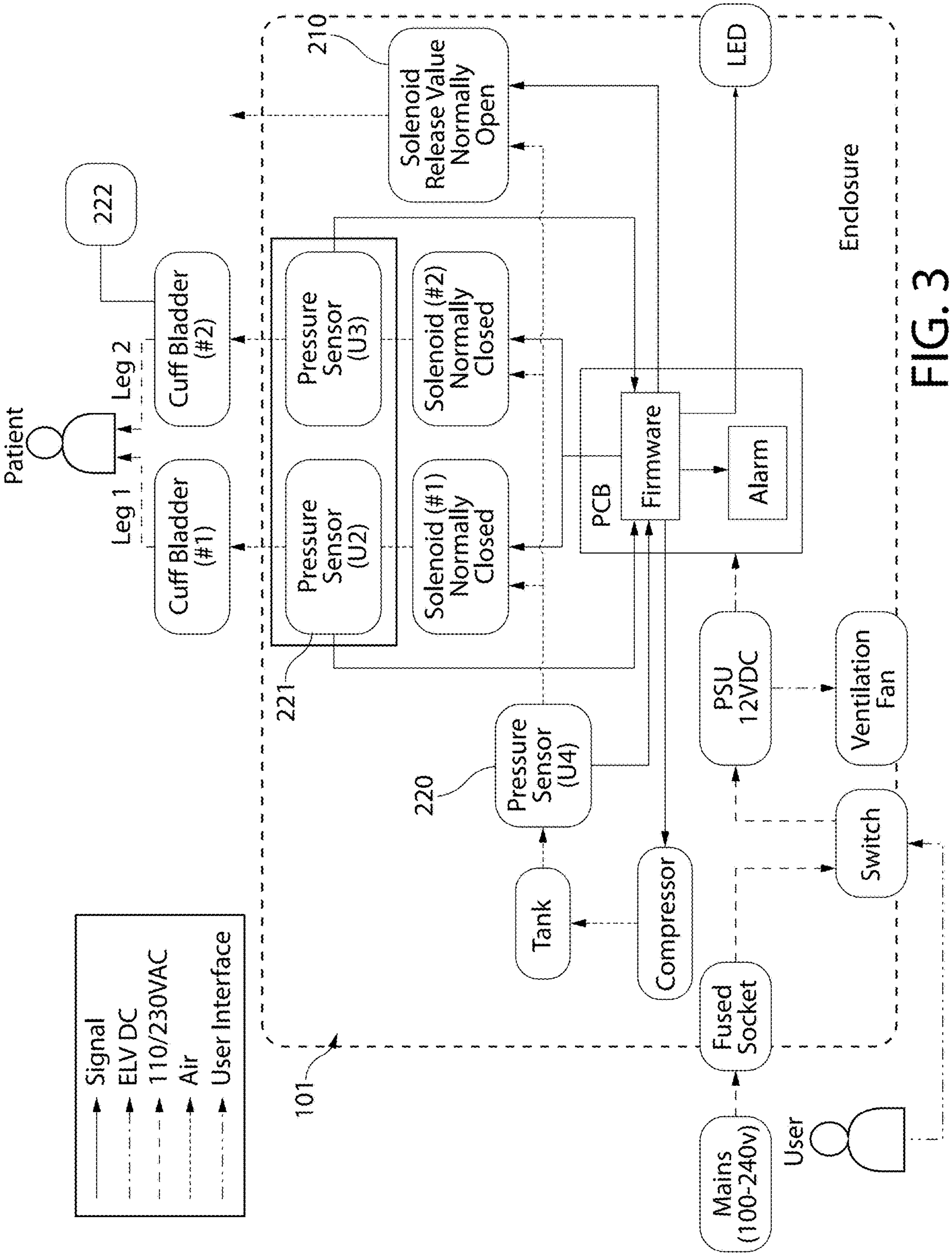
FIG. 3 illustrates an exemplary schematic for an exemplary air control system for an RCCD according to an embodiment.

Referring to FIG. 3, there is provided an illustration of an exemplary architecture of head unit 101 and the pneumatic function of RCCD 100. In some embodiments, head unit 101 includes one or more sensors. For example, head unit 101 may include sensor 220 disposed within air storage tank 208. Sensor 220 may be a pressure sensor to monitor the air pressure within air storage tank 208. Head unit 101 may also include sensor 221 for monitoring the post-solenoid valve pressure for the left and/or right lower extremity of the patient. For example, sensor 221 may be disposed proximate one or more solenoid valves 210 disposed within head unit 101. The one or more solenoid valves 210 may be along the air pathway between air storage tank 208 and bladder 601. The one or more solenoid valves 210 may regulate the inflation and deflation of the bladder to provide compressions to the patient. Sensor 221 may be a pressure sensor that monitors the pressure of air released from one or more solenoid valves 210. In some embodiments, RCCD 100 includes external sensor 222 used to measure the pressure within a bladder coupled to head unit 101. For example, external sensor 222 may be used to ensure that the pressure within the bladder coupled to head unit 101 is within the desired range.

In some embodiments, head unit 101 is configured to be plugged into a standard wall electrical socket and, in operation, a switch on the front of the head unit 101 is turned from "off" to "on." In some embodiments, head unit 101 may include one or more status indicators, which may include visual and/or audible indicators. In some embodiments, an LED indicator light may turn on when head unit 101 is powered on and may, for example, show a blue color if the system is functioning correctly. RCCD 100 may include additional illumination features and/or audio alarms to indicate improper pressure amounts that can cause injury or discomfort to a user. For example, in the event of that RCCD 100 becomes unable to properly output/dispense the air within air tank 208, the pressure in air tank 208 may rise to dangerous or improper levels. Once the pressure has been consistently above predetermined normal ranges, audio and visual alarms may be activated to alert the user and/or operator (e.g., medical professional) of improper pressure. An LED indicator disposed on head unit 101 may turn, for example, from green to red, and an audible alarm will sound. For "high pressure" alarms, the audible alarm may be configured to produce a continuous noise. In some embodiments, to prevent over-filling of air tank 208, air tank 208 includes a check valve configured to vent air above 10 psi to prevent continuous pressure build up within tank 208. If the check valve is disabled or malfunctioning and the pressure continues to rise then the air compressor may be automatically disabled, and RCCD 100 may be configured to automatically stop functioning.

In some embodiments, RCCD 100 includes one or more air compressors. For example, RCCD 100 may include a first air compressor coupled to inflation bladder 601 via an air tubing and a second air compressor coupled to air tank 208. The first air compressor may be configured to inflate inflation bladder 601 to the desired pressure and the second air compressor may be configured to fill air tank 208 prior to valve 210 opening thereby causing an increase in pressure. In some embodiments, RCCD 100 having one or more air compressors allows RCCD 100 to slowly inflate inflation bladder 601 to a first desired pressure using one air compressor and then rapidly inflate inflation bladder 601 to a second desired pressure using another air compressor and/or air tank 208. Alternatively, the one or more air compressors may operate simultaneously to inflate both inflation bladder 601 and air tank 208. In one embodiment, a single air compressor may be configured to supply inflation bladder 601 directly and/or to supply air tank 208. In some embodiments, RCCD 100 includes a valve configured to alternately direct compressed air (e.g., from a single air compressor or more than one air compressor) to air tank and the bladder.

In the illustrated example, the size of air storage tank 208 and set pressure of tank 208 are calibrated based on the size of bladder 601 disposed within wearable inflatable garments 103. For example, RCCD 100 may be configured to be able to fill bladder 601 to a desired pressure (e.g., 1.5-2.5 PSI of air pressure within bladder 601 while in use) in less than a selected period of time (e.g., 30 ms from the initiation of bladder 601 filling to reaching the peak pressure). RCCD 100 may also be configured to re-pressurize the tank in less than 5 seconds (e.g., from the time of solenoid valves 210 closing) to allow for rapid cycling of subsequent inflations.

In one embodiment, RCCD 100 is configured to be able to the fill bladder 601 to a desired pressure of approximately 1.5 PSI in less than 1 second. For example, RCCD 100 may be configured to deliver air to bladder 601 to fill bladder 601 to a desired pressure in less than 500 ms. In some embodiments, RCCD 100 is configured to deliver air to bladder 601 in 100 ms or less. For example, RCCD 100 may be configured to deliver air to bladder 601 in approximately 30 ms. RCCD 100 may be configured to sequentially inflate bladder 601 to a desired pressure during repeating compression cycles. Each compression cycle may include a compression period. For example, a single compression cycle may be from the start of one compression period to the start of a subsequent compression period. The time between the compression periods may be included in the compression cycle. In other words, a compression cycle may be from the start of a first compression period to the start of a subsequent second compression period, including the time between the first compression period and the second compression period. The time between subsequent compression periods may be referred to herein as the dwell time.

In some embodiments, a compression cycle may be from the peak of one compression period to the peak of a subsequent compression period. The compression periods may be defined as the period from the start of inflation to the end of deflation. In some embodiments, RCCD 100 may have a first baseline pressure at the start of inflation and a second baseline pressure at the end of deflation. The first baseline pressure may be substantially equal to the second baseline pressure. In some embodiments, the patient may or may not feel compression over the entire compression period. For example, early stages of the compression period may be characterized by inflation of bladder 601 with little or no applied compression to a user resulting in the patient not feeling compressions at the onset of the compression period. Similarly, in some embodiments, a patient may feel little to no added compression in the last periods/stages of the compression period. In some embodiments, the duration of the compression period is less than 300 ms. However, the duration of compression period may be 500 ms or less, 400 ms or less, 300 ms or less, 200 ms or less, or 100 ms or less. The period from the peak pressure of one compression period to the peak pressure of a subsequent compression period (e.g., a compression cycle) may be from 3 seconds to 20 seconds. For example, RCCD 100 may be configured to provide repeating compression cycles such that a peak pressure is achieved in increments of 3 seconds to increments of 20 seconds. For example, peak pressure may be achieved in increments of 3 seconds, 6 seconds, 10 seconds, 15 seconds, 20 seconds, or any increment between 3 seconds and 20 seconds.

In practice, RCCD 100 may be configured to provide compressions cycles that alternate between different extremities of a patient. For example, a first compression cycle may be applied to a first lower extremity of a patient and a subsequent compression cycle (e.g., a second compression cycle which may be the next compression cycle in a series) may then be applied to a second lower extremity of the patient. The time period between the peak of the first compression cycle (e.g., to a first leg) to the peak of the second compression cycle (e.g., to a second leg) may be in a range from 3 seconds to 20 seconds. In some embodiments although a compression cycle is occurring every 3 seconds, for example, each leg may experience a compression cycle every 6 seconds or more (e.g., where there is a predetermined delay between pairs of compression cycles applied to a single extremity).

In one embodiment, RCCD 100 is configured to include a specified air storage tank to bladder volume ratio. For example, an air storage tank 208 to bladder 601 volume ratio of at least 2:1 is selected to prevent the air storage tank 208 (tank 208) from being de-pressurized to the point of being slow to re-establish the set pressure of tank 208 within, for example, 3-5 seconds. The ratio of the volume of tank 208 to bladder 601 may be 1:1 or below 1:1. In some embodiments, the ratio between an interior volume of bladder 601 and the interior of tank 208 is 1:3.

In some embodiments, a larger volume of tank 208 allows for quicker re-pressurization, which assists in keeping the inflation pressure at a desired level. In some embodiments, a lower volume of tank 208 may be used with an air compressor that is selected to produce greater output and/or having greater runtime capabilities (e.g., continuous operations). The set tank pressure (e.g., the pressure that head unit 101 is programmed to maintain in air tank 208) is also calibrated based on the volume of bladder 601. For example, the set pressure of tank 208 may be calibrated to be able to rapidly inflate bladder 601 to a desired peak pressure. For example, the peak pressure within bladder 601 may range from 1.5-2.5 PSI. The set tank pressure of tank 208 may also be calibrated to allow for the rapid inflation of bladder 601 to the peak pressure in less than, for example, 150 ms. However, the set tank pressure may be calibrated to allow for rapid inflation of bladder 601 to the peak pressure in 50 ms or less, 100 ms or less, 200 ms or less, 300 ms or less, 400 ms or less, 500 ms or less, 600 ms or less, 700 ms or less, 800 ms or less, 900 ms or less, or 1000 ms or less. In a preferred embodiment, the set tank pressure is calibrated to allow for rapid inflation of bladder 601 to a peak pressure in approximately 30 ms.

Figure 9A:
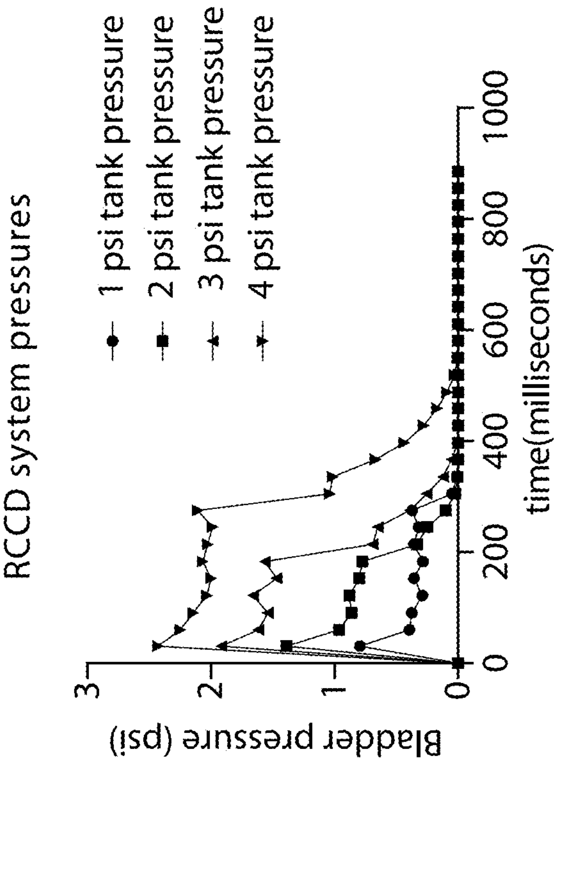
FIGS. 9A and 9B are graphs of relationships between the tank pressure and bladder pressure during use of an exemplary RCCD.
Figure 9B:
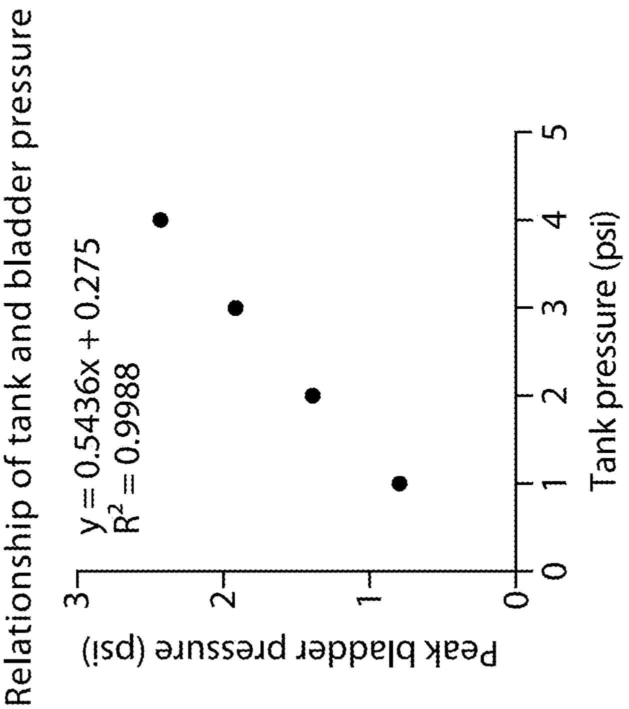

Referring to FIGS. 9A-9D, various pressures may be utilized for tank 208 to achieve the desired hemodynamic effect of generating oscillatory flow. For example, tank 208 may have a tank pressure ranging from 1 to 5 PSI. During experimental testing of RCCD 100, tank 208 had pressures of 1 PSI, 2 PSI, 3 PSI, and 4 PSI, all resulting in reverse venous flow at the venous valve sinus area at the junction of the saphenous and femoral vein (e.g., saphenofemoral junction). In some embodiments, tank 208 has a tank pressure of 3 PSI. Tank 208 having a tank pressure of 3 PSI may be desired since it represents the lowest pressure, and most comfortable to patients, that also creates reverse venous flow above the reverse venous flow created by the patient engaging in activity, such as dorsiflexion of the calf. FIG. 9A shows a graph of pressure at sensor 221, after opening of solenoid valve 210, measured during inflation with various tank pressures of tank 208. FIG. 9B shows a graph of the linear relationship between tank pressure of tank 208 and the pressure of RCCD 100 monitored by sensor 221. As shown in FIG. 9A, tank 208 having a tank pressure of 3 PSI resulted in a peak pressure of bladder 601 of approximately 2 PSI and FIG. 9B indicates that an increase in pressure of tank 208 results in an increase of pressure of bladder 601.

Figure 9D:
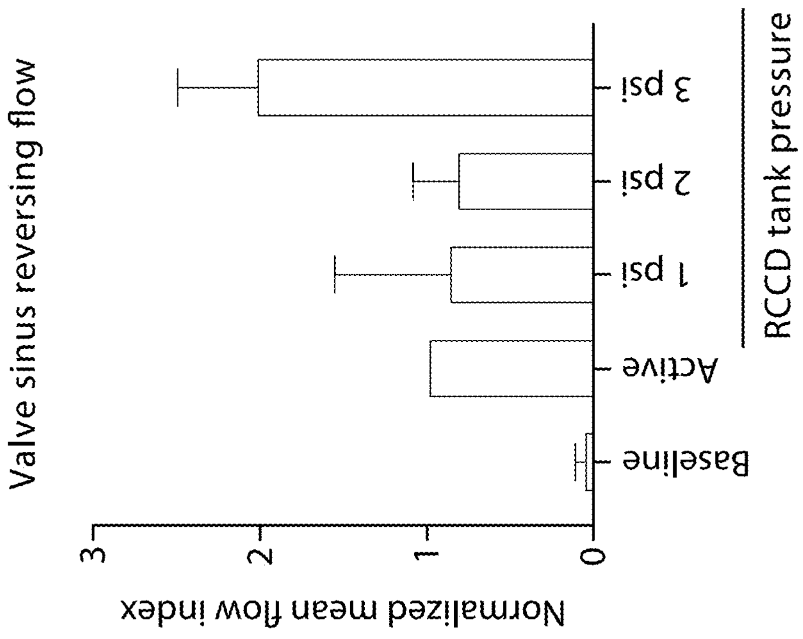
FIGS. 9C and 9D are graphs of normalized mean flow index and various tank pressures during use of an exemplary RCCD.
Figure 9C:
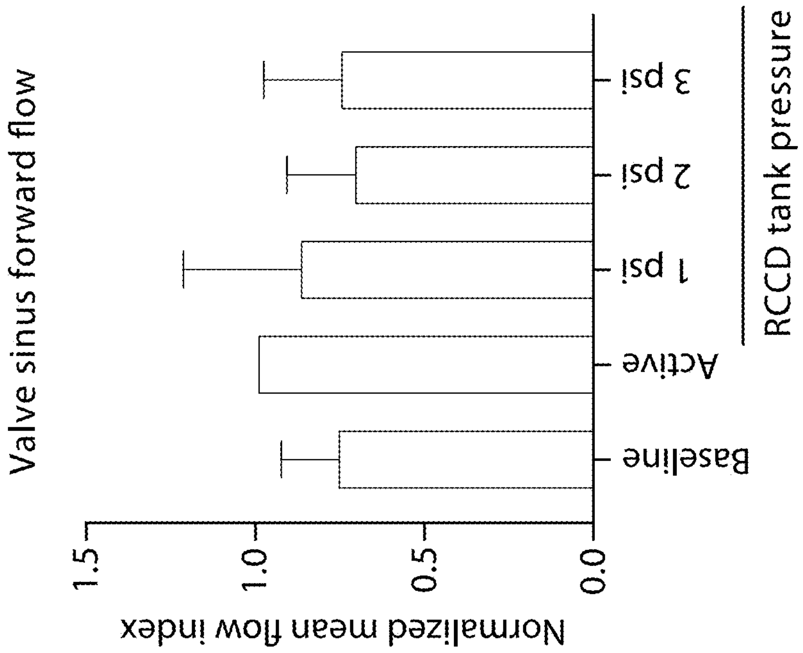

FIGS. 9C-9D shows hemodynamic data quantification from healthy subjects measuring flow in the venous valve sinus area during immobility (baseline), active calf flexion (active), and compression provided by RCCD 100 at various tank pressures (1 PSI, 2 PSI, and 3 PSI) of tank 208 for forward flow (FIG. 9C) and reverse flow (FIG. 9D). The graphs show mean flow index during peak flow normalized to the peak value during active movements to minimize variation across subjects. Comparing the graph of FIG. 9C and FIG. 9D illustrates that increasing the pressures of tank 208 (e.g., from 1 PSI to 2 PSI to 3 PSI) does not have a strong impact on the generation of forward flow in the venous valve sinus area at the saphenofemoral junction compared to impact on normalized mean flow index of reversing flow when tank pressure is increased to 3 psi. The data also indicates that tank 208 having a tank pressure of 1 PSI results in some subjects showing similar levels of reverse venous flow in the valve sinus as during activity. Further, tank 208 having a tank pressure of 3 PSI results in the compressions creating a significant increase in reverse venous flow compared to activity, 1 PSI, and 2 PSI. The error bars shown in FIGS. 9C and 9D represent the standard error.

Figures 10A, 10B:
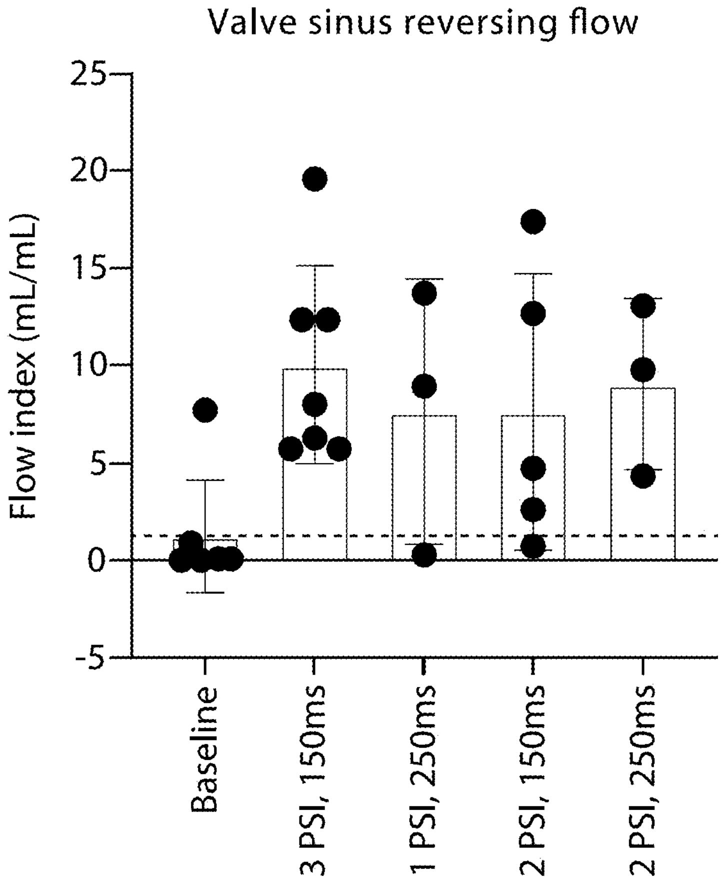
FIG. 10A is a graph of flow index and various tank pressures and hold durations during use of an exemplary RCCD.
FIG. 10B is a table of tank pressures, hold times, and percentage of individuals experiencing reverse flow during use of an exemplary RCCD.

Referring to FIGS. 10A-10B, the data illustrate the efficacy of RCCD 100. FIGS. 10A-10B illustrates that all patients using RCCD 100 achieved greater reverse venous flow compared to immobility (baseline) when tank 208 had a tank pressure of 2 PSI and the pressure was held for 250 ms, in addition to when tank 208 had a tank pressure of 3 PSI and the pressure was held for 150 ms. The data also shows that the reverse venous flow index induced by compressions provided by RCCD 100 was above the average reverse venous flow index during immobility (baseline, dotted line) for each instance provided in the table of FIG. 10B. The additional duration of 250 ms of holding compression at 2 PSI increased the response compared to 150 ms at 2 PSI. Further, at 3 PSI tank pressure of tank 208, 100% of patients had reverse flow index having a magnitude greater than the baseline at 150 ms inflation. These data indicate that a pressure of tank 208 at 3 PSI and a holding period of 150 ms is sufficient to achieve reverse venous flow. In some embodiments, tank 208 having a pressure of 2 PSI may also be used with an increase in the holding period (e.g., 250 ms), which may lengthen the duration of the compression period. The patients in the data provided in FIGS. 10A-10B are adults taken from the general population. Each dot of FIG. 10A represents a separate individual.

In some embodiments, RCCD 100 is configured (e.g., by selection of a target pressure of tank 208) to achieve a desired bladder filling cycle time defined by the amount of time required to fully fill and inflate bladder 601. For example, a higher pressure of tank 208 may be selected to fill and inflate bladder 601 more rapidly. For example, a pressure setting of tank 208 may be in the range of 1 PSI to 5 PSI to achieve a desired bladder filling cycle time within a selected fill time of less than 100 ms, such as approximately 30 ms. Tank 208 may be configured to maintain the pressure setting continuously or may be configured to be refilled cyclically to the desired pressure. In some embodiments, pressure of tank 208 is from 1 PSI to 5 PSI. In a preferred embodiment, the pressure of tank 208 is approximately 3 PSI. In some embodiments, the selected fill time to re-fill tank 208 between inflations of bladder 601 (e.g., between compression periods) may be less than 250 ms, about 500 ms, about 600 ms, about 1 second, about 3 seconds, about 5 seconds, or from 0.01 seconds to 5 seconds. In some embodiments, an exemplary system is configured to adjust the selected fill time from or to any of the foregoing fill times.

In some embodiments, RCCD 100 is configured to achieve a desired pressure profile within bladder 301, 405, or 601, disposed within a wearable inflatable garment 103. RCCD 100 may be configured to achieve a midpoint pressure in a preselected period of time after initiation of inflation. The midpoint pressure may be a pressure between the baseline pressure (e.g., starting pressure of bladder 601) and the peak pressure. In some embodiments, the midpoint pressure within bladder 601 is 2 PSI at a point that is approximately 30 ms after the initiation of inflation of bladder 601. However, it may be desired to achieve the midpoint pressure within bladder 601 at a time that is in a range of from 0.01 seconds to 2 seconds after the initiation of inflation of bladder 601 and then achieve a desired peak pressure after achieving the midpoint pressure. In some embodiments, increasing the pressure of tank 208 may reduce the time necessary to achieve the midpoint pressure (e.g., the 2 PSI referenced above) in bladder 601.

In one embodiment, RCCD 100 is configured to achieve a midpoint pressure ranging from 2 PSI to 3 PSI at 30 ms after the start of the inflation of bladder 301, 405 or 601. In one embodiment, RCCD 100 is configured to achieve the midpoint pressure ranging from 2 PSI to 3 PSI at 30 ms after the initiation of the inflation of bladder 301, 405 or 601. In one embodiment, RCCD 100 is configured to achieve the midpoint pressure ranging from 2 PSI to 3 PSI at 100 ms after the initiation of the inflation of bladder 301, 405 or 601. In one embodiment, RCCD 100 is configured to achieve the midpoint pressure ranging from 2 PSI to 3 PSI at 150 ms after the initiation of the inflation of bladder 301, 405 or 601. In one embodiment, RCCD 100 is configured to achieve the midpoint pressure ranging from 2 PSI to 3 PSI at 250 ms after the initiation of the inflation of bladder 301, 405 or 601. In one embodiment, RCCD 100 is configured to achieve the midpoint pressure ranging from 2 PSI to 3 PSI at 300 ms after the initiation of the inflation of bladder 301, 405 or 601. In one embodiment, RCCD 100 is configured to achieve the midpoint pressure ranging from 2 PSI to 3 PSI at 350 ms after the initiation of the inflation of bladder 301, 405 or 601. In one embodiment, RCCD 100 is configured to achieve the midpoint pressure ranging from 2 PSI to 3 PSI at 400 ms after the initiation of the inflation of bladder 301, 405 or 601. In one embodiment, RCCD is configured to achieve the midpoint pressure ranging from 2 PSI to 3 PSI at 450 ms after the initiation of the inflation of bladder 301, 405 or 601. In one embodiment, RCCD 100 is configured to achieve the midpoint pressure ranging from 2 PSI to 3 PSI at 500 ms after the initiation of the inflation of bladder 301, 405 or 601. In one embodiment, RCCD 100 is configured to achieve the midpoint pressure ranging from 2 PSI to 3 PSI at 525 ms after the initiation of the inflation of bladder 301, 405 or 601.

Figure 4C:
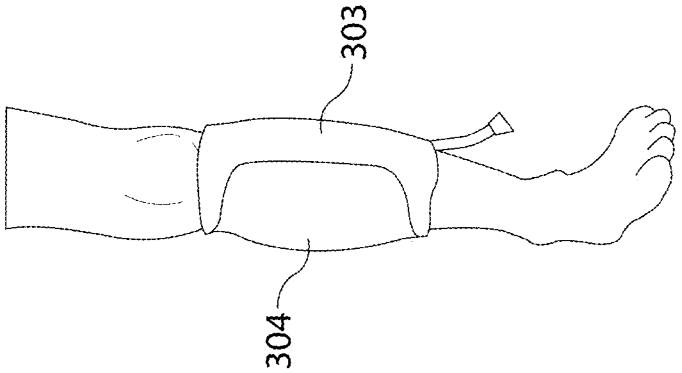
FIGS. 4A-4C illustrate an exemplary wearable inflatable garment for an RCCD according to an embodiment.
Figure 4B:
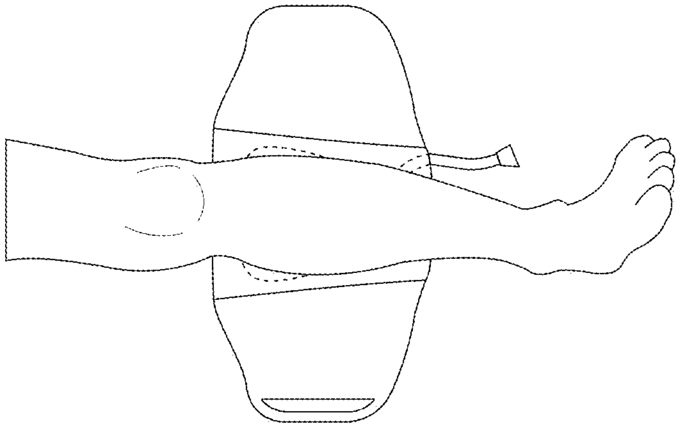
Figure 4A:
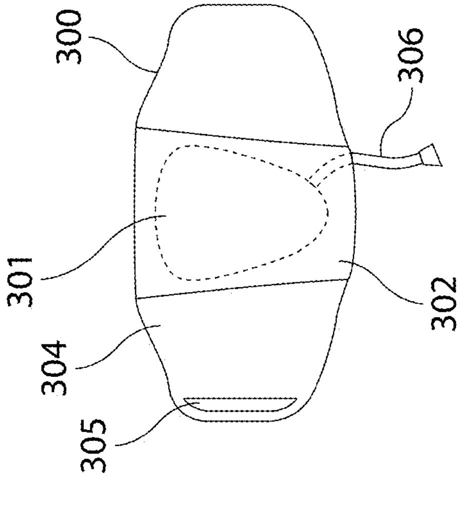

With reference to FIG. 4A for the purpose of illustration and not limitation, there is provided a schematic illustrating an exemplary inflatable garment or garment 300. In some embodiments, inflatable garment 300 is substantially similar to garment 103. Garment 300 may include inflatable bladder 301, 405, or 601, which is contained within a pad portion 302. In some embodiments, inflatable bladder 301 is about 4 inches to about 10 inches long (e.g., from a distal most point of inflatable bladder 301 to a proximal most point of inflatable bladder 301 when worn by a patient) and about 5 inches wide at its widest point and tapered to match the shape of a typical human calf. Pad portion 302 may be disposed on the calf of the leg during use of RCCD 100 and may contain added padding to reduce pressure from the weight of the leg during use. In some embodiments, pad portion 302 is 5 inches wide to match the physiological width of the widest portion of an average calf. In some embodiments, garment 300 is sized and configured to fully wrap around the calf of a patient. Garment 300 may include two wings 303 and 304 of fabric that extend from either side of pad portion 302. Wing 304, in some embodiments, contains a patch of hook material 305, which is used to adhere to the fabric loop material of the outside of garment 300. In some embodiments, wings 303 and 304 are from 7 inches to 9 inches to allow for a universal fit to the largest and smallest calf diameters that are typical (e.g., 10 inches to 22 inches).

In some embodiment, bladder 301, 405, or 601 is sized based on the desired anatomical area to which compression should be applied, referred to herein as the compression area. For example, inflatable bladder 301, 405, or 601 may be sized to extend along the back of the entire calf (full calf), from the knee to the widest portion of the calf (half calf), or a band that is designed to be positioned between the knee and widest portion of the calf (calf band). In some embodiments, the size of bladder 301, 405, or 601 is factor in the peak inflation pressure and/or the compression period. For example, by keeping all other operational parameters the same, changing the size of bladder 301, 405, or 601 would lead to a different pressure profile being applied to a patient and the compression area. The size (e.g., area) of bladder 301, 405, or 601 may be selected to allow bladder 301, 405, or 601 to deliver compressions to the compression area. The size of bladder 301, 405, or 601 may be from 5 square inches to 65 square inches. In some embodiments, the area of bladder 301, 405, or 601 is selected based upon the area of the gastrocnemius desired to be compressed (e.g., compression area). For example, bladder 301, 405, or 601 may be from 45 square inches to 65 square inches for a compression area comprising a majority or all of the gastrocnemius (e.g., full calf bladder). Inflatable bladder 301, 405, or 601 may be from 45 square inches to 15 square inches for a compression area comprising approximately half of the gastrocnemius (e.g., half calf bladder). Inflatable bladder 301, 405, or 601 may be from 15 square inches to 3 square inches for a compression area comprising a small portion of the gastrocnemius (e.g., calf band bladder).

In some embodiments, bladder 301, 405, or 601 being a smaller size (e.g., area) results in a greater peak inflation pressure of bladder 301, 405, or 601 to create the desired hemodynamic effect (e.g., generating oscillatory flow). For example, when inflatable bladder 301, 405, or 601 is a full calf bladder having an area of, for example, 55 square inches, the peak inflation pressure may be from 35 mmHg to 70 mmHg to achieve the desired hemodynamic effect. In some embodiments, the peak inflation pressure when inflatable bladder 301, 405, or 601 is a full calf bladder is from 45 mmHg to 60 mmHg to achieve the desired hemodynamic effect. In another example, when inflatable bladder 301, 405, or 601 is a half calf bladder having an area of, for example, 25 square inches, the peak inflation pressure may be from 70 mmHg to 130 mmHg to achieve the desired hemodynamic effect. In some embodiments, the peak inflation pressure when inflatable bladder 301, 405, or 601 is a half calf bladder is from 80 mmHg to 100 mmHg to achieve the desired hemodynamic effect. By way of another example, when inflatable bladder 301, 405, or 601 is a calf band bladder having an area of, for example, 12.5 square inches, the peak inflation pressure may be from 100 mmHg to 200 mmHg to achieve the desired hemodynamic effect. In some embodiments, the peak inflation pressure when inflatable bladder 301, 405, or 601 is a calf band bladder is from 150 mmHg to 175 mmHg to achieve the desired hemodynamic effect.

In some embodiments, bladder 301, 405, or 601 being a smaller size (e.g., having a smaller compression area) necessitates a greater inflation period of inflatable bladder 301, 405, or 601 to create the desired hemodynamic effect (e.g., generating oscillatory flow). For example, when bladder 301, 405, or 601 is a full calf bladder having an area of, for example, 55 square inches, the inflation period may be 50 ms or less to achieve the desired hemodynamic effect. In another example, when inflatable bladder 301, 405, or 601 is a half calf bladder having an area of, for example, 25 square inches, the inflation period may be from 150 ms to 250 ms to achieve the desired hemodynamic effect. By way of another example, when inflatable bladder 301, 405, or 601 is a calf band bladder having an area of, for example, 12.5 square inches, the duration of inflation may be from 300 ms to 400 ms to achieve the desired hemodynamic effect.

In some embodiments, RCCD 100 is selected based on one or more of the following features: bladder 601 applying pressure to the user's gastrocnemius over an area of one of less than 60 sq. in or about 55 sq. in, bladder 601 having an inflation period of 50 ms or less, and the peak inflation pressure being from 35 mmHg to 70 mmHg; bladder 601 applying pressure to the user's gastrocnemius over an area of one of less than 30 sq. in or about 25 sq. in, bladder 601 having an inflation period of 150 ms to 250 ms, and the peak inflation pressure being from 70 mmHg to 130 mmHg; or bladder 601 applying pressure to the user's gastrocnemius over an area of one of less than 15 sq. in or about 12.5 sq. in, bladder 601 having an inflation period of 300 ms to 400 ms, and the peak inflation pressure being from 100 mmHg to 200 mmHg.

In some embodiments, RCCD 100 is selected based on one or more of the following features: bladder 601 applying pressure to the user's gastrocnemius over an area of about 55 sq. in, bladder 601 having an inflation period of 25 ms to 50 ms, and the peak inflation pressure being from 45 mmHg to 60 mmHg; bladder 601 applying pressure to the user's gastrocnemius over an area of one of about 25 sq. in, bladder 601 having an inflation period of 150 ms to 250 ms, and the peak inflation pressure being from 80 mmHg to 100 mmHg; or bladder 601 applying pressure to the user's gastrocnemius over an area of one of about 12.5 sq. in, bladder 601 having an inflation period of 300 ms to 400 ms, and the peak inflation pressure being from 150 mmHg to 175 mmHg.

RCCD 100 may also include adaptor tubing piece 306, which connects to the inflatable bladder 301 and extends out of the garment 300, for example, by between 2-5 inches, and provides a port that connects to pneumatic tubing from the head unit 101 to pneumatically link the head unit 101 and garment 300. In some embodiments, adaptor tubing piece 306 couples to tubing 102 to couple bladder 301 to head unit 101. The adaptor tubing 306 may be from ⅜ inches to ½ inches in inner diameter to allow for the rapid air flow required to inflate bladder 301 to the desired pressure within approximately 400 ms. FIG. 4B provides an example of how garment 300 is applied to a lower extremity, and FIG. 4C shows how garment 300 fits on to the lower extremity and is secured. For example, garment 300 may be coupled to the calf of a patient such that garment 300 is disposed around the widest portion of the calf. However, garment 300 may be disposed on the calf between the knee and the widest portion of the calf. Garment 300 should be secured to the lower extremity of the patient such that garment 300 does not inadvertently move or slide down the patient's lower extremity. Further, garment 300 should be secured around the lower extremity such that inflation of bladder 301 results in pressure applied to the lower extremity of the patient proximate bladder 301.

Figure 5B:
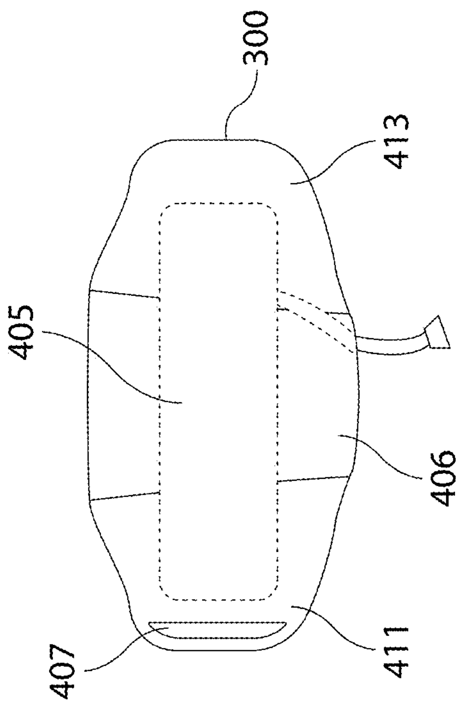
FIGS. 5A-5B illustrate exemplary inflation bladder designs for a wearable inflatable garment.
Figure 5A:
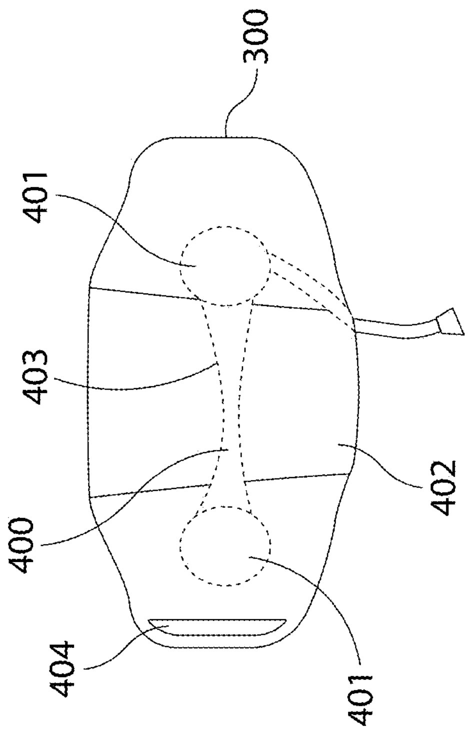

For the purpose of illustration and not limitation, FIG. 5A provides a schematic of exemplary patterns of inflatable bladders 400 within garment 300. Bladder 400 may be similar to bladder 301, but bladder 400 may include two areas of inflation 401 positioned on the sides of the pad portion 402 and connected by a thinner area of bladder conduit 403. A hook and loop system 404 may also be used to secure garment 300 around the lower extremity. In some embodiments, bladder 400 applies compression mainly to the sides of the calf and along the back of the calf in the area of the bladder conduit 403. This configuration of bladder 400 may reduce the compression pressure on the weight bearing portion of the calf to reduce common clinical complications associated with skin breakdown at the site of body weight pressure bearing during hospitalization. In some embodiments, bladder conduit 403 is 5 inches long and the larger inflation areas 401 are 3 inches in diameter to position bladders 400 away from the back of the calf and on the sides of the calf for most users, without extending on to the shin bone of the smallest users.

FIG. 5B provides one iteration the inflatable bladder 405 extends across the pad portion 406 and into the two fabric wings 411 and 413. Garment 300 may include a hook and loop closure 407 to secure garment 300 around the lower extremity. In some embodiments, inflatable bladder 405 allows compression to be applied around the majority of the calf to create a maximal surface area of compression. The inflatable bladder 405 may be 4-5 inches in height and 10 inches in width to prevent the bladder extending beyond the calf circumference of the smallest users.

Figure 6B:
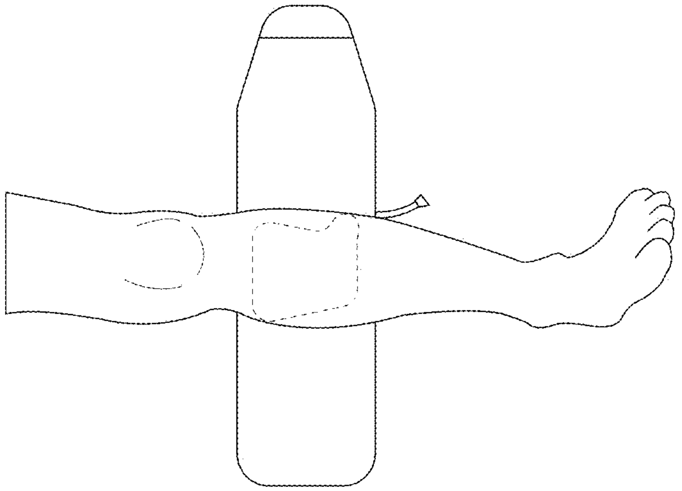
FIGS. 6B-6D illustrate the positioning of a wearable inflatable garment having the inflation bladder design of FIG. 6A around a lower extremity of a user according to an embodiment.
Figure 6A:
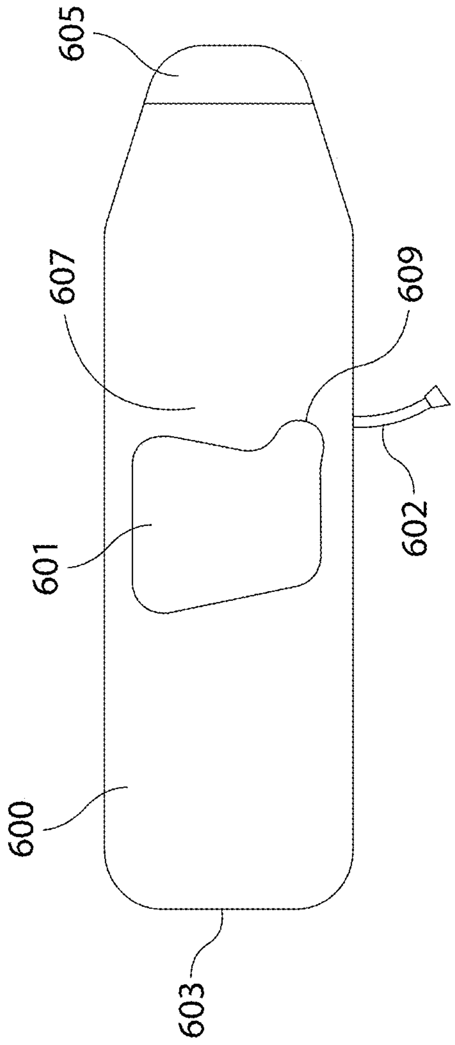
FIG. 6A illustrates a further exemplary inflation bladder design according to an embodiment.
Figure 6D:
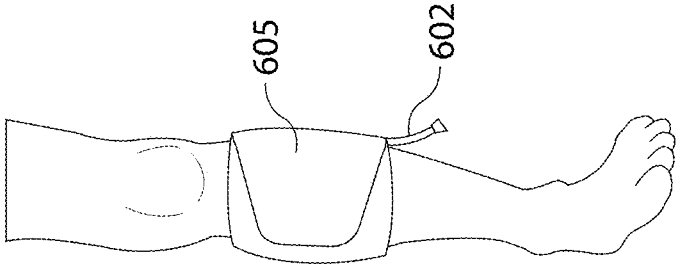
Figure 6C:
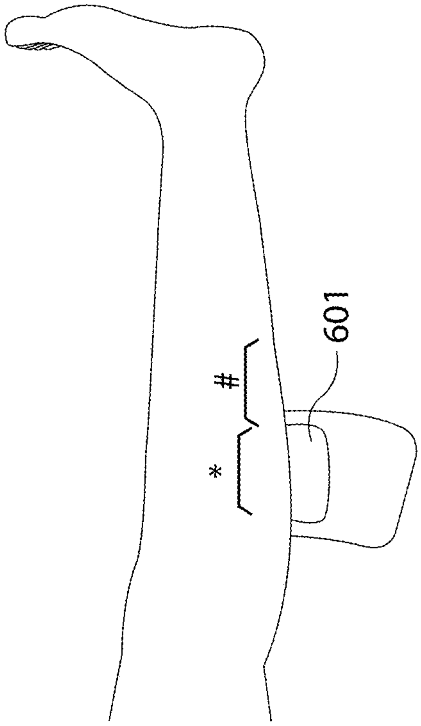

FIGS. 6A-6D illustrate another embodiment of a garment and bladder configuration. Garment 600 and bladder 601 may be similar to garment 300 and bladders 301, 400, and 405 respectively, but may vary in size, shape, and location on the patient. Bladders 301, 400, 405 and bladder 601 may be used interchangeably throughout the present disclosure. In some embodiments, garment 600 includes bladder 601, such that bladder 601 is secure within or coupled to garment 600. Garment 600 may include first end 603, second end 605, and middle portion 607. Bladder 601 may be disposed on or within middle portion 607. Garment 600 may be secured around an anatomical region of a patient, such as a lower extremity. In some embodiments, garment 600 is configured to be secured around the upper calf of a patient. Garment 600 may be secured around the upper calf of the patent proximate the knee of the patient. In some embodiments, garment 600 is secured between the knee of the patient and the widest portion of the patient's calf, such that middle portion 607 and bladder 601 contact the patient between the knee and the widest portion of the calf. Referring to FIG. 6C, garment 600 may be placed at region (*) of the patient, between the knee and the thickest part of the patient's calf (#). The thickest part of the calf may bear the most weight when RCCD 100 is in use, therefore having the force of the compression on the patient's lower extremity away from this area reduces the total force felt by the patient during use of RCCD 100. This configuration reduces discomfort, potential skin damage, and improves compliance of use with RCCD 100. In some embodiments, during use of RCCD 100, the venous valve sinus area where reverse flow and forward flow are induced by RCCD 100 are each located at the saphenofemoral junction 1.

In some embodiments, garment 600 is disposed around the upper part of the lower extremity of the patient. Garment 600 may be secured in place by coupling second end 605 to first end 603. For example, second end 605 may be configured to be secured to first end 603 such that middle portion 607 and/or a portion of first end 603 and second end 605 are in contact with the upper calf of the patient. Middle portion 607 may include bladder 601, which may be coupled to head unit 101 via conduit 602 (e.g. connected to air tube 102). In some embodiments, conduit 602 is coupled to garment 600 such that air flows from head unit 101, through conduit 602, into garment 600 and into bladder 601. However, conduit 602 may be coupled directly to bladder 601. In some embodiments, bladder 601 includes lobe 609 that is coupled to conduit 602. Lobe 609 may be disposed proximate a perimeter of bladder 601 and may allow air to flow to and from bladder 601 and through conduit 602. In some embodiments, lobe 609 provides comfort to the patient and makes connection to an air tube easier.

Figure 21B:
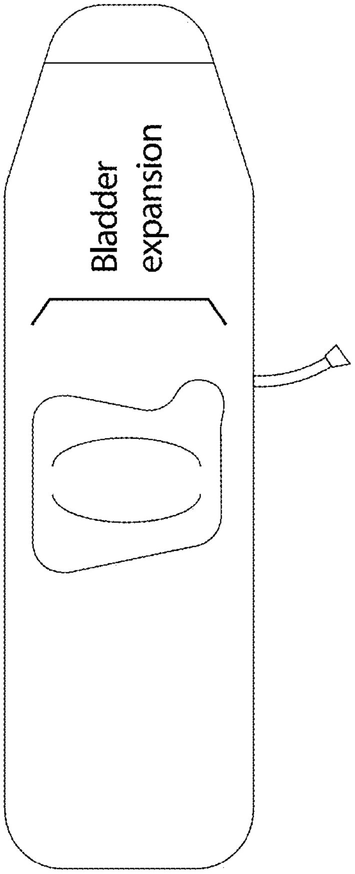
FIGS. 21A-21B are illustrations of expansion of an inflation bladder in accordance with an exemplary RCCD.
Figure 21A:
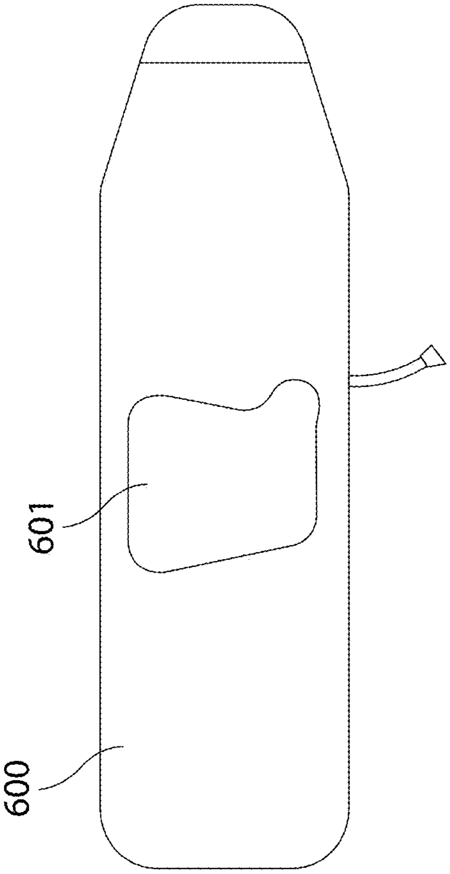

FIGS. 21A-21B illustrate exemplary expansion configurations of bladder 601. In one embodiment, during inflation, bladder 601 begins to bulge outward thus inducing a width of bladder 601 to urged to a smaller dimension. Due to bladder 601 being coupled to garment 600, as bladder 601 inflates and decreases in width, garment 600 tends to cinch around the leg of the user to which it is attached and thus may be tightened around the user's leg due to bladder 601 pulling on garment 600.

Figure 21D:
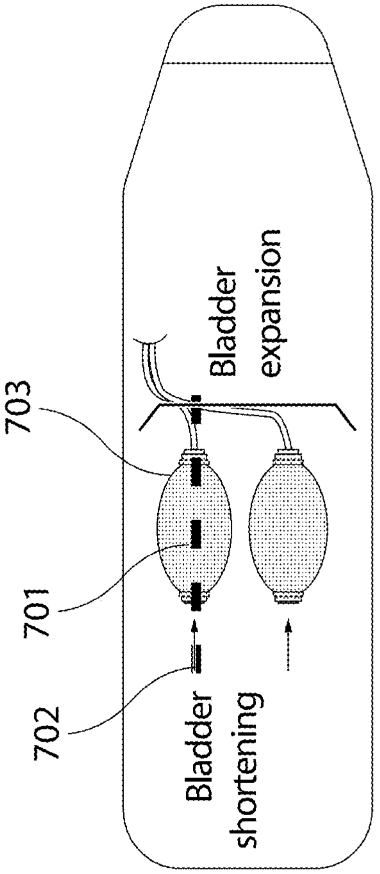
FIGS. 21C-21D are illustrations of expansion of air muscles in accordance with an exemplary RCCD.
Figure 21C:
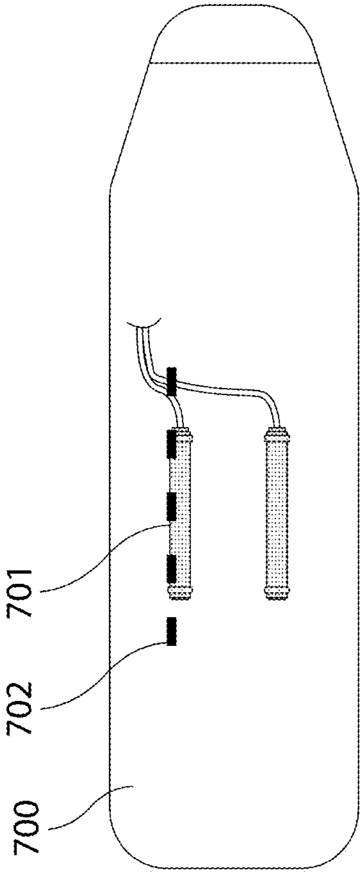

FIGS. 21C-21D illustrate another embodiment of an inflation bladder used in RCCD 100. Inflation bladder 701 may be coupled to garment 700, which may be disposed around a user's leg. Inflation bladder 701 may include longitudinal axis 702 and side wall 703 radially disposed about the longitudinal axis. In some embodiment, side wall 703 may be comprised of an elastomeric material. In use, inflation of bladder 701 expands side wall 703 away from longitudinal axis 702 and urges the opposing ends of side wall 703 toward each other. The urging of the opposing ends of side wall 703 toward each other results in garment 700 cinching, thereby tightening garment 700 around the user's leg. Garment 700 may include one or more inflation bladders 701. Bladder 701 may include a flexible overwrap disposed over at least a portion of bladder 701. In some embodiments, the flexible overwrap is secured to garment 700 and configured to shorten and cinch garment 700 upon inflation of bladder 701. The flexible overwrap may include a mesh covering.

In some embodiments, inflation bladder 701 provides direct compression to a surface of the user's leg and causes reduction in a dimension of garment 700 (e.g., a circumference) to increase the compression felt on the user's leg. The use of inflation bladder 700 may permit the compression device to accomplish the desired results while requiring substantially lower volumes of air (e.g., as compared to a non-cinching device). By requiring less air, the size and weight of head unit 101 may be reduced thereby enhancing the portability of head unit 101. In some embodiments, RCCD 100 is a wearable device.

In some embodiments, RCCD 100 is configured to increase venous blood flow in an immobile person by rapidly compressing a portion of the person's body, such as, for example, the lower extremity. For example, the rapid compressions provided by RCCD 100 may create patterns of circulatory flow consisting of forward and reverse venous blood flow at a venous valve sinus area at the junction of the saphenous and femoral vein (e.g., saphenofemoral junction), which may mimic venous blood flow that occurs during active movements, such as walking or dorsiflexion of the foot, in addition to providing protection against blood clots and preventing DVTs.

In some embodiments, RCCD 100 mimics the dynamics of muscle action where muscle contractions occur on a time scale of less than 1 second and/or the frequency of muscle action during mobility where a typical human gait results in 1-2 steps per second for walking and a typical person may take between 1,000-10,000 steps per day. This may result in a hemodynamic effect that maximizes oscillatory flow input to the valve sinus endothelium to support expression of the protective genetic program and expression of PROX1 and FOXC2. In one embodiment, RCCD 100 inflates bladder 601 to provide optimized compression forces and dynamics to create oscillatory flow in the deep venous valves during each compression cycle and can cycle rapidly with, for example, a maximum of 1 compression cycle per lower extremity every 5-6 seconds. Further, RCCD 100 may allow for 1 compression cycle per lower extremity every 5 seconds to every 20 seconds. For example, RCCD 100 may provide a maximum of 1 compression cycle per lower extremity every 5 seconds, every 6 seconds, every 12 seconds, every 15 seconds, or every 20 seconds. In some embodiments, RCCD 100 inflates to a target pressure of between 1 PSI-3 PSI with an inflation time of 10 ms to 300 ms and inflates once every 5-6 seconds. In some embodiments, RCCD 100 alternates providing compressions between each lower extremity of the user. In some embodiments, frequent compression cycles result in the expression of PROX1 and FOXC2 in the venous valve sinus endothelium.

RCCD 100 may be configured to inflate bladder 601 in repeating compression cycles such that bladder 601 repeatedly provides compressions to an anatomical region of the patient (e.g., the leg of the user). RCCD 100 may provide compressions to the patient via bladder 601 in repeating compression cycles, each comprised of a compression period. The compression periods may include inflating bladder 601 from a first baseline pressure to a peak pressure and deflating bladder 601 to a second baseline pressure. The first baseline pressure may be substantially the same as the second baseline pressure. In some embodiments, at least a portion of the repeating compression cycle induces forward venous flow and reverse venous flow within the proximate venous valve sinus in the deep veins of a patient. The deep veins may include common femoral vein, deep femoral vein, profunda femoris vein, popliteal vein, peroneal vein, anterior tibial vein, and/or posterior tibial vein above the top of the knee in the thigh/groin area. The forward venous flow and reverse venous flow within the venous valve sinus each may have a respective peak that occurs within approximately 100 ms of each other. The peak forward venous flow and peak reverse venous flow may both occur during a period in which compression bladder 601 is inflating. The peak reverse venous flow may have a reverse flow volume index having a magnitude greater than the magnitude of the reverse flow volume index during immobility.

In some embodiments, inflating bladder 601 for repeating compression cycles comprises applying a first compression to the patient and applying a subsequent second compression in the next compression cycle to the patient. The first compression may induce a first reverse flow at the venous valve sinus area and the subsequent second compression may induce a second reverse flow at the venous valve sinus area. In some embodiments, the first reverse flow has a volume index generally equal to a volume index of the subsequent reverse flow. The first reverse flow may have a volume index generally equal to 100% of a volume index of the subsequent reverse flow. However, the first reverse flow may have a volume index between 75% and 100% of the volume index of the subsequent reverse flow. In some embodiments, the first compression induces a first forward flow occurring substantially simultaneously with the first reverse flow and the second compression induces a second forward flow occurring substantially simultaneously with the second reverse flow. The first forward flow and the second forward flow may both occur at saphenofemoral junction. The volume index of the first forward flow may be generally equal to a volume index of the second forward flow and the volume index of first forward flow may be 10% to 300% of the volume index of the first reverse flow. In some embodiments, the forward venous flow at the venous valve sinus area may be reduced after inflation of bladder 601. In some embodiments, following compression of bladder 601, the forward flow in the valve sinus is not reduced below 10% of the flow prior to the compression for a period of time longer than 2 seconds. In some embodiments, the forward venous flow may be reduced compared to a forward venous flow that would be induced by a method having an equal pressure sustained for greater than 300 ms.

Figure 7:
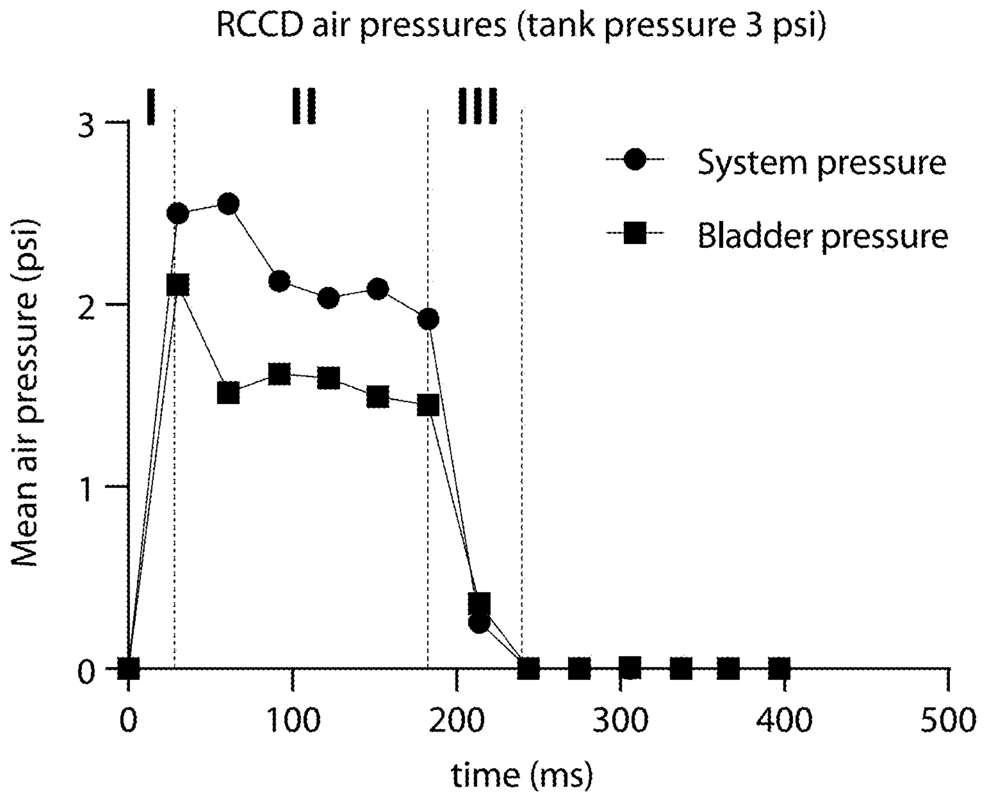
FIG. 7 is a graph of air pressure over time of an exemplary RCCD.

Referring to FIG. 7, in some embodiments, each compression period of the repeating compression cycles may include Phase I, Phase II, and Phase III. The duration of each compression period (e.g. from the beginning of inflation (Phase I) to the end of deflation (Phase III)) may be less than 500 seconds or in some embodiments, less than 300 ms. The duration of a compression period may be from the beginning of Phase I to the end of Phase III. In some embodiments, Phase I spans the inflation of bladder 601. Phase II spans a holding period in which the pressure within bladder 601 is held within a desired range of the peak pressure. In some embodiments, the pressure within bladder 601 during the holding period is constant or substantially constant (e.g., at or near the peak pressure or some other selected pressure level). In some embodiments, Phase III is bounded by the termination of the holding period and the end of the deflation of bladder 601 (e.g., to at or near the baseline pressure).

In one example, during Phase II, the pressure within bladder 601 may be held in a range from 1.5 PSI to approximately 2.5 PSI. In some embodiments, Phase II begins at about the time valve 210 of RCCD 100 (shown in FIGS. 2-3) is opened and Phase III begins at about the time when valve 210 of RCCD 100 is closed. In some embodiments, the pressure curve of Phase II may have a downward trending slope starting from a point that is at or near a peak pressure at the beginning of the holding period which in some embodiments immediately follows the end of the inflation period of bladder 601. In some embodiments, during the holding period, the pressure of bladder 601 reduces by no more than 33% of the peak pressure. In some embodiments, the lowest pressure point (e.g., holding end point) of the holding period reduces by no more than 25% of the peak pressure, no more than 20% of the peak pressure, no more than 15% of the peak pressure, no more than 10% of the peak pressure, or no more than 5% of the peak pressure. In some embodiments, during Phase II, air may be released from bladder 601 via valve 210 or may be pumped out of bladder 601 to cause deflation of bladder 601.

Phase I (inflation period) may have a duration of approximately 30 ms. Phase I may have a duration from approximately 10 ms to approximately 150 ms, from approximately 20 ms to approximately 120 ms, or from approximately 50 ms to approximately 100 ms. Phase II may have a duration of approximately 150 ms. However, Phase II (holding period) may have a duration from approximately 100 ms to approximately 350 ms, from approximately 125 ms to approximately 300 ms, or from approximately 100 ms to approximately 200 ms. Phase III (deflation period) may have a duration of approximately 60 ms. However, Phase III may have a duration from approximately 30 ms to approximately 350 ms, from approximately 50 ms to approximately 300 ms, or from approximately 60 ms and approximately 250 ms. In some embodiments, Phase III has a duration from approximately 60 ms to approximately 210 ms.

In some embodiments, the holding period has a duration of 150 ms or less. The inventors have discovered that additional holding of the compression in some embodiments only increases forward flow as reverse venous flow occurs when the blood flow initially passes the valve. Additional forward flow is not optimal as it can extend the time needed between repeating compression cycles.

Figure 8A:
FIG. 8A is a series of ultrasound images of a venous valve sinus region during use of an exemplary RCCD.

Referring to FIG. 8A, ultrasound images of venous flow at a valve sinus in a healthy human subject during compression provided by an exemplary RCCD 100 having an inflation period of approximately 30 ms and a hold time of approximately 150 ms are shown at various time periods during the hold time: 0 ms (representing the start of the hold period), 70 ms, and 140 ms. The data presented in FIG. 8A show that the peak of reverse venous flow (red) occurs in a range from 0 ms to 70 ms, suggesting that additional compression time greater than, for example, 70 ms does not impact reverse venous flow levels and that the reverse venous flow occurs only as the initial bolus of higher velocity blood passes the valve leaflet of the venous valve sinus area, thereby causing eddies and oscillatory shear flow resulting in the expression of anti-thrombotic proteins.

Figure 8B:
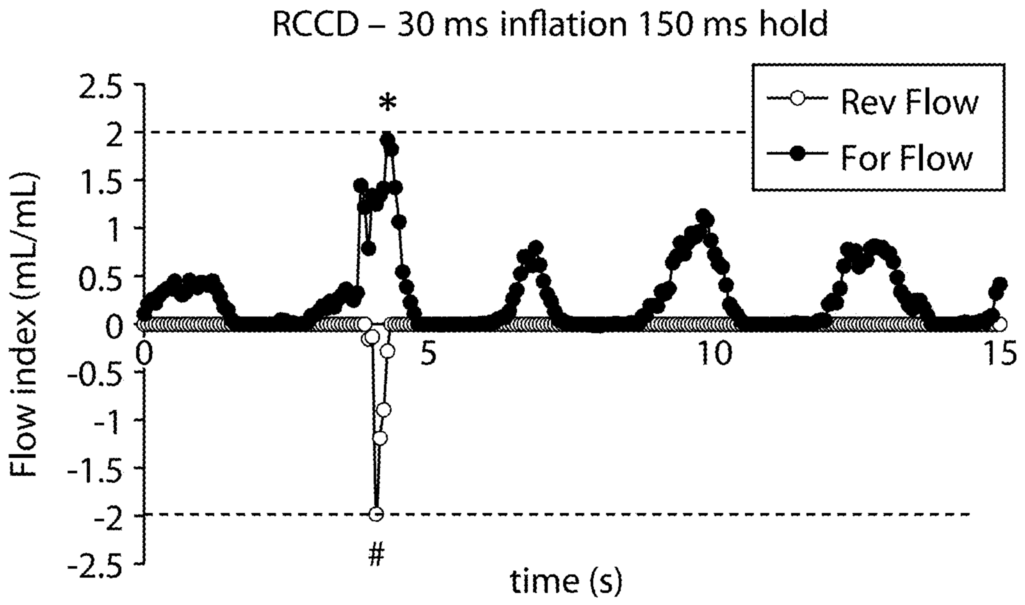
FIGS. 8B-8E are graphs of forward flow and reverse flow during use of an exemplary RCCD.
Figure 8C:
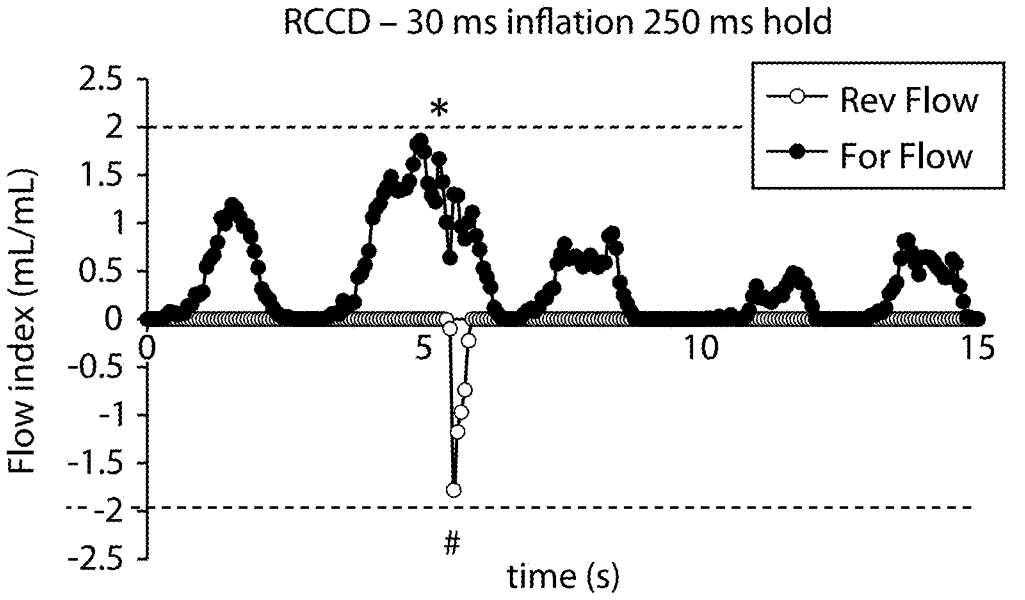

FIGS. 8B-8C illustrate an embodiment of quantification of forward flow (black dots) and reverse venous flow (white dots) in the venous valve sinus area of a patient in which the compression is held for 100 ms (FIG. 8B) and 300 ms (FIG. 8C). For example, FIGS. 8B-8C show the flow volume index ("flow index") for reverse venous flow and forward venous flow over time during a 30 ms inflation followed by 150 ms hold (FIG. 8B) and a 30 ms inflation followed by a 250 ms hold (FIG. 8C). This data indicates that the extended holding period of the compression provided by RCCD 100 to 150 ms does not significantly increase the magnitude of the flow index of the reverse venous flow for this subject.

Figure 8D:
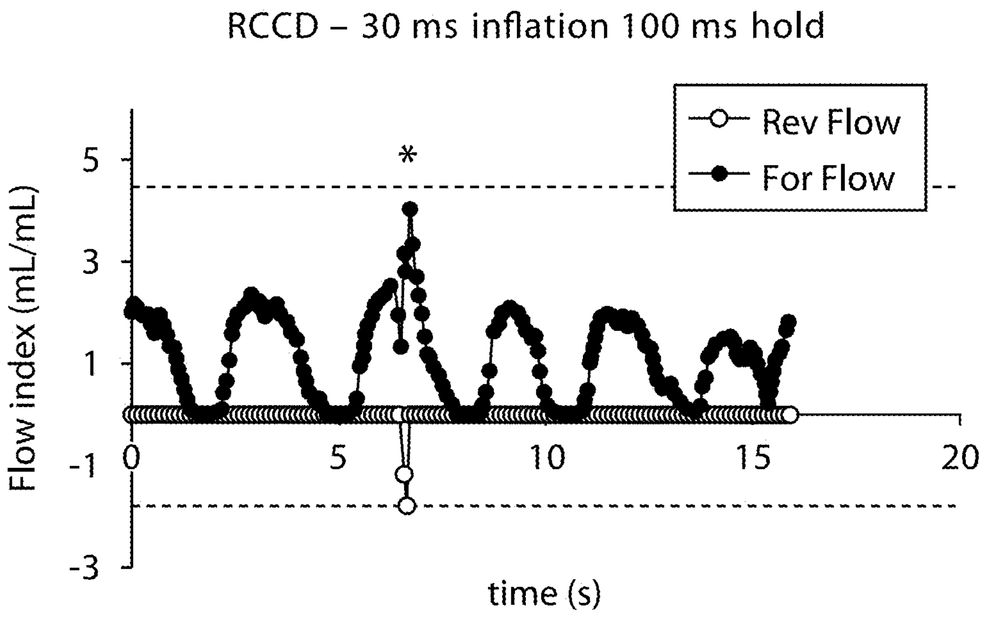
Figure 8E:
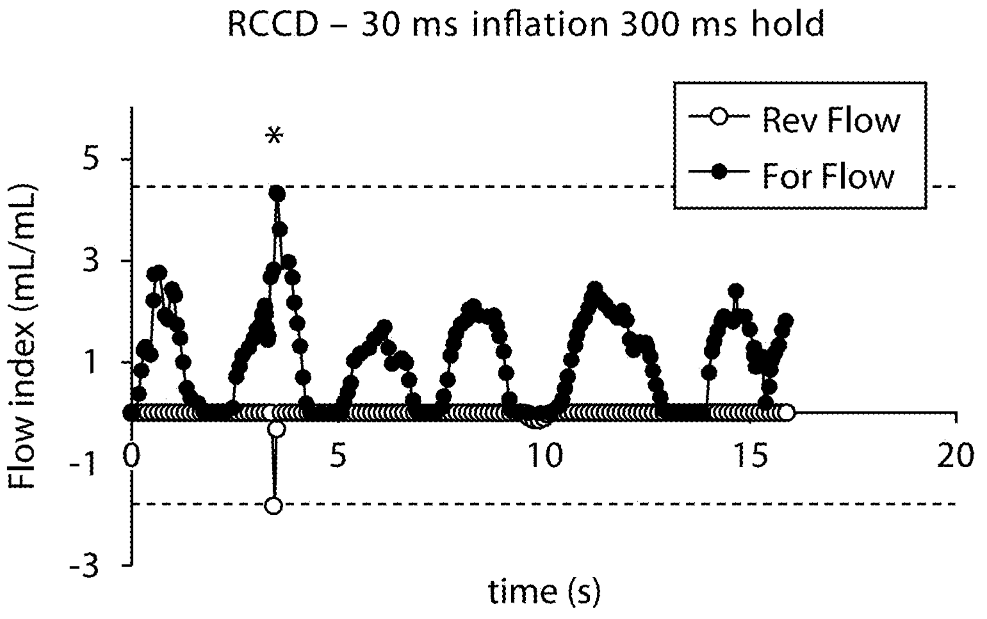

FIGS. 8D-8E illustrate an exemplary quantification of forward flow (black dots) and reverse venous flow (white dots) in the venous valve sinus area of a patient in which the compression is held (holding time) for 100 ms (FIG. 8D) and 300 ms (FIG. 8E). This data indicates that the 100 ms extended hold time of the compression provided by RCCD 100 does not significantly increase the amount of reverse venous flow for this subject.

Referring to FIG. 8B, the forward venous flow may have a baseline velocity occurring at a peak forward flow volume index prior to the inflation of bladder 601. The forward venous flow may have an increased forward flow volume index during inflation of bladder 601 and may decrease back down to baseline velocity after inflation of bladder 601. In some embodiments, the peak forward flow volume index of the forward venous flow after inflation of bladder 601 may be no greater than 10% reduced compared to the peak forward flow volume index of the forward venous flow prior to inflation of bladder 601 or the baseline velocity. In some embodiments, the peak forward flow volume index of the forward venous flow after inflation of bladder 601 may be no greater than 10% reduced for a period of no greater than 2 seconds compared to the peak forward flow volume index of the forward venous flow prior to inflation of bladder 601. The forward venous flow after inflation of bladder 601 may return to the baseline velocity within a range from approximately 2 seconds to approximately 10 seconds. The peak forward flow volume index after inflation of the compression bladder may return to the baseline velocity in less than or equal to 2 seconds.

Figure 20A:
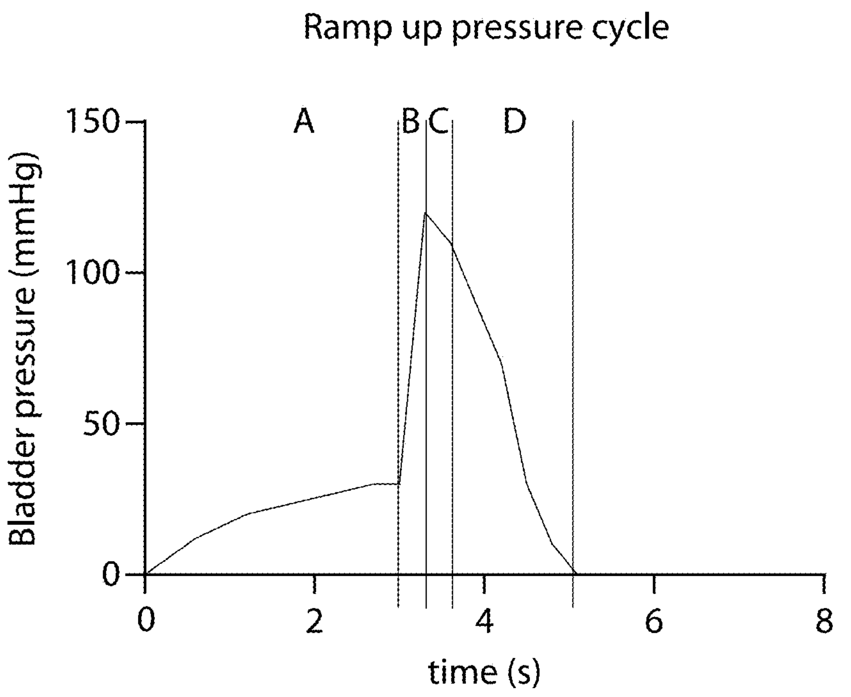
FIG. 20A is a graph of bladder pressure over time of one compression period provided by an exemplary RCCD.
Figure 20B:
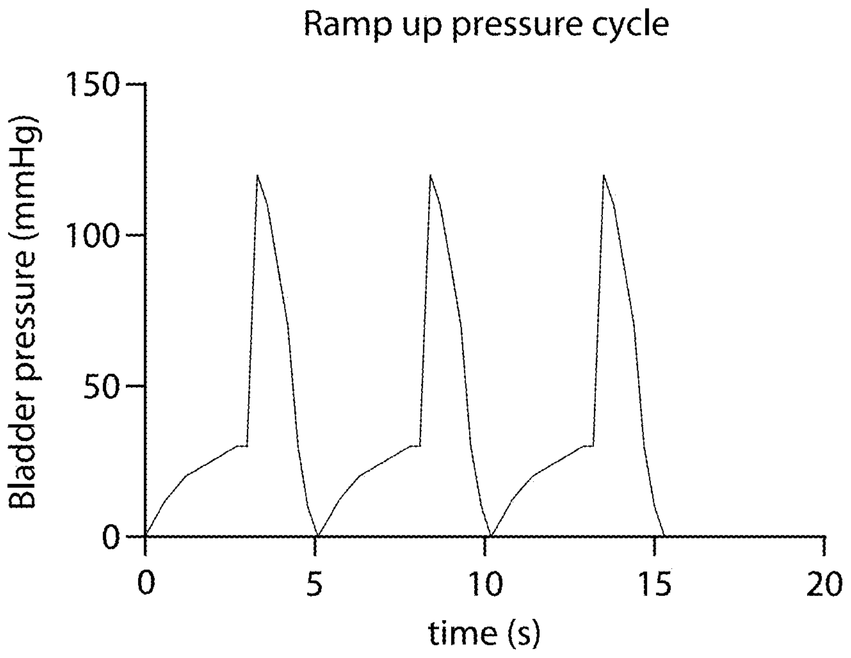
FIG. 20B is a graph of bladder pressure over time of three consecutive compression periods provided by an exemplary RCCD.

Referring to FIGS. 20A and 20B, each compression period of the compression cycles may include an inflation period, a holding period, and deflation period. The inflation period may include a ramp-up period and a pulse period. In some embodiments, the ramp-up period occurs prior to the pulse period. Referring to FIG. 20A, bladder 601 may be configured to slowly inflate during the ramp-up period (Phase A), then rapidly inflate to a peak pressure during the pulse period (Phase B), then hold the pressure at a higher-pressure range during the holding period (Phase C), then deflate to a baseline pressure during the deflation period (Phase D). In some embodiments, RCCD 100 utilizes a first air compressor to during the ramp-up period and a second air compressor or stored air source during the pulse period.

In some embodiments, as bladder 601 inflates to the peak pressure the effect on the venous flow is not immediate. In some embodiments, the inflation of bladder 601 during the ramp-up period (Phase A) results in garment 600 and bladder 601 further abutting and compressing the skin, closing any gaps that existed between garment 600 and the skin. Further, inflation of bladder 601 during the ramp-up period (Phase A) also begins to compress the soft tissue of the leg without a large impact on venous flow. In some embodiments, during the pulse period (Phase B), the peak pressure is reached resulting in the desired hemodynamic response of generating oscillatory flow. A benefit of the ramp up period (Phase A) includes an indication to the user of the impending compression of their skin supplied by during the compression period. The user may be less likely to be startled by a sudden rapid compression. In addition, the ramp up period (Phase A) allows for a decrease in the duration of the rapid pulse compression (e.g., the pulse period (Phase B)) to decrease discomfort and improve tolerability.

The ramp-up period (Phase A) may begin at a first baseline pressure and may terminate at a target ramp-up pressure. In some embodiments, the ramp-up period (Phase A) reaches a target ramp-up pressure in a duration ranging from 0.5 seconds to 2 seconds. The target ramp-up pressure may be the pressure within bladder 601 at the end of the ramp-up period (Phase A). The pulse period (Phase B) may be defined by a rapid increase in pressure from the target ramp-up pressure to the peak pressure. In some embodiments, the pulse period (Phase B) may have a duration from 0.03 seconds to 0.05 seconds. The pulse period (Phase B) may be bound by the target ramp-up pressure and the peak pressure of the compression period. In some embodiments, the holding period (Phase C) follows the pulse period (Phase B) and is defined by bladder 601 holding a pressure at a holding pressure range. The holding pressure range may include pressures that are a percentage of the peak pressure. For example, the holding pressure range may include pressures from 80% to 99% of the peak pressure. In some embodiments, the holding pressure range is from the peak pressure to the holding end point (e.g., the lowest pressure in the holding pressure range). The duration of the holding period (Phase C) may be from the peak pressure to the holding end point, and the holding end point may be a percentage of the peak pressure. The duration of the holding period (Phase C) may be dependent on the size of bladder 601. For example, the smaller the size of bladder 601, the longer the duration of the holding period (Phase C). In some embodiments, the pressure within bladder 601 may dissipate over substantially all of the holding period (Phase C). The deflation period (Phase D) may occur upon termination of the holding period (Phase D). The deflation period (Phase D) may begin at the end of the holding pressure range (e.g., holding end point) and may terminate at a second baseline pressure. The second baseline pressure may be substantially equivalent to the first baseline pressure.

In some embodiments, when bladder 601 is the full calf bladder, the duration of the holding period (Phase C) is less than 50 ms. However, when bladder 601 is the half calf bladder, the duration of the holding period (Phase C) is from 150 ms to 250 ms. When bladder 601 is the calf band bladder, the duration of the holding period (Phase C) is from 300 ms to 400 ms. The deflation period (Phase D) may have a duration of 0.2 seconds to 2.5 seconds. The target deflation pressure at the end of deflation period (Phase D) may be a pressure less than the peak pressure and/or the holding pressure range. For example, the target deflation pressure may be 0 mmHg.

In some embodiments, each of the ramp-up period (Phase A), the pulse period (Phase B), and the holding period (Phase C) has a target pressure or range that is dependent on the size of inflation bladder 601. For example, the target ramp-up pressure may be selected based on the size of bladder 601. In some embodiments, the target ramp-up pressure is from 10 mmHg to 15 mmHg when bladder 601 is the full calf bladder, from 10 mmHg to 40 mmHg when bladder 601 is the half calf bladder or calf band bladder. The peak pressure at the end of the pulse period may also be selected based on the size of bladder 601. In some embodiments, the peak pressure is from 35 mmHg to 75 mmHg when bladder 601 is the full calf bladder, from 70 mmHg to 130 mmHg when bladder 601 is the half calf bladder, or from 100 mmHg to 200 mmHg when bladder 601 is the calf band bladder. Further, the holding pressure range during the holding period may be dependent on the size of bladder 601. In some embodiments, the holding pressure range is from 28 mmHg to 52 mmHg when bladder 601 is the full calf bladder, from 70 mmHg to 130 mmHg when bladder 601 is the half calf bladder, or from 100 mmHg to 200 mmHg when bladder 601 is the calf band bladder.

Bladder 601 may deliver a peak inflation pressure during the compression period to induce circulatory flow in the venous valve sinus of the user on successive compression cycles at a predetermined frequency. In some embodiments, the predetermined frequency is at least 3 cycles per minute. Inflatable bladder 601 may be inflated to a target ramp-up pressure during a ramp-up period, then inflated a peak inflation pressure during a pulse period subsequent to the ramp-up period. The pulse period may have a duration significantly shorter than the ramp-up period. Bladder 601 may maintain the pressure at a holding pressure range for a holding period subsequent to the pulse period and then may deflate to a baseline or minimum pressure subsequent to the holding period. In some embodiments, the minimum pressure is less than the target ramp-up pressure. This process may be repeated at the predetermined frequency.

In some embodiments, the reverse venous flow induced by RCCD 100 has a peak reverse flow volume index having a magnitude greater than the magnitude of the peak reverse flow volume index when the patient is immobile and not utilizing RCCD 100. For example, the magnitude of the peak reverse flow volume index of a reverse venous flow induced by compressions provided by RCCD 100 may be greater than the magnitude of the peak reverse flow volume index of reverse flow when the patient is immobile and not utilizing RCCD 100. In some embodiments, a first peak reverse flow volume index induced by a first compression provided by RCCD 100 may be substantially equal to a subsequent peak reverse flow volume index induced by a subsequent compression provided by RCCD 100. In some embodiments, the first peak reverse flow volume index may be from 50% to 150% of the subsequent peak reverse flow volume index.

In some embodiments, RCCD 100 induces the reverse venous flow simultaneously with the forward venous flow. For example, the first compression provided by RCCD 100 during a first compression cycle may induce eddies at the venous valve sinus area, resulting in a first forward flow occurring substantially simultaneously with a first reverse flow provided by the first compression of the first compression cycle. Further, a second compression in a subsequent second compression cycle, following the first compression cycle, provided by RCCD 100 may induce a second forward flow occurring substantially simultaneously with a second reverse flow. In some embodiments, RCCD 100 induces a peak volume index of the first forward flow is generally equal to a peak volume index of the second forward flow and the peak volume index of the first forward flow is 10%-300% of the peak volume index of the first reverse flow. In some embodiments of RCCD 100, a peak reverse flow volume index of a reverse venous flow at the venous valve sinus area induced by inflation of bladder 601 ranges from 50% to 150% of a peak forward flow volume index of a forward venous flow that occurs substantially simultaneously as the reverse venous flow. The peak forward flow volume index of RCCD 100 at the venous valve sinus area after inflating bladder 601 may not be less than a peak forward flow volume index at the same venous valve sinus area prior to inflating bladder 601 for a period of time greater than 2 seconds.

Figure 8G:
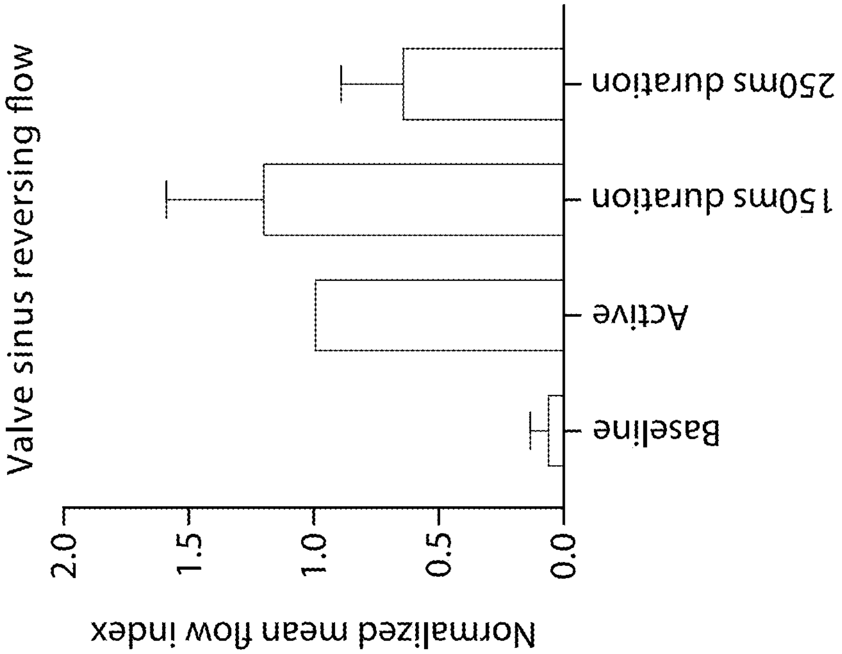
FIGS. 8F and 8G are graphs of normalized mean flow volume index ("flow index") and various durations during use of an exemplary RCCD.
Figure 8F:
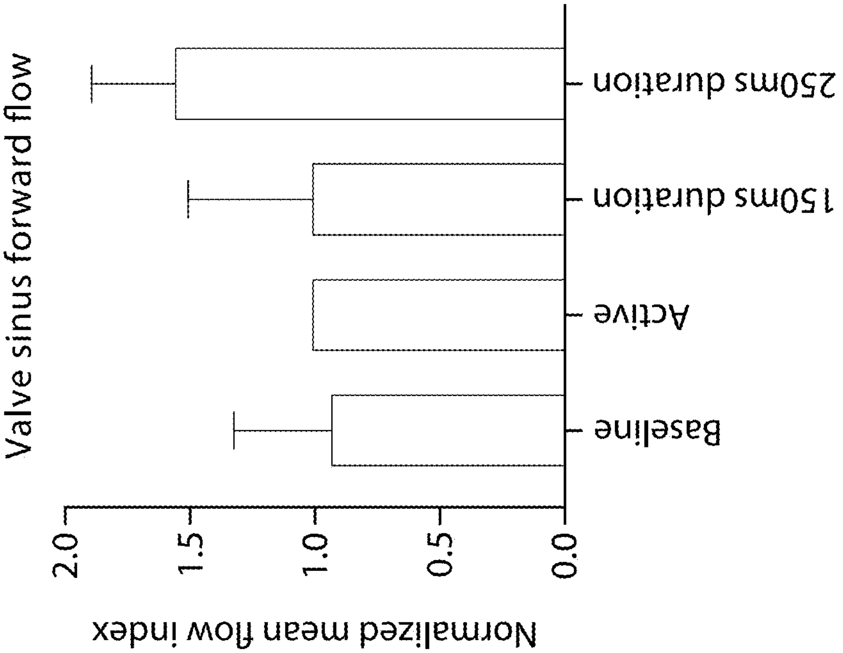

FIGS. 8F-8G illustrate the mean forward flow (FIG. 8F) and the mean reverse venous flow (FIG. 8G) averaged across multiple subjects and normalized to peak flow index for active muscle movements-"Active." For example, the mean flow index values for "Active" was normalized such that their mean flow index has a value of 1, and the "Baseline," "150 ms duration," and "250 ms duration" were each normalized accordingly. The data indicates that while extending the length of holding the compression from 150 ms to 250 ms does increase forward flow (FIG. 8F, 250 ms vs 150 ms), it does not increase the amount of reverse venous flow (FIG. 8G 250 ms vs 150 ms). In some embodiments, active muscle movements include dorsiflexion of a foot of the patient. For example, referring to FIGS. 8D-8E, "Active" may be during active muscle movements, which may include a patient being in prone position and dorsiflexing their foot to simulate activity.

In some embodiments, reduced time of holding the compression provided by RCCD 100 also reduces distal blood trapping. For example, reducing the time of holding the compression from 250 ms to 150 ms results in a reduction of venous flow below garment 600 due to the compression pressure applied to the downstream veins blocking flow. Blood trapping can cause static blood in the veins in the area below the compression site. This blood trapping may increase the risk of clotting lower in the leg in some patients. Reduction in blood trapping may reduce the likelihood or prevent that distal blood stasis.

In some embodiments, RCCD 100 is configured to provide repeating compression cycles to induce reverse venous flow at the saphenofemoral junction to mitigate or prevent DVTs. In one embodiment, RCCD 100 is selected based on one or more of the following features: placement of bladder 601 between the widest portion of the calf and the knee of the patient; time period of the compression period, such as, for example, less than 500 ms, less than 400 ms, and/or less than 300 ms; inflation pressure of bladder 601, such as, for example, 4 PSI or less, 3 PSI or less, 2 PSI or less, and/or 1 PSI or less; inflation time of bladder 601, such as, for example, 10 ms or less, 50 ms or less, and/or 100 ms or less; hold time of the pressure within bladder 601, such as, for example, 100 ms or less, 150 ms or less, and/or 250 ms or less; deflation time of bladder 601, such as, for example, 30 ms or less, 90 ms or less, 210 ms or less, and/or 250 ms or less; and frequency of compression periods per minute, such as, for example, 6 cycles per minute or less, 10 cycles per minute or less, and/or 15 cycles per minute or less.

In some embodiments, RCCD 100 has an inflation time ranging from 10 ms to 150 ms, a hold time ranging from 100 ms to 350 ms, a deflation time ranging from 30 ms to 350 ms, a cycle frequency ranging from 6 cycles per minute to 20 cycles per minute, and an inflation pressure ranging from 50 mmHg to 250 mmHg.

In some embodiments, the venous flow rate within the venous valve returns to a baseline venous flow rate between compression cycles. For example, the venous flow at the venous valve sinus may have a baseline flow rate and between each compression period, the venous flow rate may return to the baseline flow rate. In some embodiments, the venous flow rate returns to the baseline flow rate in less than 10 seconds after each compression period. However, the venous flow rate may return to the baseline flow rate in less than 20 seconds, less than 15 seconds, less than 8 seconds, less than 5 seconds, or less than 3 seconds after each compression period.

As described above, RCCD 100 is configured to generate rapid compression pulses in a lower extremity of a patient/wearer during repeated compression cycles. For example, RCCD 100 may generate a peak pressure that is in a range from 2 PSI to 3 PSI. However, RCCD 100 may generate a peak pressure from 1 PSI to 10 PSI, from 2 PSI to 8 PSI, or from 3 PSI to 7 PSI. In some embodiments, the pressure of bladder 301 of RCCD 100 does not exceed approximately 3 PSI due to discomfort caused to the wearer and the impact of draining blood away from the site of the applied pressure, which may increase necessary dwell time to recover venous pressures.

RCCD 100 may also have a baseline (minimum) pressure at which the pressure of bladder 301 remains prior to inflation. In some embodiments, the peak pressure achieved in bladder 301 is based on the baseline (minimum) pressure. For example, the peak pressure may be at least 15 mmHg greater than the baseline pressure. However, the peak pressure may be at least 5 mmHg, 15 mmHg, 25 mmHg, 50 mmHg, 100 mmHg, 150 mmHg, or 200 mmHg greater than the baseline pressure. The baseline pressure may be from 0 mmHg to 250 mmHg, from 50 mmHg to 200 mmHg, or from 75 mmHg to 150 mmHg. In some embodiments, the baseline pressure is 10 mmHg or less. For example, the baseline pressure may be approximately 5 mmHg.

The baseline pressure may be a maximum pressure within bladder 301 that does not reduce the venous flow. For example, the baseline pressure may be as high as possible without causing a reduction in the venous flow of the venous valve sinus area at the saphenofemoral junction, when pressure is being applied by bladder 301.

RCCD 100 may employ a predefined rate of inflation of bladder 601 to achieve the desired hemodynamic effect of generating oscillatory flow. For example, RCCD 100 may be configured to increase the pressure of bladder 601 to 10 mmHg above the baseline pressure in 0.5 seconds or less. For example, RCCD 100 may be configured to inflate bladder 601 to the desired pressure ranging from 30 ms to 60 ms. In some embodiments, RCCD 100 is configured to increase the pressure of bladder 301 to approximately 65 mmHg above the baseline pressure in less than 0.2 seconds, or less than 0.3 seconds. In some embodiments, RCCD 100 is configured to increase the pressure of bladder 301 to approximately 100 mmHg above the baseline pressure in less than 0.2 seconds, or 0.3 seconds.

In some embodiments, RCCD 100 is configured for passive deflation of the bladder. For example, bladder 601 may be configured to deflate and exhaust to the atmosphere. In some embodiments, bladder 601 is configured to immediately depressurize from the peak inflation pressure to the baseline pressure in five seconds or less-preferably within 0.5 seconds. For example, bladder 601 may be configured to deflate in a range from 60 ms to 210 ms. In some embodiments, bladder 601 is configured to deflate in approximately 60 ms. The longest deflation time of bladder 601 may be from 1 second to 3 seconds. In some embodiments, the deflation time is characterized as the time between peak pressure and the pressure at which bladder 601 is no longer impacting venous flow. This pressure may be the baseline pressure or may be greater than the baseline pressure. In some embodiments, the deflation time may be characterized as the time between peak pressure and ½ the difference between the peak pressure and baseline pressure.

In some embodiments, RCCD 100 is configured to rapidly inflate bladder 610 to the desired peak pressure from the baseline pressure. For example, RCCD 100 may be configured to inflate bladder 601 from a baseline pressure of, for example, 0.2 PSI, to a peak pressure of, for example, 1.5 PSI, in approximately 30 ms. RCCD 100 may be configured to inflate bladder 601 from the baseline pressure to the peak pressure in 150 ms or less, 120 ms or less, 90 ms or less, 60 ms or less, or less than or equal to 30 ms. In a preferred embodiment, RCCD 100 may be configured to inflate bladder 601 from the baseline pressure to the peak pressure in approximately 30 ms. In some embodiments, the rate of inflation of bladder 601 is based on the pressurization of the air tank. For example, the higher the pressure of the air tank, the more rapidly bladder 601 is filled with air and thus inflated. In some embodiments, bladder 601 is configured to rapidly inflate from a non-zero baseline pressure, such as 5 mmHg to the peak pressure. However, bladder 601 may be configured to rapidly inflate from a non-zero baseline pressure of greater than 0.1 PSI, approximately 0.2 PSI or greater, approximately 0.5 PSI or greater, or approximately 1 PSI or greater to the desired peak pressure.

Figure 11A:
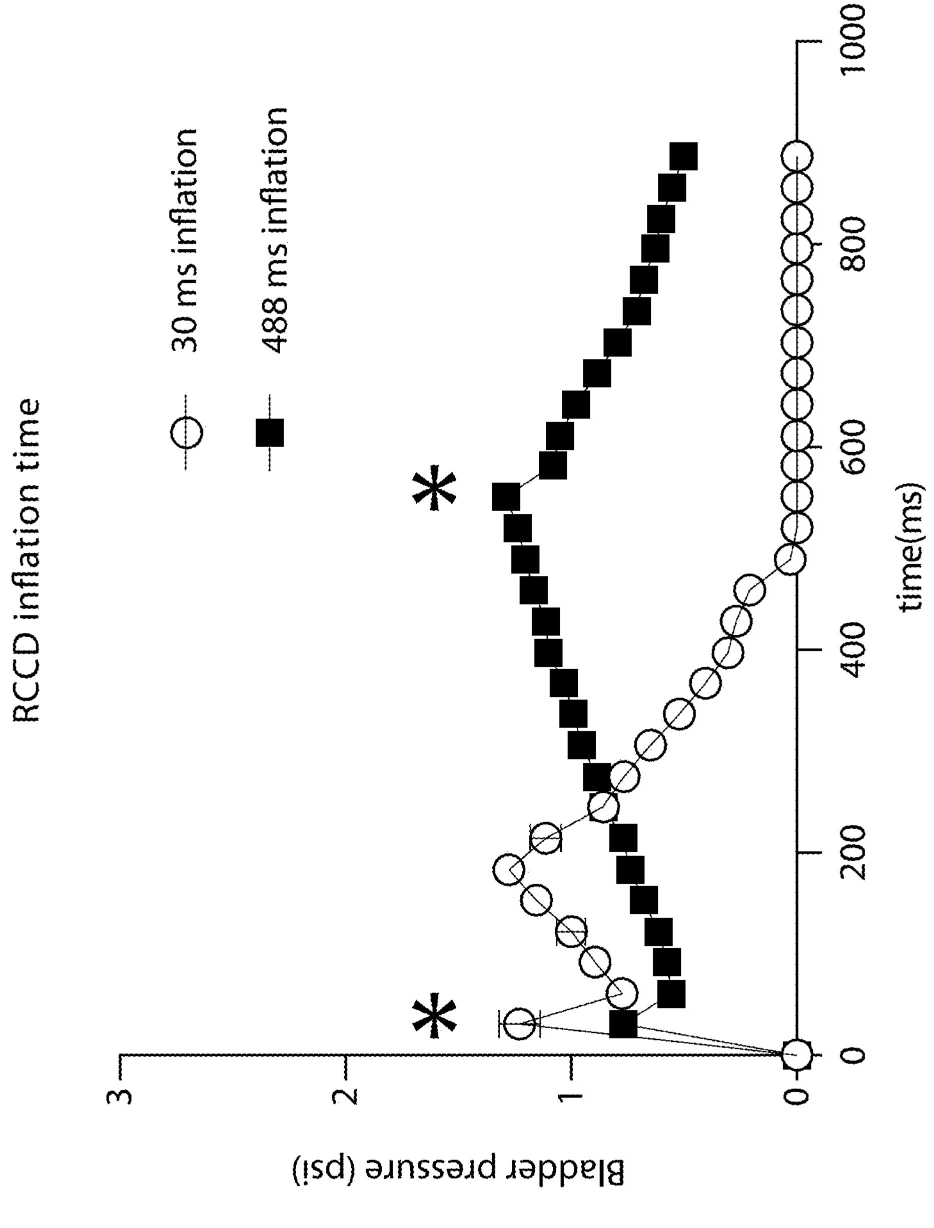
FIG. 11A is a graph of peak bladder pressures based on inflation rates of an exemplary RCCD.
Figure 11B:
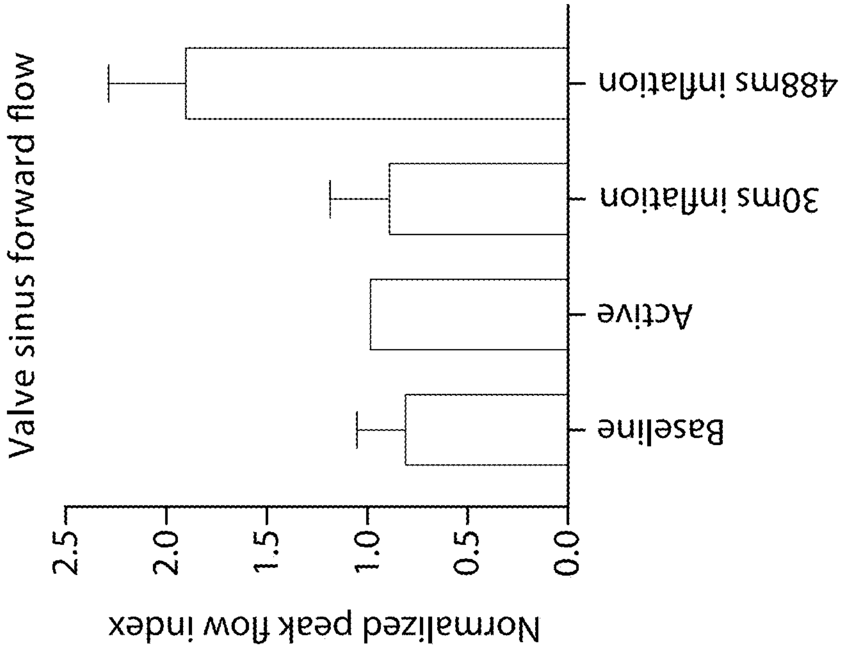
FIGS. 11B and 11C are graphs of normalized peak flow index and various inflation rates of an exemplary RCCD.
Figure 11C:
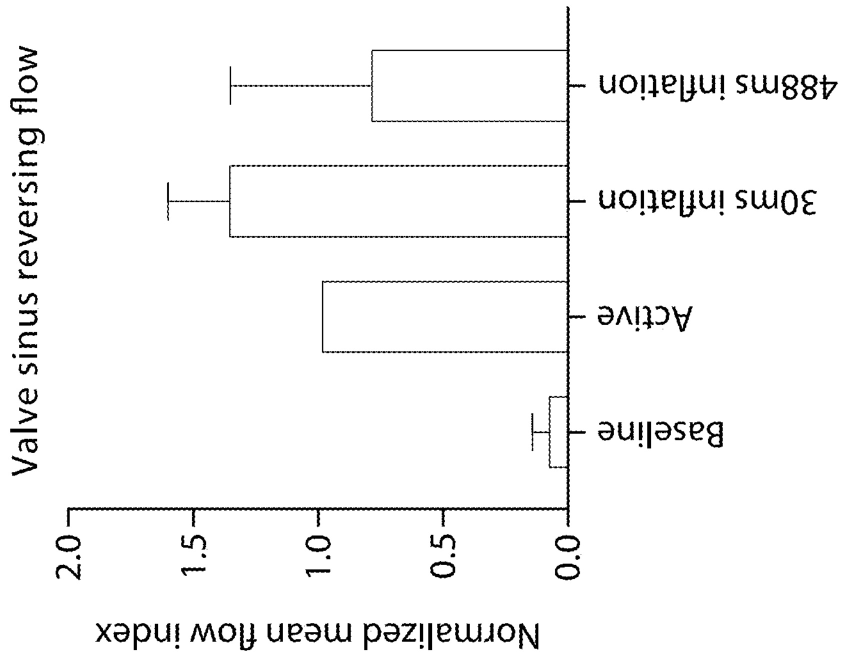

Referring to FIG. 11A, inflation times of 30 ms and 488 ms for bladder 601 are compared. The graph of FIG. 11A illustrates the time required to reach peak pressure of bladder 601 having inflation times of 30 ms and 488 ms. An inflation period of 488 ms may result in bladder 601 reaching peak pressure significantly after an inflation period of 30 ms. FIGS. 11B and 11C illustrate the mean forward venous flow (FIG. 11B) and mean reverse venous flow (FIG. 11C) averaged across multiple subjects and normalized to peak flow index during activity ("Active") for each subject. The data shows that the prolonged inflation time (e.g., 488 ms) increases forward flow (FIG. 11B, 488 ms inflation vs 30 ms inflation), but reduces the amount of reverse venous flow in the valve sinus area (FIG. 11C, 488 ms inflation vs 30 ms inflation). This indicates that having a shorter inflation time, such as 30 ms, results in achieving better reverse venous flow at the venous valve sinus area compared to longer inflation times, such as 488 ms.

As indicated above, the compression period and the time between deflation and a subsequent inflation of bladder 601 (e.g., dwell time) may comprise a full compression cycle. For example, the compression cycle may include the compression period followed by the dwell time. In some embodiments, the duration of a compression cycle may be the lapsed time from the peak pressure of one inflation to the peak inflation of the next bladder inflation. The compression cycle may include the dwell time between compression periods. In some embodiments, the dwell time between compression periods may be 20 seconds or less. For example, each compression period may have a time period less than 500 ms and each compression cycle may have duration of, for example, approximately 6 seconds, resulting in the dwell time being, for example, from approximately 5.5 seconds to approximately 6 seconds. In some embodiments, the dwell time is less than 1 seconds.

In some embodiments, the desired physiological effect is achieved by decreasing the dwell time and the presence of the ramp-up period. For example, the desired hemodynamic effect (e.g., generating oscillatory flow) may be achieved by decreasing the dwell time and adding or increasing the ramp-up period. In some embodiments, the desired hemodynamic effect is achieved by increasing the dwell time and decreasing or removing the ramp-up period. The dwell time may be the time between the end of the deflation period (Phase D) of a first compression cycle and the initiation of the ramp-up period (Phase A) of a subsequent second compression cycle. In some embodiments, the dwell time is the duration at which the pressure within bladder 601 is at a baseline pressure or at a minimum pressure.

In some embodiments, the duration of the compression cycle is 5 seconds or less. However, the time period from initiation of inflation of bladder 601 of one compression period to the initiation of inflation of bladder 601 for a subsequent compression period may be from 6 seconds to 20 seconds. In some embodiments, the number of compression cycles per minute may be based on the duration of each compressions cycle. For example, the duration of the compression cycles may be from 6 seconds to 20 seconds, resulting in 10 compression cycles per minute (6 second time period for compression cycle) to 3 compression cycles per minute (20 second time period for compression cycle).

In some embodiments, the duration of the compression cycle is 10 seconds or less. In practice, a compression cycle having a duration of approximately 5 seconds results in 12 compression cycles per minute. For example, a compression cycle of 5 seconds results in a compression period occurring every 5 seconds. RCCD 100 may be configured to provide compression cycles at a frequency ranging from 6 cycles per minute to 20 cycles per minute. In other words, RCCD 100 may be configured to provide cycles ranging from every 10 seconds, alternating 5 seconds per lower extremity, to every 3 seconds, alternative 1.5 seconds per lower extremity. In some embodiments, RCCD 100 may be configured to deliver compression cycles at a frequency of at least 3 compression cycles per minute, resulting in the compression cycles having a duration of 20 seconds or less. However, RCCD 100 may be configured to deliver compression cycles at frequency of at least 5 cycles per minute, at least 7 cycles per minute, or at least 10 cycles per minute.

In some embodiments, during each compression period of the repeating compression cycles RCCD 100 is configured to deliver substantially equivalent hemodynamic effect. For example, a first compression period may produce substantially the same hemodynamic effect as a second subsequent compression period. The frequency, the peak inflation pressure, and the duration of the compression period may be selected to stimulate endothelial FOXC2 expression in an endothelium of the valve sinus.

Figure 12A:
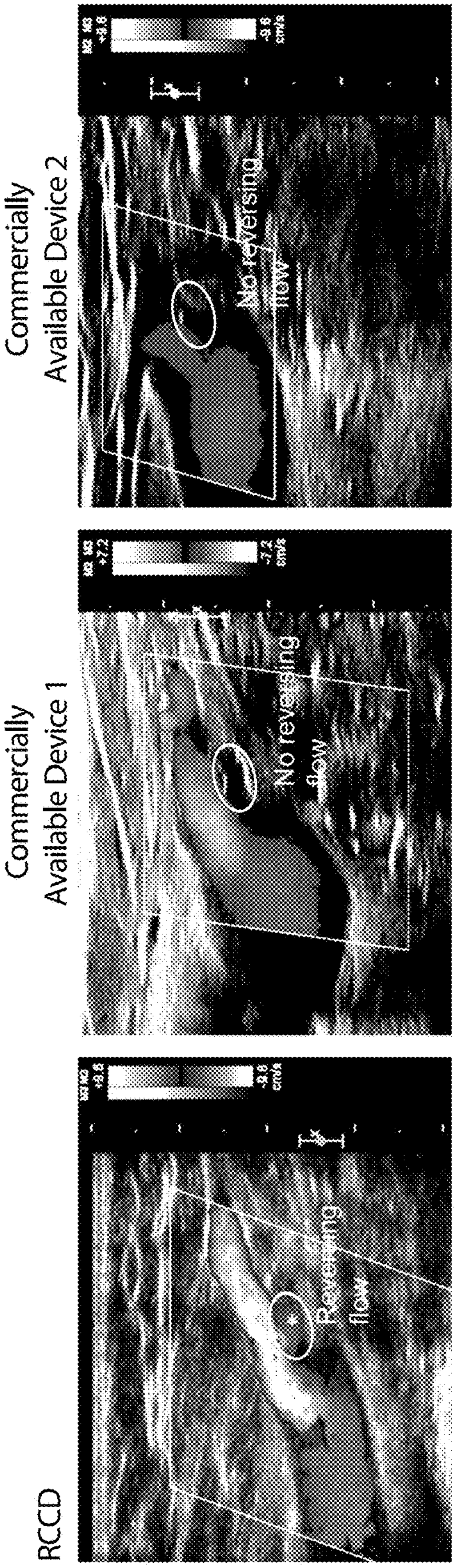
FIG. 12A is a series of ultrasound images of a venous valve sinus region during use of an exemplary RCCD and commercially available devices.

For the purpose of illustration and not limitation, FIG. 12A provides exemplary data from 2D color Doppler experiments showing blood flow patterns created at the junction of the saphenous and femoral vein (e.g., saphenofemoral junction) in a healthy human volunteer during use of RCCD 100 compared to Commercially Available Device 1 and Commercially Available Device 2. Further, Table 1 illustrates a comparison of RCCD 100 compared to Commercially Available Device 1 Commercially Available Device 2, and Commercially Available Device 3. RCCD 100 may be placed on the upper calf (e.g., between the widest portion of the calf and the knee), whereas Commercially Available Device 1 Commercially Available Device 2, and Commercially Available Device 3 are placed on the calf, such as the widest portion of the calf or between the foot and the widest portion of the calf.

TABLE 1

Comparison of RCCD with Commercially Available Devices 1, 2, and 3

| | RCCD (exemplary) | Commercially Available Device 1 | Commercially Available Device 2 | Commercially Available Device 3 |
|---|---|---|---|---|
| Area of compression | Upper Calf | Calf | Foot | Calf |
| No. of bladders | 1 | 1 | 1 | 2 |
| Peak pressure | 100 mmHg | 40 ± 5 mmHg | 200 mmHg | 55-65 mmHg (proximal bladder) 70-80 mmHg (distal bladder) |
| Inflation Time | 0.03 s | 12 s | 0.4 s | 0.5-1 s |
| Hold Time | 0.150 s | 0 s | 3 s | 5 s |
| Deflation | 0..06 ms | 48 s | 20 s | 5 s |
| Cycles/ minute | 12 (alternating left and right legs) | 1 (alternating left and right legs) | 2 (alternating left and right legs) | 2 (alternating left and right legs) |

For testing purposes, ultrasound imaging of the saphenofemoral junction when RCCD 100 was in use was compared to commercially available devices. The saphenofemoral junction is an area of the deep venous system in the groin, which is the area where typical clinically significant VTE blood clots form. Images showing blood flow captured during the compression event of each device, and reverse venous flow was detected by color Doppler that distinguishes between flow direction. Reverse venous flow within the sinus of the venous valve (white circle) indicates an oscillatory flow period. This reverse venous flow pattern was observed during use of RCCD 100 described above (indicated with a white star).

Figure 12B:
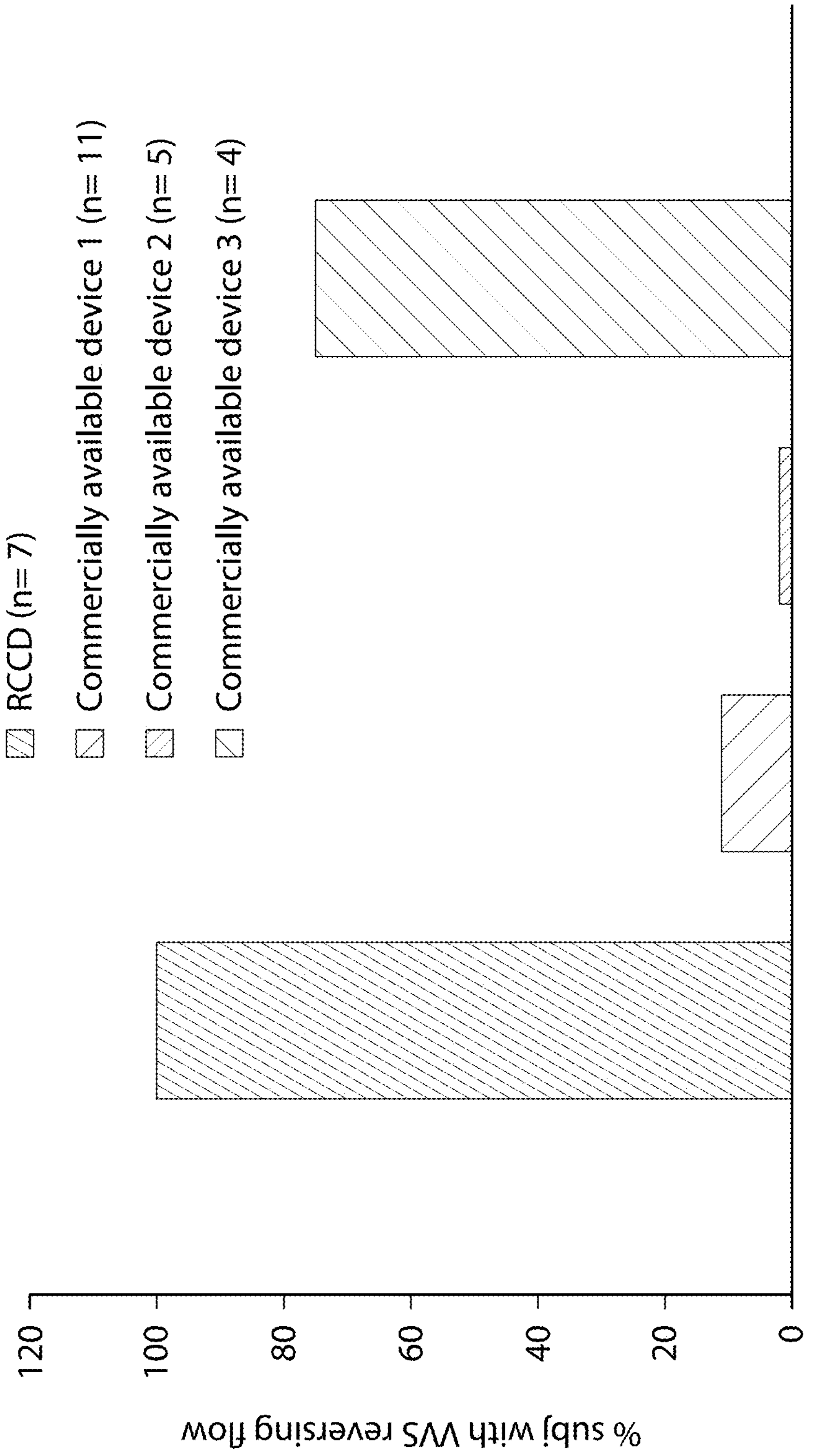
FIG. 12B is a graph of the percentage of subjects with reverse venous flow during use of an exemplary RCCD and commercially available devices.

FIG. 12B provides a quantification of the percent of subjects studied who were observed to have reverse venous flow at the venous valve sinus area during the use of each device: RCCD 100, Commercially Available Device 1, Commercially Available Device 2, and Commercially Available Device 3. In this experiment 100% of subjects had reverse venous flow with RCCD 100 described herein, and less than 100% of subjects had reverse venous flow with the other commercially available devices: Commercially Available Device 1, Commercially Available Device 2, and Commercially Available Device 3. These results show that compressions of the lower extremity using RCCD 100 is sufficient to create-oscillatory flow in the valve sinus area at the saphenofemoral junction that substantially replicates active muscle movements in 100% of subjects tested, while the Commercially Available Device 1 created oscillatory flow in approximately 11% of subjects tested, Commercially Available Device 2 created oscillatory flow in 0% of the subjects tested, and Commercially Available Device 3 created oscillatory flow in approximately 75% of the subjects tested.

Figure 13A:
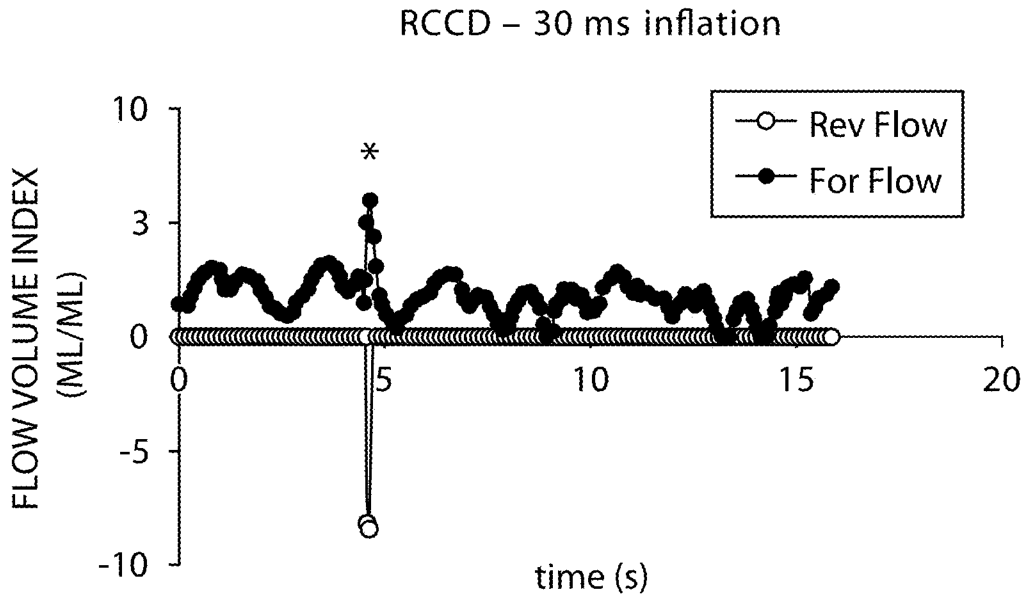
FIG. 13A is a graph of exemplary forward flow and reverse flow during use of an exemplary RCCD.
Figure 13B:
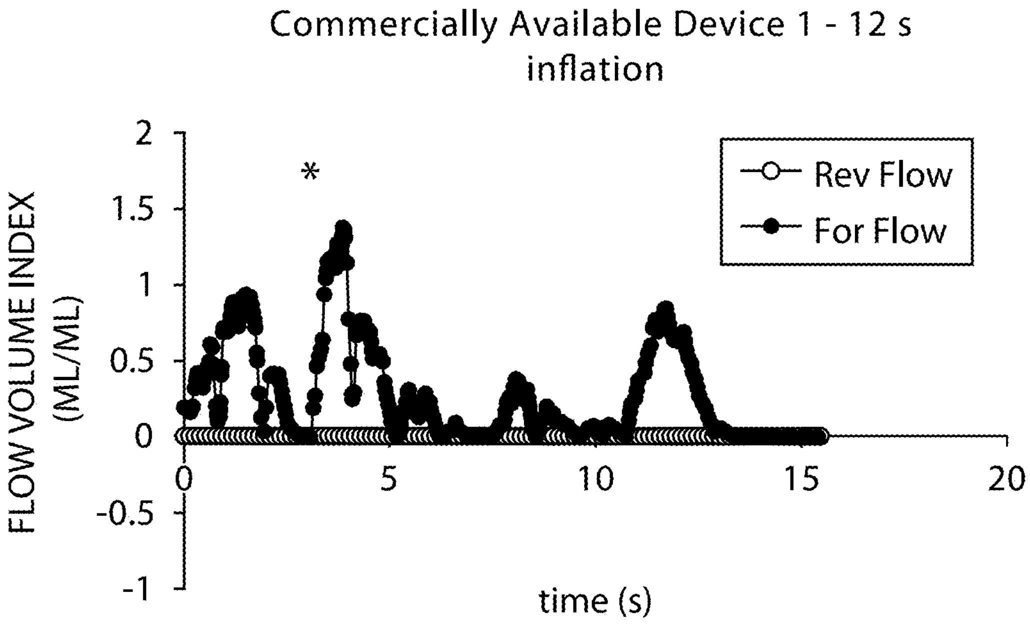
FIG. 13B is a graph of exemplary forward flow and reverse flow during use of a commercially available device.

FIGS. 13A and 13B illustrate exemplary velocity flow index traces of reverse venous flow and forward venous flow from the venous valve sinus area during compressions provided by RCCD 100 (FIG. 13A) and Commercially Available Device 1 (FIG. 13B). The (*) indicates the time of initiation of device compressions provided by RCCD 100 (FIG. 13A) and Commercially Available Device 1 (FIG. 13B). The traces of FIG. 13A shows the rapid forward venous flow and reverse venous flow that is induced by compressions provided by RCCD 100, in addition to the rapid return of baseline flow levels. The Commercially Available Device 1 trace shown in FIG. 13B indicates the prolonged increase in forward venous flow after compression followed by a period of depressed baseline venous flow due to the reduction of forward venous flow. This is a common occurrence of commercially available compression devices, where following compression, venous pressure needs to be restored to pre-compression levels before an additional compression can be applied to create similar flow increases. Data from testing of RCCD 100 indicates that brief compressions applied to the patient do not create a significant period of reduced venous pressure.

Further, these findings demonstrate why commercially available devices with prolonged compression periods require 30-60 second dwell times between compression cycles to allow for venous pressures to return to normal. Without restored venous pressures, subsequent compression events would not stimulate the same hemodynamic effect thereby limiting the benefits of the commercially available devices, and the ability of the compression to induce valve sinus oscillatory flow needed to stimulate the anti-thrombotic genetic program. For instance, an additional commercially available device, for example, Commercially Available Device 3, cites the need for at least 30 seconds between compression events per lower extremity to maintain hemodynamic efficacy as cited in U.S. Pat. No. 5,588,955.

Studies using Doppler ultrasound in the deep veins of the groin, the typical site of proximal DVT formation (e.g., saphenofemoral junction or common femoral valves), have shown that commercially available devices, such as Commercially Available Devices 1 and 2, do not create valve sinus oscillatory flow at those valves due to slow compression speeds in many of the subjects tested.

Figure 14:
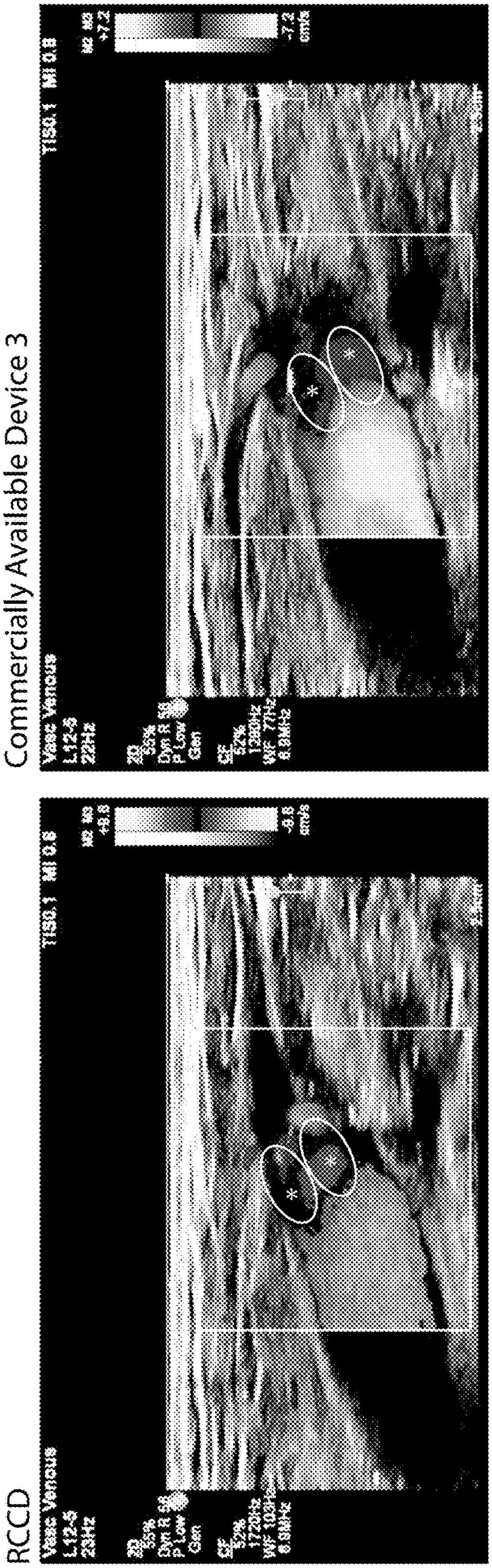
FIG. 14 illustrates the efficacy of an exemplary RCCD at creating valve sinus oscillatory flow compared to commercially available devices.

FIG. 14 shows that the existing Commercially Available Device 3 also creates oscillatory flow in some subjects imaged during initial compression. Commercially Available Device 3 inflates from a baseline pressure to peak pressure in 0.5 s-1 s, and provides prolonged compression that does not extend or enhance the oscillatory flow signal. Further, the inflation cycle of Commercially Available Device 3 is once per minute per leg to allow for the venous pressure to return to normal levels so that subsequent compression will elicit a hemodynamic effect, which limits the amount of total oscillatory flow created over time.

Figure 15A:
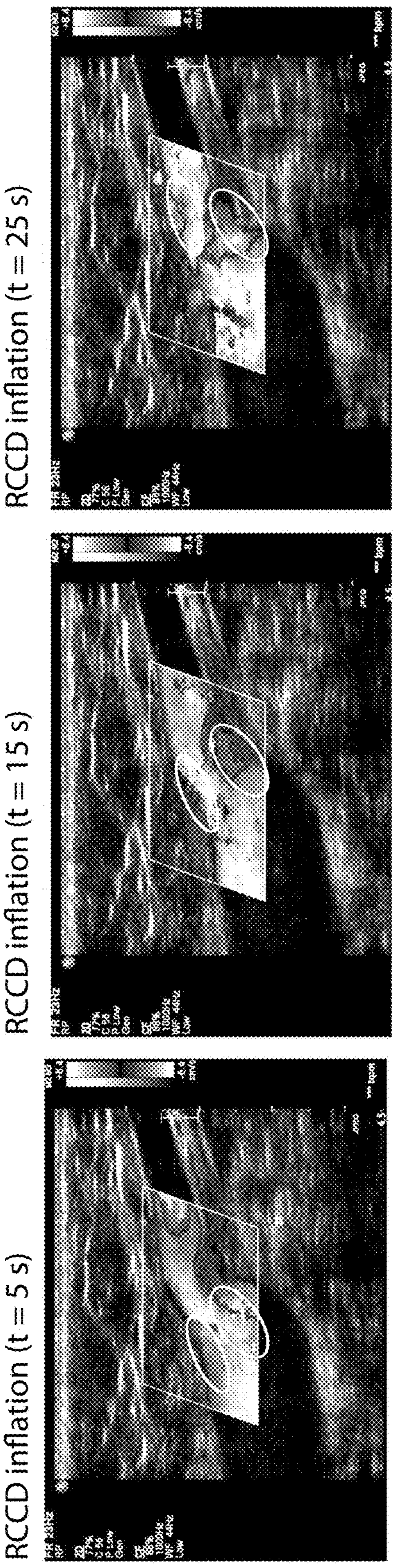
FIG. 15A is a series of ultrasound images of a venous valve sinus region during use of an exemplary RCCD taken at various inflation times.

FIG. 15A shows how the rapid cycling of RCCD 100, which creates oscillatory flow at the valve sinus during each compression event in a single lower extremity at 10 second intervals, which, in some embodiments, would be 6 times the rate of oscillatory flow creation of a commercially available device, such as Commercially Available Device 3, that had a typical compression frequency. Active muscle actions create oscillatory flow within the sinus of venous valves, so to replicate the number of oscillatory flow pulses created by 15 minutes of ambulation (assuming 1.5 steps per second during ambulation) would require 11.25 hours of continuous use of a typical compression system, and only 1.875 hours of use of RCCD 100. Patient compliance with mechanical compression devices is well known to be poor, which suggests that the system that can create the most oscillatory flow within a shorter period of time will have a better chance of being clinically effective even with expected levels of compliance.

Figure 15B:
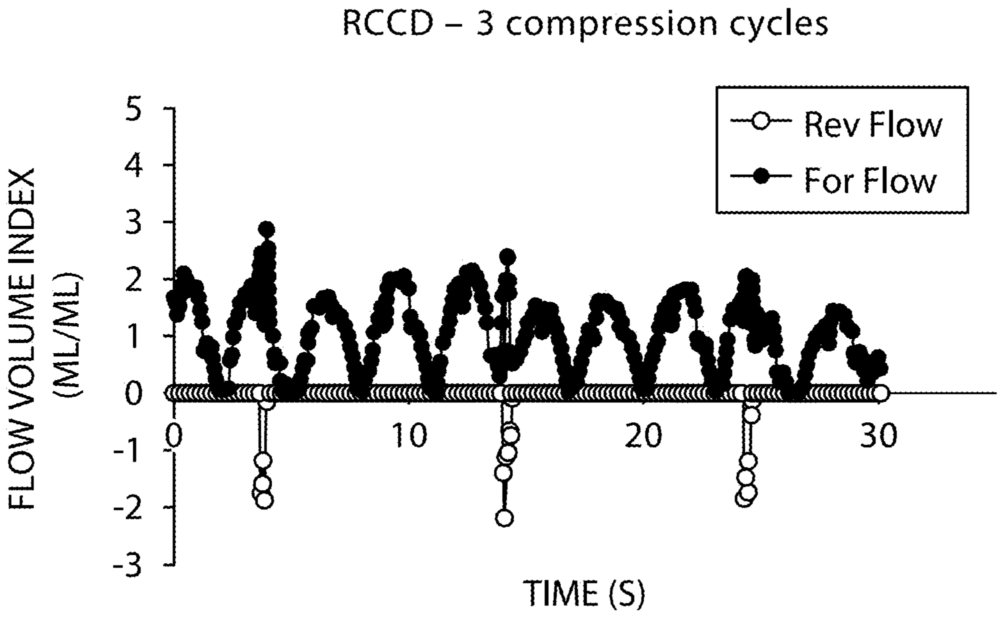
FIG. 15B is a graph of forward flow and reverse flow during use of an exemplary RCCD over 3 compressions cycles.

Referring to FIG. 15B, the graph shows that over 3 compression cycles the amount of oscillatory flow does not significantly vary. For example, the graph of FIG. 15B includes forward flow (black dots) and reverse flow (white dots) in the venous valve sinus of a patient during 3 consecutive compressions. The data shows that the baseline flow is not decreased after the compressions, and that each compression provided by RCCD 100 is capable of creating robust valve sinus reverse venous flow. This consistent finding indicates that the rapid cycling compression provided by RCCD 100 does not deteriorate in hemodynamic efficacy even at a rate of inflation 6 times faster than other commercially available devices, such as Commercially Available Device 3.

Further, the data provided in FIGS. 15A-15B illustrate no increase in flow upon deflation, which is a measure of blood trapping. When other commercially available devices deflate there is a brief increase in flow followed by a period of depressed flow as the veins need to refill. RCCD 100 limits or prevents both these trapping and refill effects.

Figure 16:
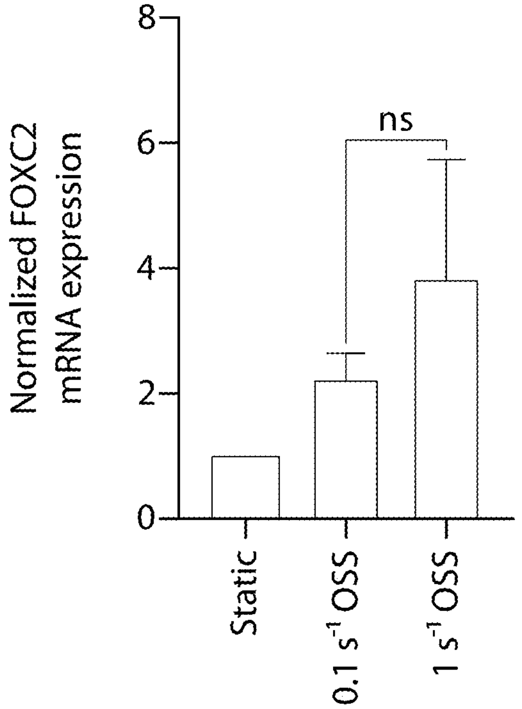
FIG. 16 is a graph reflecting experimental data of normalized FOXC2 expression in human endothelial cells cultured under flow that reverses at various.

Human lymphatic endothelium cells (LECs) have previously been used as a model of oscillatory shear stress induced activation of FOXC2, which is the transcription factor responsible for the antithrombotic genetic program expressed in the endothelium of the sinus of venous valves in healthy individuals. Those studies used a 1/s frequency of flow reversal to activate FOXC2 expression in human LECs and demonstrated the sufficiency of reversing flow patterns to activate FOXC2. FIG. 16 shows results from experiments testing the methodologies of RCCD 100, where human LECs were cultured either under static conditions, mimicking immobility, or under flow for 24 hours. For the cells cultured under flow, the flow would reverse directions for less than 1 s at a frequency of 0.1/s of was used to mimic recirculatory flow induced by RCCD 100, and was compared to a flow reversal frequency of 1/s, the current model frequency for flow-induced expression of FOXC2. The 0.1/s frequency, such as the frequency used in RCCD 100 in some embodiments, increased FOXC2 expression compared to static (e.g., immobility), which induced no reverse flow across the cells. Further, the degree of FOXC2 stimulation was not significantly different between the 1/s frequency and the 0.1/s frequency. This demonstrates that the frequency of compressions provided by RCCD 100, in some embodiments, is sufficient to stimulate FOXC2 activation, which is the causative molecular event to activate the anti-thrombotic gene program and prevent DVTs.

RCCD 100 may produce the reverse venous flow in the valve sinus that is created by "eddies" that occur as an initial pulse of blood, created by the rapid bladder inflation, passing the valve leaflets. In some embodiments, however, increasing the duration of compression is not expected to contribute significantly to the effect. In one embodiment, RCCD 100 does not hold the compression for several seconds afterward inflation. For example, RCCD 100 may hold the compression for 500 ms or less, 400 ms or less, 300 ms or less, 200 ms or less, or 100 ms or less. Some embodiments provide for the ability of RCCD 100 to create a maximal number of pulses of oscillatory flow through being pneumatically efficient to allow for the air tank to be refilled rapidly to allow for inflation events every 3 seconds. In some embodiments, RCCD 100 provides for the ability to optimize compression force and area to prevent venous pressure from being depleted such that rapid cycling produces consistent hemodynamic effects on the blood flow, which is noted by studies of commercially available devices to be a limiting factor in their cycle rates.

In some embodiments, RCCD 100 is configured to produce eddies (e.g., such as those described above) that are located proximate to the sinus of the venous valves. In one example, eddies are, slightly downstream from the valve, towards the heart. In some embodiments, eddies may be disposed between the valve leaflet and the vessel wall on the downstream side of the valve. In some embodiments, RCCD 100 is configured to produce eddies that extend downstream (proximal) from the valve at a length equivalent to the size of approximately two valve leaflets. In some embodiments, eddies produced proximate the venous valves occur where the valve leaflet rests against the vein wall when the valve is open. Although the effects and eddies due to RCCD 100 are shown at the valves of the femoral and popliteal veins, the effects and eddies due to RCCD 100 may be shown at other deep vein valves. In some embodiments, the use of RCCD 100 results in the presence of eddies at venous valves disposed between the knee and hip of the wearer.

In one embodiment of the system, device and method of the present disclosure, pulses of flow are created at cycle times that are 3 seconds to 10 seconds. However, pulses of flow may be created at cycle times from 3 seconds to 20 seconds, from 6 seconds to 15 seconds, or from 8 seconds to 12 seconds. The rapid pulses of flow allow for the oscillatory flow stimulation of the anti-thrombotic genetic program to occur, for example, every 10 seconds per lower extremity. In some embodiments, RCCD 100 is configured to allow for the oscillatory flow stimulation of the anti-thrombotic genetic program to occur, greater than 10 times per minute, greater than 5 times per minute, or greater than 3 times per minute. Molecular studies have shown that frequent oscillations of flow are the physical stimulus for the activation of PROX1 and FOXC2 in human endothelial cells, and those transcription factors activate the anti-thrombotic program that prevents VTE.

Figure 17A:
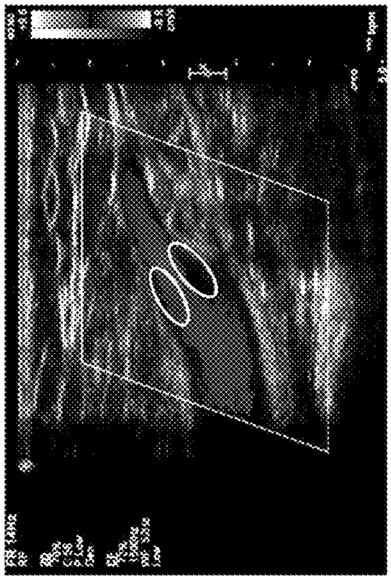
FIGS. 17A-17C are ultrasound images of venous flow based on a baseline, during calf flexion, and during use of exemplary RCCD.
Figure 17B:
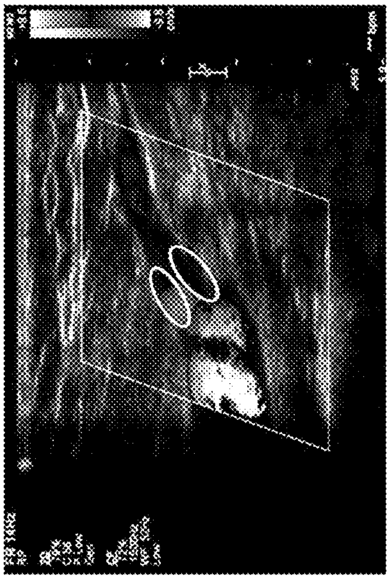
Figure 17C:
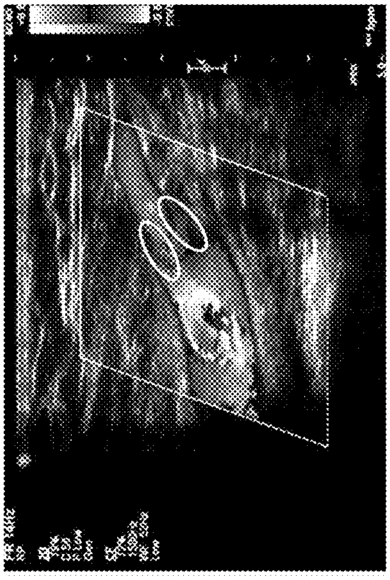
Figure 17D:
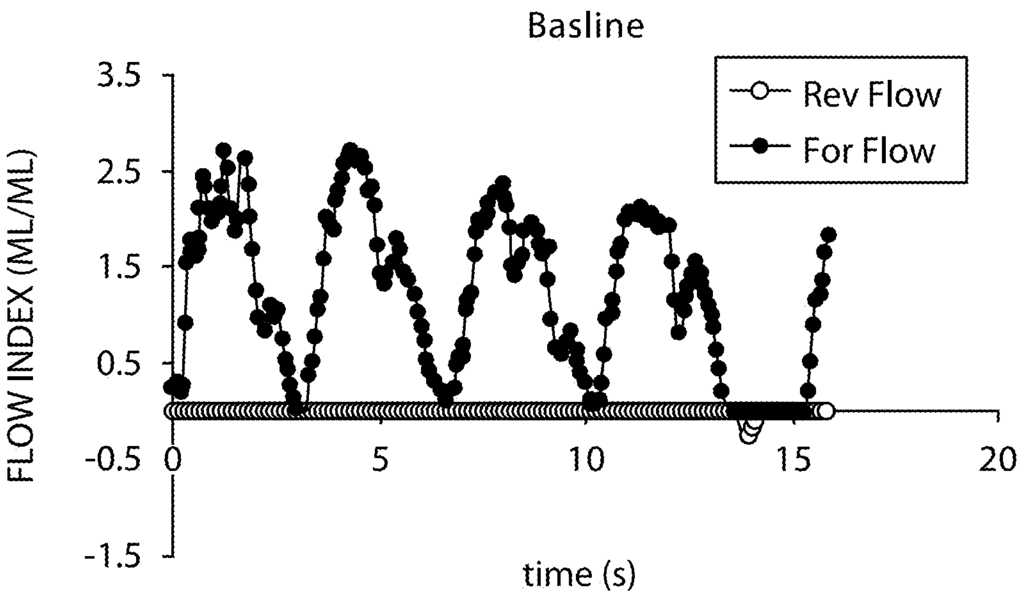
FIGS. 17D-17I are graphs of forward flow and reverse flow based on a baseline, during calf flexion, and during use of exemplary RCCD.
Figure 17E:
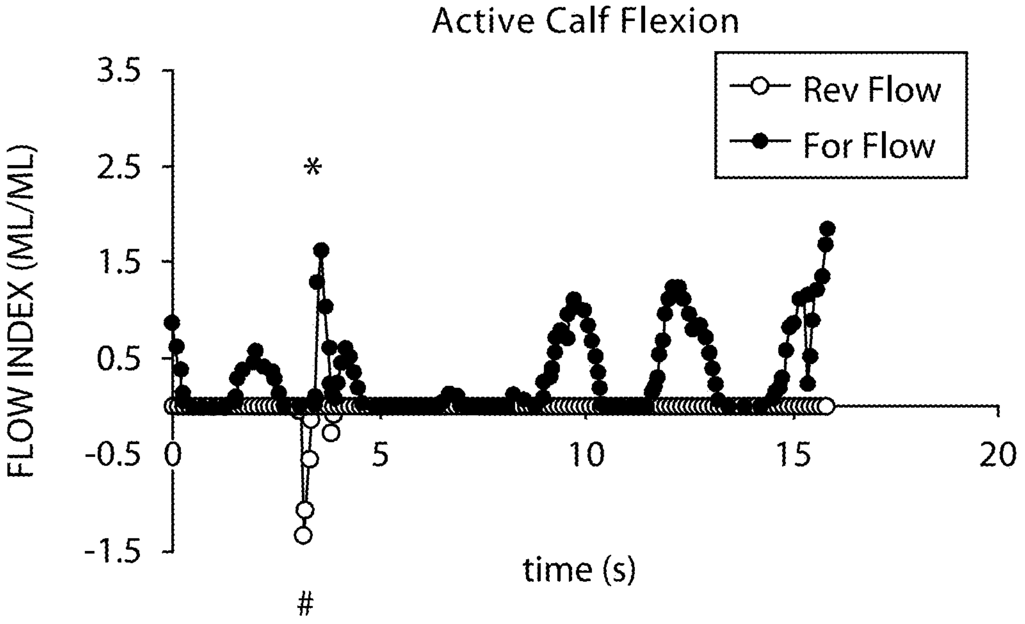
Figure 17F:
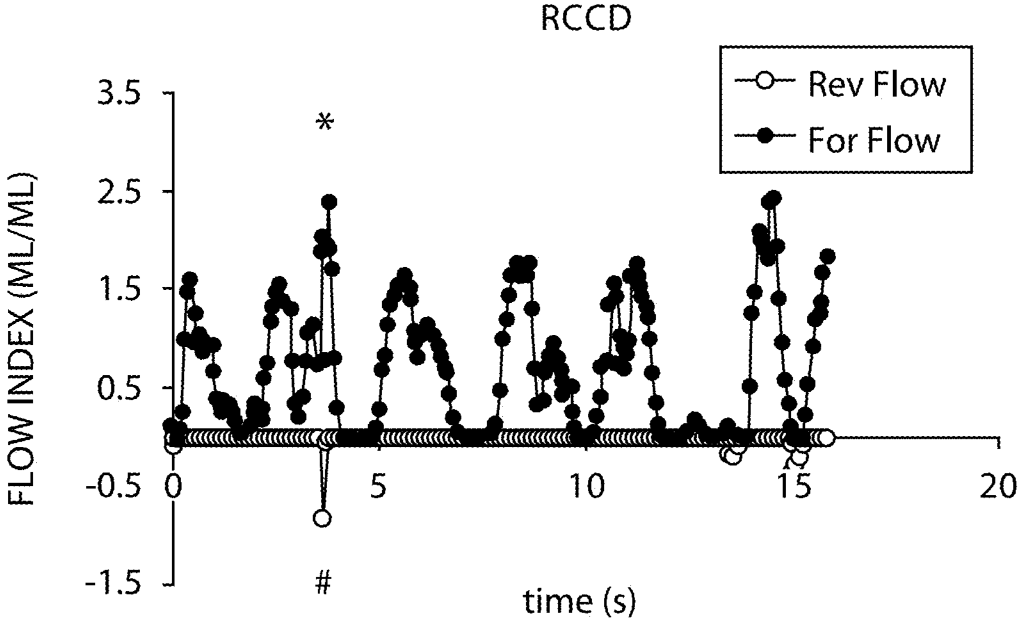
Figure 17G:
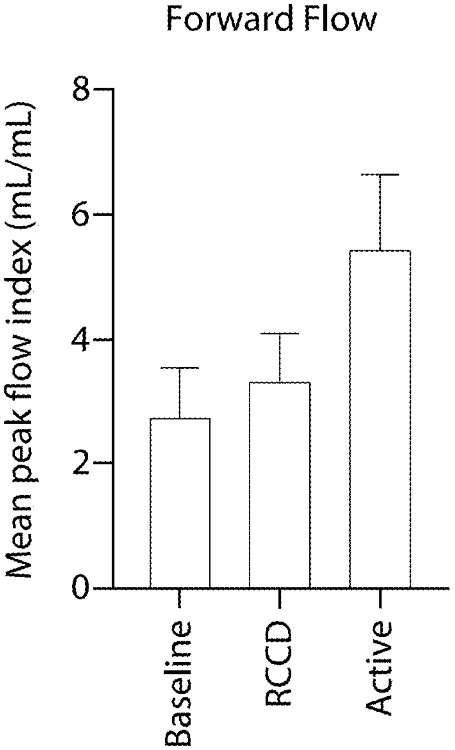
Figure 17I:
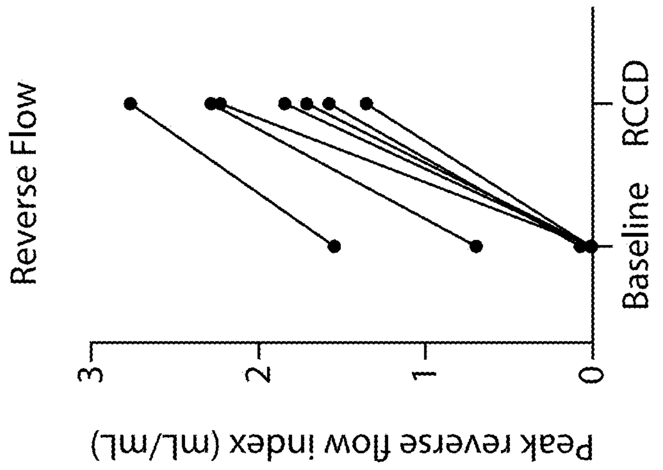
Figure 17H:
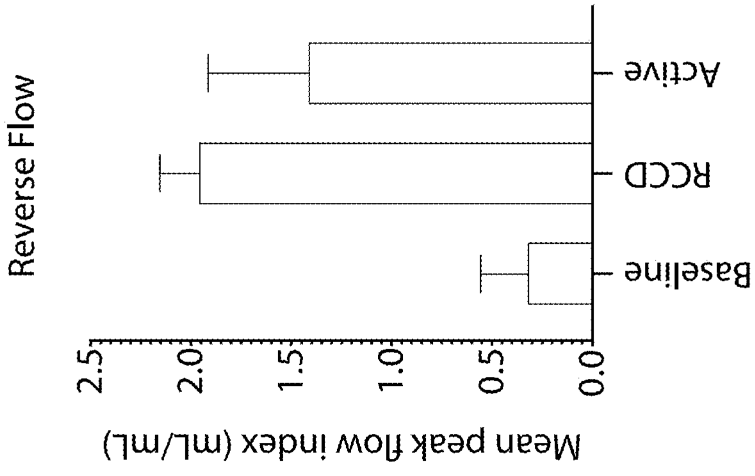

FIGS. 17A-17C shows how venous flow at a deep vein valve is affected during active calf flexion or during RCCD compression compared to baseline flow during immobility. FIG. 17D-17F illustrate the mean forward flow index (black dots) and reverse venous flow index (white dots) for a single subject during baseline immobile flow, during an active calf flexion movement (* indicates the moment of movement), and during RCCD compression (*indicates the compression period). FIG. 17G-17H show the peak forward index (FIG. 17G) and the peak reverse flow index (FIG. 17H) averaged across multiple subjects. FIG. 17I shows that in all subjects tested RCCD compression increased the reversing flow index compared to immobility with each tested subject shown as a pair of black dots corresponding to the flow response of each treatment. The data shows that compressions provided by RCCD 100 having durations of 30 ms inflation, 150 ms hold, and 60 ms deflation create significantly more reverse venous flow than during immobility and during activity, such as calf flexion. Further, the data shows that compressions provided by RCCD 100 having durations of 30 ms inflation, 150 ms hold, and 60 ms deflation create significantly more forward flow than during immobility and less forward flow than during activity, such as calf flexion. However, as stated herein, optimizing reverse flow provides greater anti-thrombotic effects compared to optimizing forward flow specifically within the valve sinus area.

FIG. 18 provides a table showing the comparison of the number of compression events experienced by a user assuming 30% compliance. Reporting compliance as a percentage is indicative of the time a patient uses a device relative to the time that the patient's treatment protocol required. For example, a patient may be given a treatment protocol by a medical professional to use RCCD 100 for a predetermined amount of time (e.g., 3 hours) in a given time period (e.g., per day). In this example, a patient who uses RCCD 100 for 1 hours is 33% compliant. The low cycle time (e.g., 5-6 cycles a minute) provided by RCCD 100 allows for a higher number of compressions creating increased number of flow pulses that provide the activating signal of the molecular program and also physically wash out the valve sinus thereby providing physical and biochemical protection. For example, at 30% compliance of a typical 24-hour treatment protocol for DVT prevention, RCCD 100 provides approximately 5184 compressions a day, compared to only 432 compressions provided by Commercially Available Device 1 and 864 compressions provided by Commercially Available Device 2 and Commercially Available Device 3. Therefore, a user operating at 30% compliance would be required to use RCCD 100 for shorter duration compared to Commercially Available Device 1 or Commercially Available Device 2 to get the same amount compressions and benefits, such as reverse flow generating anti-thrombotic pathways.

Figure 19A:
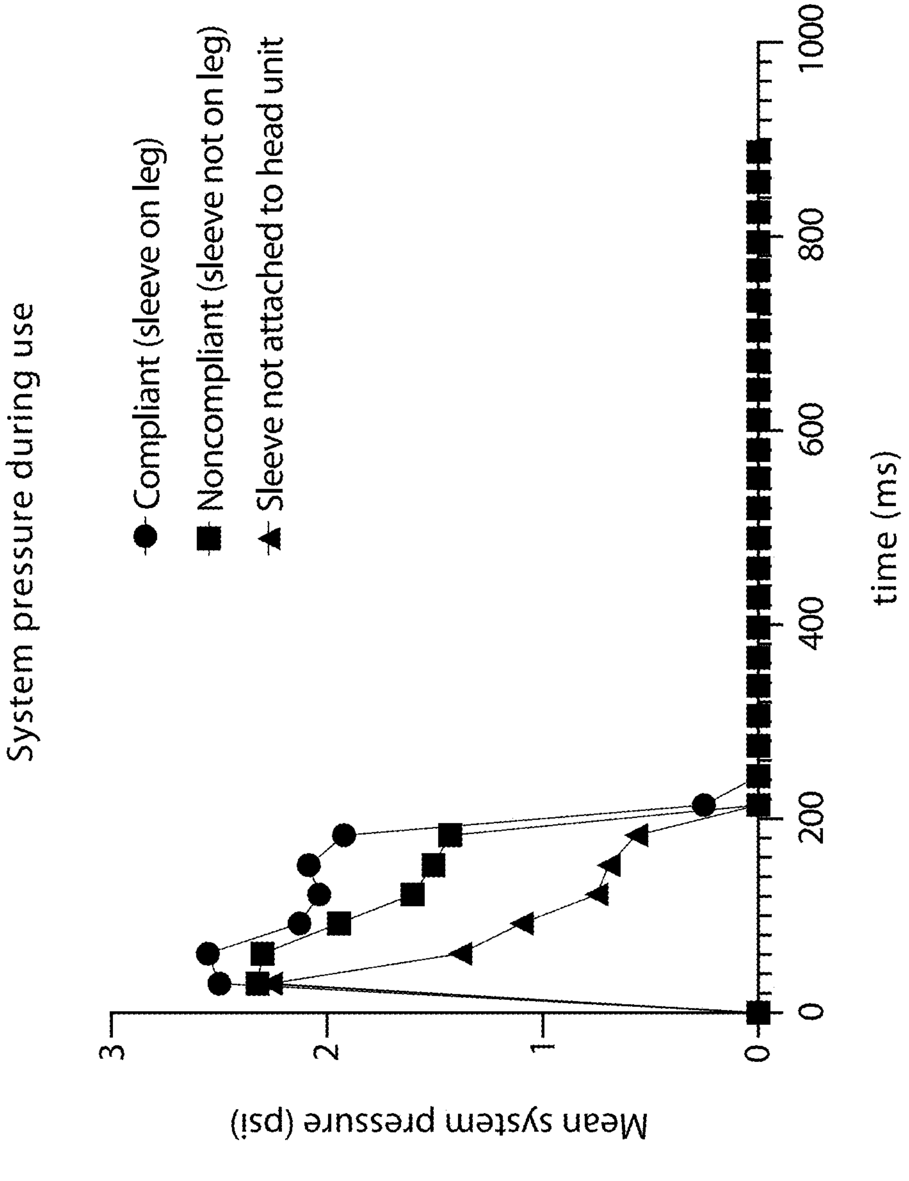
FIG. 19A is a graph of mean system pressure over time based on compliant, non-compliant, and sleeve detachment uses of an exemplary RCCD.
Figure 19B:
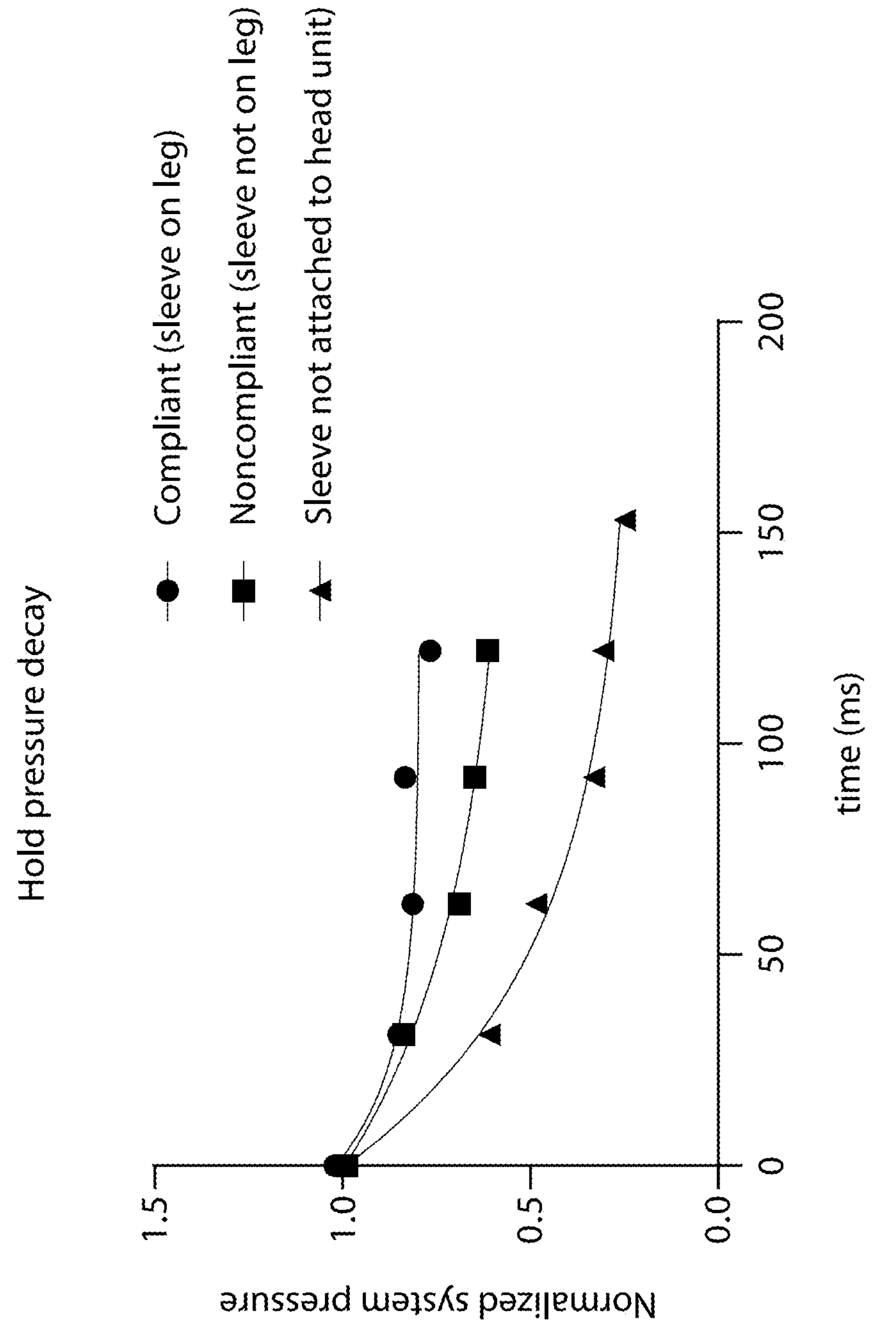
FIG. 19B is a graph of normalized system pressure over time based on compliant, non-compliant, and sleeve detachment uses of an exemplary RCCD.

FIGS. 19A-19B illustrate compliance tracking when using RCCD 100. FIG. 19A illustrates a graph of the average system pressure readings provided by sensor 221 during inflation of bladder 601 by RCCD 100 while fully hooked up and applied to a patient's leg extremity (compliant), hooked up but not applied to a patient's leg (non-compliant), and when the sleeve was not properly attached to head unit 101 causing air leakage (sleeve not attached). During these various conditions the pressure monitored by sensor 221 varied during the Phase II hold period of RCCD 100.

FIG. 19B illustrates normalized curves of the pressure decay from the peak pressure provided by RCCD 100 to the end of Phase II holding period. During compliant and non-compliant uses the peak pressure was reached at 60 ms, which is 30 ms after the initial inflation period of 30 ms. The decay of the pressure during Phase II was consistent and easily fit with one phase exponential decay curves. RCCD 100 may include a processor, which may analyze these curves and detect patient compliance and system leakage to alert medical staff using alarms and indicators. RCCD 100 may also allow for prescriptive use. For instance, if it is determined that 10,000 compressions are sufficient per day to achieve maximal protection from DVT then RCCD 100 may count 10,000 compliant compressions during a 24-hour widow and halt activity when that is achieved. This will reduce the amount of time that patients are required to use and/or interact with RCCD 100, allowing for less disrupted sleep and also encourage compliance that will be rewarded with goal achievement and device removal.

In some embodiments, RCCD 100 may be configured to monitor compliance. For example, RCCD 100 may determine the pressure of bladder 601 during the repeating compression period and compare the pressure of bladder 601 to a non-compliant bladder pressure. The non-compliant bladder pressure may be a pressure of the compression bladder when the compression bladder is not applied to the anatomical region or a pressure of the compression bladder during an air leakage. RCCD 100 may be configured to alert the patient or user (or other person, e.g., medical practitioner or caretaker) if the pressure of bladder 601 is less than or equal to the non-compliant bladder pressure for a predetermined amount of non-compliant inflations during a predetermined compliance time period. In some embodiments, the predetermined compliance time period is twenty-four hours. However, the predetermined amount of time may be 1 hour, 6 hours, 12 hours, 24 hours, 36 hours, 48 hours, 72 hours, 1 hour or less, less than 24 hours, or greater than 24 hours. In some embodiments, an alert or alarm may indicate compliance with a treatment protocol of the patient's use with RCCD 101. In one embodiment, compliance with a treatment protocol indicates that the patient does not need to use RCCD 100 for a predetermined compliance time period, such as 24 hours. In some embodiments, compliance with a treatment protocol includes meeting a predetermined threshold for a predetermined period of time to indicate that the threat of a DVT occurrence has been prevented or mitigated.

The images from the studies, such as, for example, FIGS. 8A and 15A, provided herein were at the saphenofemoral junction or common femoral trifurcation, unless indicated otherwise. These were imaged at the stereotypical site of venous valves. Venous flow was analyzed by ultrasound for flow direction and velocity at the site of venous valves using 2D color Doppler imaging. Subjects were between the ages of 25 and 75 with no history of venous disease, and were an even mix of female and male. The veins were examined in transverse section to identify venous valves by visualizing the valve leaflet and turbulent flow in the sinus with duplex ultrasonography. Venous flow was measured using 2D color Doppler with the volunteer prone either not moving, during active foot dorsiflexion, or during the compression cycle of a compression device. The ultrasounds were performed with either a Mindray M9 portable ultrasound machine with an L12-4s linear array ultrasound transducer, or a Phillips EPIC 7G with an L12-3 transducer.

In some instances, clots from DVTs obstruct flow in local veins causing expansion of conduit vessels (often in the form of varicosities) and also physically damages the valve where the clot forms and other local valves in contact with the clot. After the DVT resolves one or more of these valves may remain damaged and may chronically fail to prevent regurgitation of flow. This may result in chronic pain, swelling, and redness in the affected extremity, which is clinically referred to as post-thrombotic syndrome or post-phelbitic syndrome. RCCD 100 may be configured to repair damaged venous valves. For example, RCCD 100 may be configured to induce oscillatory flow based on the compression cycles generated by RCCD 100. RCCD 100 is configured to create recirculatory or oscillatory flow in the sinus of venous valves, which is known to stimulate local FOXC2 and PROX1 expression. FOXC2 and PROX1 are both responsible for the local anti-thrombotic gene program and are also required for valve formation and maintenance. The loss of FOXC2 and PROX1 leads to the regression of valves. Therefore, the loss of local flow conditions post-DVT clots can disrupt the natural endothelial expression of FOXC2 and PROX1 in the damaged valve endothelium leading to an inability to repair the damage and form a competent valve. In some embodiments, the rapid compressions provided by the repeating compression cycles of RCCD 100 maximizes the number of recirculatory flow events in the user thereby stimulating the restoration of FOXC2 and PROX1 in the damaged valve to drive valve restoration and the resolution of the symptoms.

In some embodiments, use of RCCD 100 repairs damaged venous valves in subjects. In practice, a subject may be selected from a population having a damaged venous valve. Bladder 601 may be applied to a subject between the subject's knee and a midpoint of the subject's gastrocnemius muscle. Bladder 601 may be inflatable to apply pressure to a portion of the subject's gastrocnemius muscle. In some embodiments, bladder 601 is inflated to deliver a peak inflation pressure of compressed air at a compression period and a frequency to induce circulatory flow in a venous valve sinus of the subject on successive compression cycles of bladder 601 at a frequency of at least 3 cycles per minute. Bladder 601 may be inflated to a target ramp-up pressure during a ramp-up period and then rapidly inflated to the peak inflation pressure during a pulse period. The pressure may be maintained in bladder 601 at a holding pressure range for a holding period subsequent to the pulse period. The pressure within bladder 601 may be deflated to a minimum pressure subsequent to the holding period. In some embodiments, the minimum pressure is less than the target ramp-up pressure. The frequency, the peak inflation pressure, and the compression period may be selected to stimulate endothelial FOXC2 expression in an endothelium of the valve sinus.

The disclosed subject matter provides rapid cycling venous thromboembolism mitigation or prevention devices for generating venous valve oscillatory flow in the leg veins of an immobile person at a physiological rate. In one embodiment, these devices are configured to increase oscillatory flow in venous valve sinus and adjacent valve leaflet to drive the expression of FOXC2 and PROX1 transcription factors. In certain example embodiments, the device includes an air pump controller that pneumatically connects to an inflatable wearable device, referred to herein as a garment, that is rapidly inflated and deflated to compress the soft tissue of the leg to create oscillatory flow in the valve sinus with a high frequency. The rapid compression induced by the device generates venous valve oscillatory flow throughout the leg veins of the immobile person to preserve the natural mechanism of DVT prevention associated with muscular activity, and rapidly cycles to mimic the rate of oscillatory flow periods that occurs during ambulation as closely as possible.

In certain embodiments, the inflatable garment wraps around the calf of the user and the inflation bladder is positioned on the back of the calf to efficiently compress the soft tissue of the calf. In certain example embodiments, the bladder has an area ranging from 6 to 60 square inches, to provide a sufficient area of compression to create a pulse of blood flow, that creates oscillatory flow in the valve sinus of deep veins, during compression. In certain embodiments the compression area can consist of one or more bladders that inflate simultaneously or in rapid succession. In some embodiments, the inflatable garment is disposed around the leg of the user such that a majority of the inflation bladder is disposed between the user's knee and a midpoint of the user's gastrocnemius muscle. The inflation bladder may be configured to have different sizes based on the amount of the calf the bladder is configured to compress. For example, the inflation bladder may have a size for a full calf (e.g., 11"×5"), half calf (e.g., "5×5"), or a calf band (2.5"×5").

In certain embodiments, the head unit further includes an air compressor and a compressed air tank, wherein the air compressor is adapted to fill the compressed air tank with compressed air to a pre-determined pressure and the compressed air tank is adapted to release the compressed air to the inflation bladder. In some embodiments, the compressed ais fills the inflation bladder to the desired pressure in 0.5 seconds or less. In some embodiments, the compressed ais fills the inflation bladder to the desired pressure in 0.4 seconds, in 0.3 seconds in 0.2 seconds or in 0.1 second. In certain embodiments, the head unit also includes a solenoid valve, adapted to regulate the release of the compressed air from the compressed air tank to the inflation bladder. The head unit can include at least one pressure sensor, adapted to monitor air pressure of the compressed air tank and restore the air pressure to the pre-determined level, and at least one pressure relief valve, adapted to monitor air pressure of the inflation bladder and prevent over-inflation thereof.

In certain embodiments, the head unit compressed air tank is at least 2 times the volume of the inflatable bladder so that the tank can be rapidly refilled to the target pressure between inflations to allow for rapid cycling. In certain embodiments, the solenoid valves open for 50-300 milliseconds and then closes immediately to inflate the bladder rapidly and allow for rapid decompression of the bladder when closed. In certain embodiments, the air tank pressure is set to 1.5-3 times the target pressure of the inflatable bladder. In some embodiments setting the air tank pressure to 1.5 to 3 times the target pressure of the inflatable bladder allows for rapid inflation of the bladder to a pressure that creates sufficient compressive force over the surface area of the bladder to stimulate rapid blood.

The inflation bladder can be shaped a rectangle and be tapered to match the profile of an example calf to improve the bladder contact with the calf. In certain embodiments, the inflatable bladder wraps around the calf to apply pressures to the sides of the calf. The inflation bladder may be sized and shaped based on the desired amount of calf covered. For example, the inflation bladder may be sized and shaped to fully cover the back of the calf, to cover half of the back of the calf, or be a band disposed on the calf.

Embodiments of the present disclosure are directed to a deep vein thrombosis mitigation device including a compression bladder coupled to an air compressor assembly via a conduit, the compression bladder being configured to be worn by a patient at an anatomical region defined by a knee of the patient and a widest portion of a calf of the patient and the air compressor assembly being configured to deliver air to inflate the compression bladder through the conduit in repeating compression cycles comprised of compression periods. During each of the repeating compression cycles a pressure in the compression bladder is raised from a baseline pressure to a peak pressure and lowered from the peak pressure to a baseline pressure within a predetermined time period referred to herein as a compression period. In some embodiments, the compression period is less than 500 milliseconds (ms). In some embodiments, the compression period is less than 300 ms.

In some embodiments, the compression period includes an inflation period, a holding period, and a deflation period. The inflation period may be defined as the period from an initial baseline pressure to a peak pressure. The holding period may be defined as the period from the peak inflation pressure to a holding end point which is prior to the pressure in the bladder returning to a baseline pressure. The deflation period may be defined as the period from holding end point until the pressure in the bladder achieves a second baseline. It will be appreciated that the initial baseline pressure and the second baseline pressure may be substantially equivalent pressures. The inflation period may have a duration of approximately 10 ms to approximately 150 ms. The inflation period may be less than 250 ms. The holding period may have a duration of approximately 100 ms to approximately 350 ms. The holding period may be less than 500 ms. The deflation period may have a duration of approximately 30 ms to approximately 350 ms. The deflation period may have a duration of less than 500 ms. In some embodiments, the compression period also includes a ramp-up period and pulse period. The inflation period may include the ramp-up period and the pulse period. The ramp-up period may have a longer duration than a duration of the hold period. In some embodiments, the compression period includes a ramp-up period, a pulse period, a holding period, and a deflation period as described in further detail below.

In some embodiments, the peak pressure is approximately 1 PSI to approximately 3 PSI. the compression bladder may maintain a pressure above the minimum pressure for approximately 150 ms.

In some embodiments, compression bladder includes a lobe coupled to the conduit, the lobe being disposed proximate a perimeter of the compression bladder.

In some embodiments, the compression bladder is configured to be positioned on an upper calf of the patient proximate a knee of the patient.

In some embodiments, at least a portion of the repeating compression cycles is configured to induce forward venous flow and reverse venous flow at a venous valve sinus. The venous valve sinus may be located in a deep vein proximate a groin of the patient. The forward venous flow and reverse venous flow within the venous valve sinus may each have a respective peak that occurs within approximately 100 milliseconds of each other. The peak forward venous flow and the peak reverse venous flow may both occur during a period in which the compression bladder is inflating.

In some embodiments, the forward venous flow has a baseline rate occurring prior to the compression bladder inflating. A forward flow volume index of the forward venous flow after inflation of the compression bladder may return to the baseline rate within between approximately 2 seconds and approximately 10 seconds. A forward flow volume index of the forward venous flow after inflation of the compression bladder may return to the baseline rate in less than or equal to 2 seconds.

In some embodiments, a magnitude of a peak reverse flowrate of the reverse venous flow is greater than a magnitude of a peak reverse flowrate when the patient is immobile.

In some embodiments, a period of the repeating compression cycles is from 3 seconds to 20 seconds, the period of repeating compression cycles being a time period from a peak inflation pressure of one compression period of the repeating compression cycles to a peak inflation pressure of a subsequent compression period of the repeating compression cycles.

In some embodiments, the compression bladder is configured to cyclically inflate to alternate between the peak pressure and a subsequent peak pressure for at least 6 cycles per minute.

In some embodiments, the compression bladder is configured to cyclically inflate to alternate between the peak pressure and a subsequent peak pressure for between 6 cycles per minute and 20 cycles per minute.

In some embodiments, the compression bladder is configured to depressurize from the peak pressure to the minimum pressure in less than one second.

In some embodiments, the compression bladder comprises a first end, a middle portion, and a tapered second end, the tapered second end configured to secure to the first end to position the middle portion proximate an upper calf of the patient.

In some embodiments, the compression bladder is sized and dimensioned to apply pressure across a limited part of a lower extremity of the patient, wherein the limited part is proximate a knee of the patient and along an upper calf of the patient.

In some embodiments, the air compressor assembly comprises a housing disposed about an air compressor, a compressed air storage tank and an air pressure control system operably connected to the air compressor and the compressed air storage tank. The air storage tank, in operation may reach an air pressure between 1.5 PSI and 7.5 PSI. A ratio of an interior volume of the compression bladder to an interior volume of the air tank may be 1:3.

In some embodiments, the peak pressure in the bladder during inflation is from approximately 0.5 PSI to approximately 4 PSI.

In some embodiments, the peak pressure in the bladder during inflation is from approximately 1 to approximately 5.

In some embodiments, the device further includes a wearable garment, wherein the compression bladder is disposed within the wearable garment. Operation of the device may produce a repeatable flow pattern within a venous valve sinus area at a junction of a patient's saphenous vein and the patient's femoral vein when the wearable garment is operably positioned at the calf of the patient, the repeatable flow pattern characterized by an increase in a flow volume index of forward venous flow and a flow volume index of reverse venous flow occurring in a same cycle period.

In some embodiments, the repeating compression cycles are effective to produce an oscillatory flow pattern in the patient's venous valve sinus area that substantially replicates an oscillatory flow pattern from active muscle movements. Active muscle movements may include dorsiflexion of a foot of the patient.

In some embodiments, a frequency of the repeating compression cycles is effective to induce expression of PROX1 and FOXC2 in human endothelial cells.

In some embodiments, the repeating compression cycles is effective to induce reverse flow in a venous valve sinus area at a junction of the patient's saphenous vein and the patient's femoral vein when the compression bladder is operably positioned at a calf of the patient.

In some embodiments, the repeating compression cycles is effective to induce eddies in a venous valve sinus area at a junction of the patient's saphenous vein and the patient's femoral vein when the compression bladder is operably positioned at a calf of the patient.

Another embodiment of the present disclosure is directed to a method of inducing reverse flow in a venous valve sinus area. The method includes applying a compression bladder to an anatomical region between a knee of a patient and a widest portion of a calf of the patient; and inflating the compression bladder in a repeating compression cycle, each compression cycle having a compression period. In some embodiments, the compression period is defined an inflation period, a holding period, and a deflation period. The duration of the compression period may be less than 300 ms. The repeating compression period may have a peak pressure and a minimum pressure (e.g., baseline pressure).

In some embodiments, a lapsed time from the peak pressure of one compression period of the repeating compression cycles to a peak pressure of a subsequent compression period of the repeating compression cycles is selected from a group consisting of: 20 seconds or less, 15 seconds or less, 10 seconds or less, 6 seconds or less, 5 seconds or less, 2 seconds or less, and 3 seconds or less.

In some embodiments, inflating the bladder includes cyclically inflating the compression bladder to alternate between the peak pressure and a subsequent peak pressure for at least 3 cycles per minute. Inflating the bladder includes cyclically inflating the compression bladder to alternate between the peak pressure and a subsequent peak pressure for between 3 cycles per minute and 20 cycles per minute.

In some embodiments, the compression bladder includes a single bladder disposed at the patient's calf.

In some embodiments, the venous valve sinus area is at a junction of the patient's saphenous vein and the patient's femoral vein.

In some embodiments, the inducing reverse flow comprises inducing activation of PROX1 and FOXC2 in human endothelial cells at the venous valve sinus area.

In some embodiments, the inducing reverse flow comprises inducing eddies at the venous valve sinus area.

In some embodiments, inflating the compression bladder in the repeating compression cycles comprises applying consecutive compressions at the anatomical region, each consecutive compression inducing reverse flow at the venous valve sinus area.

In some embodiments, inflating the compression bladder in the repeating compression cycles comprises applying a first compression and a subsequent second compression, the first compression inducing a first reverse flow at the venous valve sinus area and the subsequent second compression inducing a second reverse flow at the venous valve sinus area. The first reverse flow may have a peak volume index having a magnitude generally equal to a magnitude of a peak volume index of the subsequent reverse flow. A magnitude of a peak volume index of the first reverse flow may be between 50% and 150% of a magnitude of a peak volume index of the subsequent reverse flow. The first compression may induce a first forward flow occurring substantially simultaneously with the first reverse flow and the second compression may induce a second forward flow occurring substantially simultaneously with the second reverse flow.

In some embodiments, a magnitude of a peak volume index of the first forward flow is generally equal to a magnitude of a peak volume index of the second forward flow and the magnitude of the peak volume index of the first forward flow is 10%-300% of the magnitude of the peak volume index of the first reverse flow.

In some embodiments, the method further includes preventing substantial reduction of venous flow at the venous valve sinus area after inflating the compression bladder.

In some embodiments, the method further includes reducing a magnitude of a forward flow volume index of a forward venous flow at the venous valve sinus area that occurs after inflation of the compression bladder by no greater than 10% compared to a magnitude of a forward flow volume index occurring prior to inflation of the compression bladder.

In some embodiments, the inflation period is between approximately 30 ms and approximately 150 ms. The holding period may be between approximately 150 ms and approximately 250 ms. The deflation period may be approximately 60 ms.

In some embodiments, inflating the compression bladder induces a reverse venous flow at the venous valve sinus area having a peak reverse flow volume index with a magnitude greater than when the patient is immobile. The peak reverse flow volume index of the reverse venous flow at the venous valve sinus area may have a magnitude between 50% and 150% of a magnitude of a peak forward flow volume index of a forward venous flow that occurs substantially simultaneously as the reverse venous flow.

In some embodiments, a magnitude of a peak forward flow volume index at the venous valve sinus area after inflating the compression bladder is not less than a magnitude of a peak forward flow volume index at the venous valve sinus area prior to inflating the compression bladder for a period of time greater than 2 seconds.

Another embodiment of the present disclosure is directed to a method monitoring compliance with a deep vein thrombosis mitigation device, the method including applying a compression bladder to an anatomical region substantially between a patient's calf and knee, inflating the compression bladder in a repeating compression period an inflation period, a holding period, and a deflation period, the duration of the compression period may be less than 300 ms, determine a bladder pressure of the compression bladder during the repeating compression period, compare the bladder pressure to a non-compliant bladder pressure, and alert the patient if the bladder pressure is less than or equal to the non-compliant bladder pressure for a predetermined amount of non-compliant inflations during a predetermined compliance time period.

In some embodiments, the method further includes automatically disabling the deep vein thrombosis mitigation device if the bladder pressure is greater than a selected pressure for a predetermined number of inflations.

In some embodiments, the predetermined compliance time period is twenty-four hours.

In some embodiments, the non-compliant bladder pressure is a pressure of the compression bladder when the compression bladder is not applied to the anatomical region.

In some embodiments, the non-compliant bladder pressure is a pressure of the compression bladder during an air leakage.

Although the presently disclosed subject matter and its advantages have been described in detail, it should be understood that various changes, substitutions and alterations can be made herein without departing from the spirit and scope of the disclosed subject matter as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the presently disclosed subject matter, processes, machines, manufacture, compositions of matter, methods, presently existing or later to be developed that perform substantially the same function or achieve substantially the same result as the corresponding embodiments described herein can be utilized according to the presently disclosed subject matter. Accordingly, the appended claims are intended to include within their scope such processes, machines, manufacture, compositions of matter, and methods.

Patents, patent applications publications product descriptions, and protocols are cited throughout this application the disclosures of which are incorporated herein by reference in their entireties for all purposes.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Further, to the extent that the methods of the present disclosure do not rely on the particular order of steps set forth herein, the particular order of the steps should not be construed as limitation on the claims. Any claims directed to the methods of the present disclosure should not be limited to the performance of their steps in the order written, and one skilled in the art can readily appreciate that the steps may be varied and still remain within the spirit and scope of the present disclosure.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

The invention claimed is:

1. A method of inducing recirculatory flow in a venous valve sinus of a subject, the method comprising:

positioning a majority of an inflatable portion of a bladder between the subject's knee and a midpoint of the subject's gastrocnemius muscle;

delivering compression cycles via inflation of the bladder at a frequency of at least 3 compression cycles per minute, wherein at least one of the compression cycles comprises:

inflating the bladder to a target pressure in the range of 35 mmHg to 70 mmHg during an inflation period of 400 ms or less; and deflating the bladder to a minimum pressure subsequent to the inflation period, the minimum pressure being less than the target pressure; and inducing a period of recirculatory venous flow in the venous valve sinus of the subject's veins proximal from the positioned bladder via the delivered compression cycles.

2. The method of claim 1, wherein inflating the bladder applies pressure to the subject's gastrocnemius over an area of one of: i) less than 60 sq. in.; ii) about 55 sq. in.; iii) less than 30 sq. in; iv) about 25 sq. in; v) less than 15 sq. in.; or vi) about 12.5 sq. in.

3. The method of claim 1, wherein the inflation period is one of: i) 50 ms or less; ii) 150 ms to 250 ms; or iii) 300 ms to 400 ms.

4. The method of claim 1, wherein the at least one of the compression cycles further comprises:

applying pressure to the subject's gastrocnemius over an area of one of less than 30 sq. in or about 25 sq. in.

5. The method of claim 1, wherein the deflating comprises deflating the bladder for a duration of 500 ms or less.

6. The method of claim 5, wherein a pressure within the inflatable bladder dissipates over substantially all of the duration of the deflation.

7. The method of claim 1, wherein the frequency is at least 6 compression cycles per minute.

8. The method of claim 1, wherein the venous valve sinus is in a deep vein.

9. The method of claim 1, wherein the induced period of recirculatory comprises reverse flow.

10. The method of claim 9, wherein the induced period of recirculatory flow further comprises forward flow occurring substantially simultaneously with the reverse flow.

11. The method of claim 1, wherein the frequency is at least 3 compression cycles per minute per leg of the subject.

12. The method of claim 1, wherein the inflation period is in the range of 150 ms to 250 ms.

13. A method of treating a subject having a damaged venous valve, comprising:

positioning a majority of an inflatable portion of a bladder between the subject's knee and a midpoint of the subject's gastrocnemius muscle;

delivering compression cycles via inflation of the bladder at a frequency of at least 3 compression cycles per minute, wherein at least one of the compression cycle comprises:

inflating the bladder to a target pressure in the range of 35 mmHg to 70 mmHg during an inflation period of 400 ms or less; and inducing a period of recirculatory venous flow in a venous valve sinus of the subject's veins proximal from the positioned bladder via the compression cycles.

14. The method of claim 13, wherein the at least one of the compression cycles further comprises deflating the-bladder to a minimum pressure subsequent to inflating the bladder, the minimum pressure being less than the target pressure.

15. The method of claim 13, wherein the frequency, the anatomical location and surface area of applied compression, the target pressure, and the inflation period are selected to stimulate endothelial FOXC2 expression in an endothelium of the valve sinus.

16. The method of claim 13, wherein the frequency is at least 5 compression cycles per minute.

17. The method of claim 13, wherein the frequency is at least 3 compression cycles per minute per leg of the subject.

18. The method of claim 13, wherein the inflation period is in the range of 150 ms to 250 ms.

* * * * *